(12) United States Patent
Huang

(10) Patent No.: US 12,487,761 B2
(45) Date of Patent: Dec. 2, 2025

(54) DATA SECURITY PROTECTION METHOD, DEVICE, SYSTEM, SERVER-SIDE, AND STORAGE MEDIUM

(71) Applicant: Jianbang Huang, Guangzhou (CN)

(72) Inventor: Jianbang Huang, Guangzhou (CN)

( * ) Notice: Subject to any disclaimer, the term of this patent is extended or adjusted under 35 U.S.C. 154(b) by 0 days.

(21) Appl. No.: 18/851,723

(22) PCT Filed: May 9, 2023

(86) PCT No.: PCT/CN2023/093113
§ 371 (c)(1),
(2) Date: Sep. 27, 2024

(87) PCT Pub. No.: WO2023/143646
PCT Pub. Date: Aug. 3, 2023

(65) Prior Publication Data
US 2025/0110648 A1    Apr. 3, 2025

(30) Foreign Application Priority Data

May 10, 2022   (CN) .......................... 202210504332.8
Jul. 4, 2022    (CN) .......................... 202210781724.9

(51) Int. Cl.
G06F 3/06 (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

| 7,712,131 | B1 | 5/2010 | Lethe |
| 8,661,193 | B1 | 2/2014 | Cobos et al. |
| 9,455,955 | B2 * | 9/2016 | Fetik ........... G06F 21/78 |
| 2003/0167376 | A1 | 9/2003 | Koh |
| 2008/0091878 | A1 | 4/2008 | Stern et al. |

(Continued)

FOREIGN PATENT DOCUMENTS

| CN | 15354111 A | 10/2004 |
| CN | 1661572 | 8/2005 |

(Continued)

*Primary Examiner* — Kenneth M Lo
*Assistant Examiner* — Jonah C Krieger
(74) *Attorney, Agent, or Firm* — SBPC & BMLaw

(57) ABSTRACT

The application relates to the technical field of information security, and provides a data security protection method, device, system, security control framework and medium, wherein by sending split disk capacity parameters of a target split disk to a computer device, or by obtaining a mapping relationship between a sector address range and a target address range of a target file, when data interaction is performed with the computer device, an operation address corresponding to the data interaction instruction is modified into a target sector address in the split disk capacity parameters of the target split disk; and data read/write is performed according to the target sector address. By modifying the operation address of the instruction into the target sector address, the direct mapping read/write of the data address is realized, so that the computer device only identifies the target split disk.

73 Claims, 43 Drawing Sheets

— S101 performing permission control on a data interaction instruction sent by the computer device according to a current protection mode of the target device, wherein the data interaction instruction is used for data interaction between the computer device and the storage device

— S102 responding to the data interaction instruction if the data interaction instruction satisfies the permission requirement corresponding to the current protection mode

(56) References Cited

U.S. PATENT DOCUMENTS

| | | | |
|---|---|---|---|
| 2013/0198474 A1 | 8/2013 | Shaath | |
| 2013/0297907 A1* | 11/2013 | Ki | G06F 3/0679 |
| | | | 711/170 |
| 2021/0004171 A1* | 1/2021 | Li | H04L 67/565 |
| 2022/0300294 A1* | 9/2022 | Chiu | G06F 3/0604 |

FOREIGN PATENT DOCUMENTS

| | | |
|---|---|---|
| CN | 1731376 | 2/2006 |
| CN | 101042681 | 9/2007 |
| CN | 101403993 | 4/2009 |
| CN | 101520854 | 9/2009 |
| CN | 101692264 A | 4/2010 |
| CN | 101692266 A | 4/2010 |
| CN | 101789019 | 7/2010 |
| CN | 105787392 | 7/2016 |
| CN | 109542808 | 3/2019 |
| CN | 111159055 | 5/2020 |
| CN | 111400710 A | 7/2020 |
| CN | 112083879 | 12/2020 |
| CN | 112231678 | 1/2021 |
| CN | 112507319 | 3/2021 |
| CN | 113849138 | 12/2021 |
| CN | 115048681 | 9/2022 |
| WO | 2017105733 A1 | 6/2017 |

\* cited by examiner

S601 performing read/write operation on the target file in the storage device in response to the data interaction instruction, wherein the read/write operation include at least one of a read operation and a write operation.

| Computer host | Protection module | Storage device |
|---|---|---|
| | (1, 2, and 3 are non-hierarchical progressive relationships below) (Executions that fall under the following rules can be performed automatically or manually confirmed.) | |
| Enumeration phase Establish an interface connection | 1. Access control. According to the access control rules, the descriptor data of the storage device is read to determine whether the preset requirements are met, and the computer device is allowed/or prohibited from establishing a connection. 2. Content modifications. According to the content modification rules, the modified or replaced descriptor data is returned to the computer device. | Descriptor data (Hardware Descriptors, Interface Descriptors, Port Descriptors, Endpoint Descriptors, String Descriptors) (Note: The above is USB device-specific data, such as USB flash drive.) If it is a memory chip, there is no descriptor data) |
| Enumeration phase Read storage device information | 1. Access control. According to the access control rules, the storage information data of the storage device is read, and whether the preset requirements are met, and the computer device is allowed/or prohibited from establishing a connection. 2. Content modifications. According to the content modification rules, the modified or replaced storage information data is returned to the computer device. | Storage informational data (Read/write status of the device, maximum formatable capacity, last sector address, number of bytes per sector, maximum number of logical units) |
| Data interaction phase Read/write storage address data When it is read out, the data corresponding to the sector address is read. When writing, data is written to the corresponding sector address. | Determine whether the read/write sector address of a computer device matches the preset. 1. Access control. Read/write operations on the sector address are allowed/prohibited by computer devices according to access control rules. 2. Address mapping. According to the address mapping rules, the data of the corresponding mapped sector address of the storage device is read/written and returned to the computer device (read data or write status). 3. Content modifications. According to the content modification rules, the corresponding sector address data of the read/write storage device is modified and returned to the computer device (read data or write status). | Data corresponding to the sector address of the storage space |

DATA SECURITY PROTECTION METHOD, DEVICE, SYSTEM, SERVER-SIDE, AND STORAGE MEDIUM

CROSS-REFERENCE TO RELATED APPLICATIONS

The present application claims priority to the Chinese patent application No. 202210504332.8 filed on May 10, 2022 with the title of "Data Security Protection Method, Device, Protection Equipment and Storage Medium", and the Chinese patent application No. 202210781724.9 filed on Jul. 4, 2022 with the title of "data security protection method, device, target device and storage medium", which are all incorporated into the present application by reference.

TECHNICAL FIELD

The present application relates to the field of information security technology, in particular to a data security protection method, device, system, security control framework and storage medium.

DESCRIPTION OF THE PRIOR ART

Removable storage devices are widely used in daily work and life, but when removable storage devices are used to connect to computers for data processing operations such as data copying, data risks are easily generated. Removable storage devices and computers can be threats to each others data security.

SUMMARY OF THE INVENTION

The embodiment of the present application provides a data security protection method, device, system, security control framework and storage medium, which can protect the data security of storage devices and computer devices.

According to a first aspect, the application provides a data security protection method applied to a target device, the target device is provided with a protection module comprising at least one protection mode for controlling read/write permission of a computer device on a storage device, and the method comprises:
performing permission control on a data interaction instruction sent by the computer device according to a current protection mode of the target device, wherein the data interaction instruction is used for data interaction between the computer device and the storage device;
responding to the data interaction instruction if the data interaction instruction meets permission requirement corresponding to the current protection mode.

Specifically, the data security protection method is suitable for the protection module, comprising:
determine the current protection mode when receiving the data interaction instruction sent by the computer device, wherein the current protection mode is one of at least one protection mode preset by the protection module;
responding to the data interaction instruction when the data source directed by the data interaction instruction is one of at least one data source specified by the current protection mode, and an operation type of the data interaction instruction on data in data source conforms to an operation type specified by the current protection mode;
wherein the protection module is arranged at an interface of the computer device for connecting the storage device, or arranged at the storage device, or arranged at the intermediate device;
the intermediate device connects the computer device with the storage device.

According to a second aspect, the application further provides a data security protection module applied to a target device, the target device is provided with a protection module comprising at least one protection mode for controlling read/write permission of a computer device on a storage device, and the module comprises:
a control unit configured for performing permission control on a data interaction instruction sent by the computer device according to a current protection mode of the target device, wherein the data interaction instruction is used for data interaction between the computer device and the storage device;
a response unit configured for responding to the data interaction instruction if the data interaction instruction meets permission requirement corresponding to the current protection mode.

According to a third aspect, the application further provides a target device which is provided with a protection module and a first interface for connecting a storage device and a second interface for connecting a computer, wherein the protection module comprises at least one protection mode for configuring read/write permission of a computer device on the storage device;
the target device comprises one or more processors, as well as a memory;
the memory is used for storing a computer program, and the steps of the data security protection method according to the first aspect are implemented when the computer program is executed by the processor.

According to a fourth aspect, the application further provides a target device which is provided with a protection module integrated into a processor, the protection module comprises at least one protection mode for configuring read permissions of a computer device on a storage device;
the target device comprises one or more processors, as well as a memory;
the memory is used for storing a computer program, and the steps of the data security protection method according to the first aspect are realized when the computer program is executed by the processor.

According to a fifth aspect, the application further provides a computer-readable storage medium on which a computer program is stored, and the steps of the data security protection method according to the first aspect are implemented when the computer program is executed by a processor.

According to a sixth aspect, the application further provides a computer program product, and the steps of the data security protection method according to the first aspect are executed by a computer device when the computer program product is running on the computer device.

Another embodiment of the present application provides an intermediate device.

The intermediate device comprises:
a first port for connecting a computer device;
a second port for connecting a storage device;
an interaction module comprising at least one of the following: a touch screen, a voice interaction device, a plurality of buttons, a slide switch, and an interaction control with at least two selections; and a protection module which is connected between the first port and the second port and is used for implementing the steps of the data security protection method provided in the above embodiment.

Another embodiment of the present application provides a device system, which comprises: a computer device, a storage device and an intermediate device provided by the above embodiment.

Another embodiment of the present application provides a storage device, which comprises:
 a first port for connecting a computer device;
 a protection chip for implementing the steps of the data security protection method provided in the embodiment;
 a control chip connected with the first port through the protection chip;
 a storage chip connected with the control chip, which is used for performing storage management on data in storage space under the control of the control chip.

An embodiment of the present application further provides a storage device, which comprises:
 a first port for connecting a computer device;
 a control chip on which a protection module is deployed for implementing the steps of the data security protection method provided in the above embodiment;
 a storage chip connected with the first port through the control chip, which is used for performing storage management on data in storage space under the control of the control chip.

Still another embodiment of the present application provides a storage device.

The storage device comprises:
 a first port for connecting a computer device;
 a control chip connected with a first port, which is used for generating corresponding control instructions based on the data interaction instructions sent by the computer device; a storage chip connected with the control chip;
 wherein, a protection module is deployed on the storage chip for processing control instructions sent by the control chip by adopting the steps of the data security protection method of the above embodiment.

Still another embodiment of the present application provides a security control framework.

This security control framework comprises:
 a configuration module for configuring protection scene;
 a generation module for generating configuration information of the protection scene or software with the protection scene;
 wherein one protection scene corresponds to at least one protection mode; the configuration information or the software with the protection scene is deployed on a hardware device, so that the hardware device has function corresponding to the steps of the data security protection method in the above embodiment.

Compared with the prior art, the beneficial effects of the present application are:

According to the present application, a protection module is arranged on the target device to control the read/write permission of the computer device on the storage device, so as to ensure the communication security between the storage devices, avoid the computer data security risk caused by the malicious storage device accessing the computer device, and avoid the data leakage of the storage device caused by the computer device maliciously accessing the private data of the storage device.

Furthermore, according to the present application, based on the current protection mode of the target device, the data interaction instruction sent by the computer device is controlled; If the data interaction instruction meets the permission requirements corresponding to the current protection mode, a response is made to the data interaction instruction to ensure that the computer device accesses the storage device in the current protection mode of the target device, so as to avoid data damage to the storage device caused by viruses on the computer device, and also to avoid data leakage caused by direct access to the storage device, thereby improving the data security of the storage device.

BRIEF DESCRIPTION OF DRAWINGS

To more clearly explain the technical proposal of the embodiments of the present application or the prior art, the drawings required for the description of the embodiments or the prior art are briefly introduced. It is obvious that the drawings below are only for some embodiments of the application. Other drawings may be derived by those skilled in the art based on the drawings described herein without creative effort.

FIGS. 20A and 20B are schematic diagrams showing multiple phases of interaction between the computer device and the protection module;

DESCRIPTION OF EMBODIMENTS

Figure 1:
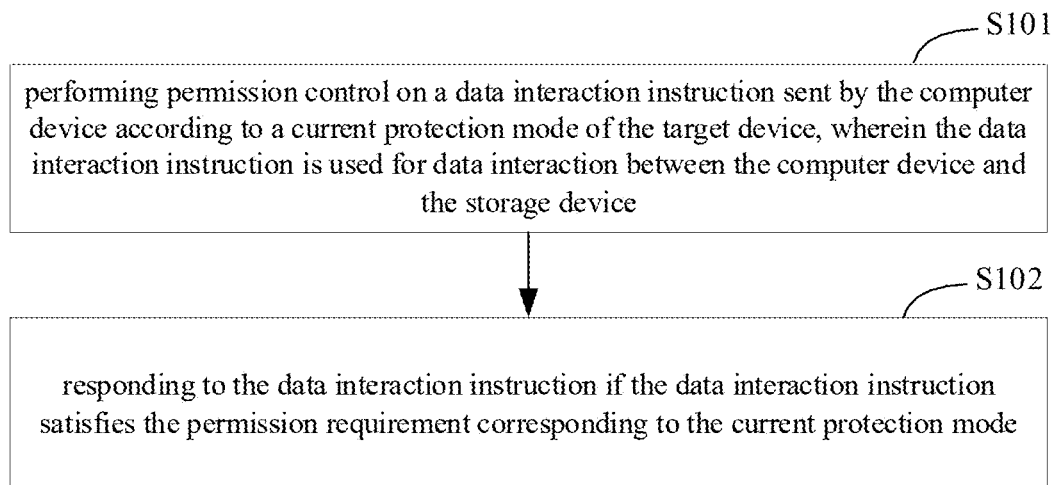
FIG. 1 is a flow chart of the data security protection method shown in an embodiment of the present application.

In the following, the technical solutions in the embodiments of the present application will be clearly and completely described in conjunction with the accompanying drawings in embodiments of the present application. Obviously, the described embodiments are only a part of the embodiments of the present application, not all embodiments. It is intended that the specification and examples be considered as exemplary only, with a true scope and spirit of the application being indicated by the following claims and their equivalents.

As described in the relevant technical documents, current storage devices and computers can be threats to each others data security. For computer device: 1. There may be malicious codes on the storage device, and the computer device will mistakenly copy and run Trojan horses, viruses and other malicious programs when the anti-virus software and other security software on the computer device cannot detect and kill them; 2. The storage device may have malicious hardware parameters which will cause the buffer overflow of the vulnerable security software when being read by the computer, so that the preset malicious instructions are executed; 3. The storage device may be disguised as an input device such as a keyboard and mouse which perform preset keyboard or mouse input operations when being connected to the computer, so as to copy and run malicious programs or perform other malicious input operations to the computer. For storage devices: 1. The computer device can tamper with or delete the data in the storage device, or write malicious programs such as Trojan horses or viruses to the storage device; 2. Some private file data can be read and copied by the computer device, and even some deleted and hidden file data may be read and copied by the computer device, resulting in data leakage of the storage device. 3. There is also the possibility that the data in the storage device is stolen due to poor storage by the user of the storage device.

In terms of protecting computer device, the prior art is usually to install virus detection and anti-virus software in the computer to scan the files connected to the storage device; or to install storage device access control software, and storage devices that are not pre-registered will not be accessed. Whether it is installing virus detection software or control software on the computer, first, the cost is the high. For computer users, installing software requires a part of computer resources and software costs; For users of storage devices, it is not practical to install corresponding software on the connected computer in order to use it safely when accessing a computer. Second, software also has limitations, and some viruses and Trojans cannot be effectively detected and killed. Third, the process of installing software is also dangerous. For example, there is a problem with the source of the software, wherein some malicious programs are bundled in advance, forming a new security risk point. Fourth, the software needs to judge the hardware characteristic parameters of the connected device, if the software itself has code writing vulnerabilities (such as buffer overflow, etc.), the malicious device can attack the software by sending malicious hardware characteristic parameters to control the computer device maliciously. Fifth, it is difficult for some existing security software to judge whether the connected device is a storage device or a mouse and keyboard device, and the device type is reported by the connected device itself (for example, the device that looks like a USB flash disk can be reported as a mass storage device type, or a mouse device type, or a keyboard device type, or a collection of the above device types), and some malicious devices report the mouse and keyboard type to the computer device to maliciously operate the computer device.

The prior art is mainly biased towards the protection of computer device, and there are few protection solutions for storage devices. The main reason is that the design of the storage device control chip generally cannot modify the security function of the storage device or install security software. There is a read-only storage device on the market, although the data in the storage device cannot be tampered with, the data can still be read. It is also a storage device with data encryption function, however the encryption function of this storage device is easy to be cracked by reverse technology.

Before introducing the embodiments of the present application, some technical terms herein are briefly explained.

USB communication rules, USB is divided into master mode (computer) and slave mode (USB flash disk). The master actively sends data interaction instructions to the slave, and the slave responds passively according to the data interaction instructions.

Regarding the principle of enumeration, for storage devices such as USB flash disks, enumeration is the process by which a computer reads the storage device. For removable storage devices (mass storage devices), first, it is to read the basic hardware parameters, including the parameters of hardware descriptors, configuration descriptors, port descriptors, and endpoint descriptors, and load the driver information according to different parameters to realize the connection of the hardware. Second, it is to read the parameters of the removable storage device, such as the size of the capacity, whether it is read-only, etc.; Third, it is to read the file system information so that the drive letter can be displayed on the computer operating system. However, during the use of the protection module, the enumeration process of the operating system may not be strictly observed, but the data necessary for the enumeration of the removable storage device must be read.

Differences Between Files and Folders:

According to some file system protocols (such as FAT32 and exFat, etc.), the root directory mentioned above is essentially the same as a specific folder, and the root directory is a special folder. A folder is essentially the same as a file, and a folder is just a special kind of file. For example, a file with a file name of 'A.txt' can store content as "123456"; A folder named 'showdir' stores information about folders or files in its directory. For example, the properties and the first sector address of the data of a file 'test.txt', or the properties and the first sector address of a folder 'test2'. When the data corresponding to the first sector address of the file 'test.txt' is further read, the content of the file can be read as "123456".

TABLE 1

| Byte bit | 0-7 | 8-10 | 11 | 12 | 13-15 | 16-17 | 18-19 | 20-21 | 22-23 | 24-25 | 26-27 | 28-31 |
|---|---|---|---|---|---|---|---|---|---|---|---|---|
| Parameter | FileName | Extension | Retain | File attributes | Creation time | Creation date | Last visit date | Start cluster high byte | Last modified time | Last modified date | Start cluster low byte | FileSize |
| Example Data 0x | 41 20 20 20 20 20 20 20 | 54 58 54 | 20 | 10 | a4 0a b4 | a8 56 | a8 56 | 00 00 | c8 b3 | a8 56 | 1d 00 | 06 00 00 00 |

Table 1 takes the FAT32 file system as an example (file information of A.txt): the start cluster number is 0x1d, and the first sector (the start sector address) can be obtained according to the calculation by the file system. The corresponding cluster chain can be obtained in the FAT table, and the sector addresses set of the file data can be obtained by calculating according to the cluster chain. The data for the sector address set is the content data of the file A.txt, such as the binary data of 123456 strings.

TABLE 2

| Byte bit | 0-7 | 8-10 | 11 | 12 | 13-15 | 16-17 | 18-19 | 20-21 | 22-23 | 24-25 | 26-27 | 28-31 |
|---|---|---|---|---|---|---|---|---|---|---|---|---|
| Parameter | FileName | Extension | Retain | File attributes | Creation time | Creation date | Last visit date | Start cluster high byte | Last modified time | Last modified date | Start cluster low byte | FileSize |
| Example Data 0x | 53 48 4f 57 44 49 52 20 | 20 20 20 | 10 | 08 | 53 91 b1 | a8 56 | a8 56 | 00 00 | 92 b1 | a8 56 | 09 00 | 00 00 00 00 |

Table 2 takes the FAT32 file system as an example (folder showdir): the start cluster number of the folder showdir is 0x09, and the corresponding first sector (start sector address) is 0x00010038 by calculating according to the file system of the storage device in this test (Note: for different file systems and storage devices, the calculated sector addresses are different). The corresponding cluster chain can be obtained in the FAT table, and the sector addresses set of the file data can be obtained by calculating according to the cluster chain. The data of the sector address set are information of the subfolders and files contained in the folder showdir, such as the information of the file A.txt or the subfolder information that is consistent with the data structure of the folder showdir.

The first embodiment of the present application provides a protection module, which may be an independent device (also known as an intermediate device) for connecting a storage device with a computer device. For example, a portable device can also be a USB guard interface that is fixed to a computer device. It can be called: portable USB flash disk hardware firewall, removable storage media data ferry device (manual confirmation mode), secure USBHUB, etc. Wherein removable storage media may include: USB flash disk, TF card, SD card, removable hard disk and so on. The protection module may also be a storage device with the corresponding function of the protection method provided by each embodiment of the present application, and the storage device may be called: a new type of security USB flash disk or a removable hard disk, a USB flash disk that can be split or a corresponding memory card (such as a TF card, an SD card, etc.). The storage device may also be: Devices where intermediate protection (USB interface), card reader (SD, TF card interface) and memory chip are all present, which can be used to select the physical data source to be accessed by sliding switches, touch screens, buttons, at least two selected interaction controls, etc. The storage device can also be a networked storage disk, which can switch between different network data sources.

The technical solutions provided in the embodiments of the present application relate to software configurations where the protection module may implement at least one protection mode. Examples of protection modes include, but are not limited to: read-only mode, specific file mode, blank file mode, logical split disk mode, sector limited mode, file type restriction mode, encryption write mode, decryption readout mode, manual confirmation mode, hardware type access protection mode, data information protection mode for storage device, device privacy protection mode, backup mode, etc.

The protection module can be small in size, so that it can be carried around or fixed to the data interface (USB port) of the computer device or to the connection port of the storage device for a long time. The protection module can be an intermediate device for physical communication transmission between computer device and storage device, and control the security restriction or security modification of communication transmission data packets according to the users settings, to protect the computer or the access storage device; The protection module adopting the technical solution provided in the embodiment of the present application can also be integrated into the storage device, and the intermediate device is not required. The storage device with integrated protection module or security master control chip can protect the data security of the storage device according to the users settings.

According to the technical solution provided by the embodiment of the present application, the communication data between the storage device and the computer device is transmitted after being controlled by the intermediate device, wherein the computer device and the storage device are isolated from each other, and each other cannot directly obtain data from each other. Wherein the intermediate device can be in the form of firmware without an operating system, and it is difficult for a computer device or storage device with malicious programs to modify the working logic of the intermediate device through vulnerabilities.

The intermediate device can use standard communication protocols, which can match the mass storage device driver that comes with the operating system, and can connect most storage devices without installing drivers when connecting to computer devices. Users of intermediate devices can operate optional interaction controls such as buttons or switches on intermediate devices to carry out read-only mode, specific file mode, blank file mode, logical split disk mode, sector limited mode, file type restriction mode, encryption write mode, decryption readout mode, manual confirmation mode, hardware type access protection mode, data information protection mode of storage device, and device privacy protection mode of the storage device according to different usage scenarios such as writing data to or reading data to the removable storage device, backup mode, and other protection modes. At the same time, the intermediate devices also have three auxiliary settings: file content data encryption, log retention, and extension settings.

According to the data security protection method provided by the present application, a protection module is arranged on the target device to configure the read/write permission of the computer device on the storage device, so as to ensure the communication security between the storage devices, avoid the computer data security risk caused by the malicious storage device accessing the computer device, and avoid the data leakage of the storage device caused by the computer device maliciously accessing the private data of the storage device, in addition, computer device can be free of the need to install security software, effectively avoiding the security risks existing in the installation of security software. Furthermore, according to the present application, based on the current protection mode of the target device, the data interaction instruction sent by the computer device is controlled; If the data interaction instruction meets the permission requirements corresponding to the current protection mode, a response is made to the data interaction instruction to ensure that the computer device accesses the storage device in the current protection mode of the target device, so as to avoid data damage to the storage device caused by viruses on the computer device, and also to avoid data leakage caused by direct access to the storage device, and the protection module is arranged at the target device, which can effectively avoid malicious programs from cracking the protection mode of the protection module at the level of the computers operating system, thereby improving the data security of the storage device.

Referring to FIG. 1, a flow chart of the data security protection method provided by an embodiment of the present application; The data security protection method provided by application can be applied to a target device, the target device is provided with a protection module comprising at least one protection mode for controlling read/write permission of a computer device on a storage device.

Figure 2A:
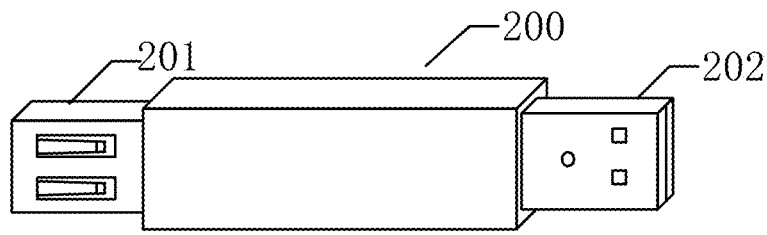
FIG. 2A is a schematic diagram corresponding to the first structural form of the target device shown in an embodiment of the present application.
Figure 2B:
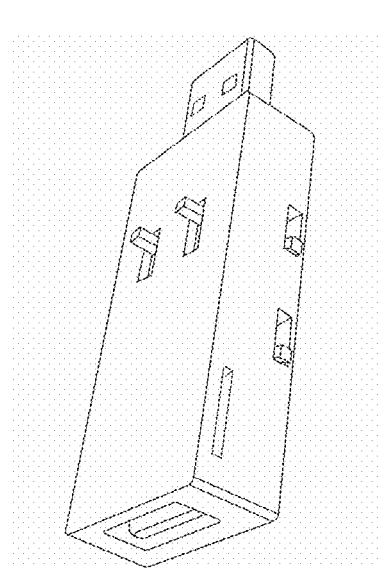
FIG. 2B is a schematic diagram corresponding to the second structural form of the target device shown in an embodiment of the present application.
Figure 2C:
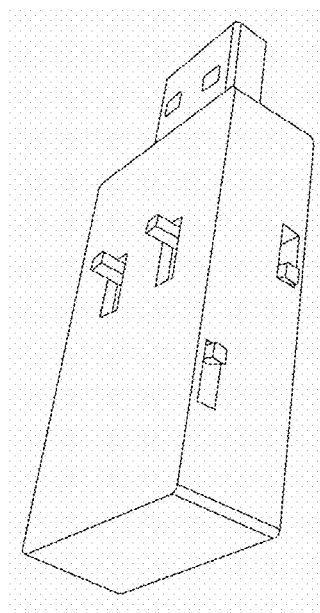
FIG. 2C is a schematic diagram corresponding to the second structural form of the target device shown in an embodiment of the present application.

Optionally, the target device is an intermediate device with a protection module that serves as an intermediate connection node when the storage device establishes a communication connection with the computer device. Communication connections include both wired and wireless connections. For example, in a wired connection scenario, a structure diagram of an intermediate device is shown in FIG. 2A. The intermediate device 200 is provided with a first interface 201 and a second interface 202, wherein the first interface 201 is used for connecting a storage device, and the second interface 202 is used for connecting a computer device. When a communication connection needs to be established between the storage device and the computer device, the storage device is connected with the first interface 201 of the intermediate device and the second interface 202 of the intermediate device 200 is connected with the computer device. It should be noted that the number of first interfaces can be more than one, so that the intermediate device can connect multiple storage devices at the same time. The first and second interfaces can be Universal Serial Bus (USB) interfaces. The first interface can also include eMMC (Embedded Multi Media Card) interface for direct access to SD card and TF card, etc., and can include SATA (Serial Advanced Technology Attachment) interface, NVMe (NVM Express), M.2 and other data interfaces for direct access to hard disks, flash memory, SSD storage devices, etc. It should be understood that the structure of the intermediate device shown in FIG. 2A is only used as an example and not as a limitation, and that more or fewer parts may be included in other embodiments, such as the structure shown in FIG. 2B, etc., which will not be repeated here. In FIG. 2B, the first interface 201 can be a slot-type interface. FIG. 2c is an example diagram of the structure form of a storage device with an integrated protection module. The user can select the current protection mode of the protection module through interaction controls, such as by operating controls on the storage device.

Optionally, the target device is a storage device with a protection module, and the protection module may be integrated into the chip (processor), integrated circuit, or hardware of the storage device so that the storage device has the function of a data security protection method in the embodiment of the present application. When the target device is an intermediate device, the data sent by the computer device (or storage device) is forwarded by the intermediate device to the storage device (or computer device), and when the target device is a storage device with a protection module, the computer device (or storage device) directly sends data to the storage device (or computer device), but the protection module in the storage device needs to be handle the data received (or to be sent) for permission control, etc. In this regard, it will not be repeated hereafter. It should be noted that if the target device is an intermediate device with a protection module, the storage device can be a storage device without a protection module.

Optionally, storage devices include but are not limited to USB flash disk (USB flash drive), removable hard disk, hard disk, card reader (SD card, TF card), external optical drives, etc., and storage devices can also have networking functions; Computer device includes, but is not limited to, laptop, desktop computer, embedded devices, IoT device, and industrial control device.

Optionally, the protection module is arranged at an interface of the computer device for connecting the storage device.

Another embodiment of the application provides an intermediate device (or module) connected between a computer and a removable storage device to solve the problem that a removable storage device (e.g., a USB flash disk, an SD card, a removable optical drive, a removable hard disk, etc.) is connected to a computer for copying data, because the current communication protocol and related technology do not restrict the data permissions, thereby generating the problem of data risk.

It can be seen that there are two kinds of interaction logic in the solution provided in the embodiment of the present application: one is the interaction logic as an intermediate device: a computer device sending instructions→an intermediate device performing permission controls→a storage device responding→reading and writing an internal storage medium.

The other is as an integrated device (such as a storage device with a protection module), and the interaction logic is reduced to: a computer device sending instructions→a control chip of a storage device filtering and responding (Hardware integration: protection chip+control chip; Software integration: the control chip has a protection method module+read-write control module)→reading and writing internal storage medium.

As shown in FIG. 1, the data security protection method of the embodiment of the present application comprises steps S101 to S102, and is described in detail as follows:

Step S101: performing permission control on a data interaction instruction sent by the computer device according to a current protection mode of the target device, wherein the data interaction instruction is used for data interaction between the computer device and the storage device.

The above step S101 may comprise: determine the current protection mode when receiving the data interaction instruction sent by the computer device, wherein the current protection mode is one of at least one protection mode preset by the protection module.

Wherein, "performing permission control on the data interaction instruction sent by the computer device" may specifically be:
  judging a data source directed by the data interaction instruction is one of at least one data source specified by the current protection mode;
  judging whether an operation type of the data interaction instruction on data in the data source conforms to an operation type specified by the current protection mode.

The data interaction instruction satisfies the permission requirement corresponding to the current protection mode, when the data source directed by the data interaction instruction is one of at least one data source specified by the current protection mode, and the operation type of the data interaction instruction on data in the data source conforms to an operation type specified by the current protection mode.

In a specific embodiment, if the protection module is an intermediate device or a storage device, and the intermediate device or storage device is equipped with an interaction device, the method provided in this embodiment may also comprise the following steps:
  A. obtaining the target protection mode selected by the user in at least one protection mode in response to the users operation on the interaction device of the first device;
  B. taking the target protection mode as the current protection mode of the protection module;
  wherein the interaction device comprises at least one of the following: a touch screen, a voice interaction device, a plurality of buttons, a slide switch, and an interaction control with at least two selections.

Wherein, the above-mentioned interaction control with at least two selections is, e.g. a knob switch, a switch with multiple stop locations, a switch with multiple toggle positions, and so on.

Optionally, an intermediate device or a storage device with the protection module may also be free of an interaction device. The current protection mode can be pre-set or set in real time. Specifically, it can be set by toggling a switch, remote control, and computer configuration. As an example, in one possible implementation, the target device (such as the intermediate device or storage device with a protection module mentioned above) is provided with a physical switch to select the protection mode, and the current protection mode is selected by toggling the physical switch. In another possible implementation, the target device is provided with a communication unit such as Bluetooth, infrared, or ultra-wideband to be used to connect with the remote-control device, through which the current protection mode is selected. In another possible implementation, the target device communicates with a computer device with global permissions, through which the current protection mode is selected. It should be noted that for the computer configuration mode, it should be set before the storage device interacts with the computer device.

In this step, the protection modes include but are not limited to whole-disk read-only mode, specific file read-write mode, address-limited read-write mode, file-limited read-write mode, decryption read mode, encryption write mode, and logical split disk mode. The whole-disk read-only mode indicates that all files in the storage device are allowed to be read; the read-write mode for specific files indicates that specific files in the storage device are allowed to be read and written; the address-limited read-write mode indicates that the files corresponding to the target sector address in the storage device are allowed to be read and written; the file-limited read-write mode indicates that the files with the characteristics of the target file in the storage device are allowed to be read and written, the decryption read mode indicates decrypting the data in the reading process; the encryption write mode indicates encrypting the data in the writing process; and the logical split disk mode indicates the mode in which the storage device is split and connected to the computer.

More specifically, the at least one protection mode may include, but is not limited to: read-only mode, specific file mode, blank file mode, sector limited mode, file type restriction mode, encryption write mode, decryption read mode, manual confirmation mode, logical split disk mode, hardware type access protection mode, data information protection mode for storage device, device privacy protection mode, backup mode, etc. Wherein, Read-only mode: the data source specified in the read-only mode is the overall data of the storage device, and the specified operation type is read-only type; The whole-disk read-only mode above can be understood as the read-only mode.

Specific file mode: the specified data source in the specific file mode is at least one specific file in the storage device, and the specified operation type is a read, write, or read-write type.

Blank file mode: the data source specified in the blank file mode is at least one blank file automatically created and/or manually created in the storage device, and the specified operation type is write type or read-write type.

Sector limited mode: the data source specified in the sector limited mode is at least one specific sector range in the storage device, and the specified operation type is a read type, a write type, or a read-write type.

File type restriction mode: The data source specified in the file type restriction mode is at least one specific type of file in the storage device, and the specified operation type is read, write, or read-write.

Encryption write mode: the data source specified in the encryption write mode is data in at least one first sector range, at least one first file and/or at least one type of file in the storage device, and the specified operation type is a write type.

Decryption readout mode: the data source specified in the decryption readout mode is the data in at least one second sector range in the storage device, at least one second file, and/or at least one type of file, and the specified operation type is a read type.

Manual confirmation mode: the data source specified in the manual confirmation mode is the data in at least one third sector range in the storage device, at least one third file and/or at least one type of file, and the specified operation type is a read-write type.

Logical split disk mode: the data source specified in the logical split disk mode is at least one split disk in the storage device, and the specified operation type is a read type, or a write type, or a read-write type.

Hardware type access protection mode: the hardware type access protection mode does not have a specified data source, and in the hardware type access protection mode, determines whether the storage device is a specified device type.

Data information protection mode for the storage device: the data information protection mode for storage device does not have a specified data source, in the data information protection mode for the storage device, the data information of the storage device sent to the computer device is protectively processed, and the data information of the storage device after protective processing is sent to the computer device in the enumeration phase.

Device privacy protection mode, in which the device privacy protection mode does not specify a data source, and in the device privacy protection mode, the device privacy information sent to the computer device is protectively processed.

Wherein the protective processing may include, but is not limited to: protective processing for hardware characteristic parameters of storage devices (such as packaging, deletion, etc.), protective processing for storage information related parameters of storage devices, and protective processing for device information of storage devices (such as manufacturer information, etc.) to protect the device privacy of storage devices, etc.

Backup mode: the backup mode does not have a specified data source, in the backup mode, the data written to the computer device is synchronously written to the specified backup storage area, and/or the protection module reads the data corresponding to sector addresses written by the computer device and writes them to the specified backup storage area before executing the write instruction, and/or the data of the important data sector of the connected storage device is backed up and stored in the specified backup storage area; If the restore is triggered, the data in the specified backup storage area is read out and written to the original data sectors of the storage device.

Each of the above protection modes can also be combined in a variety of modes. For example, the logical split disk mode, the specific file mode, and the sector limited mode can be combined, so that the current protection mode is the combined mode after the combination of these three modes. In this combination mode, you can limit the operation to specific files after logical splitting, and through sector limiting, files other than specific files cannot be read or written.

What needs to be added here is that the permission control in the present embodiment is the process of controlling the data interaction between the computer device and the storage device based on the read-write range corresponding to the current protection mode. It should be understood as permission control in a broad sense, that is, as long as the purpose of controlling data interaction can be achieved, it belongs to the permission control defined in the embodiment of the present application.

Optionally, read/write permission include read-only, write-only, and read-write permissions. In different protection modes, the read/write permission can be read-only, write-only, or read-write permission for different objects. For example, in whole-disk read-only mode, the read/write permission is read-only for all files on the storage device. For a specific file read-write mode, the read/write permission is at least one of read-only, write-only, and read-write permissions for the specific file. The read/write permission of other modes can be derived based on the above examples, and will not be repeated here.

Step S102, responding to the data interaction instruction if the data interaction instruction satisfies the permission requirement corresponding to the current protection mode.

Specifically, responding to the data interaction instruction when the data source directed by the data interaction instruction is one of at least one of the data sources specified in the current protection mode and the operation type by the data interaction instruction on the data in the data source conforms to the operation type specified by the current protection mode.

In this step, a data interaction instruction includes a data read instruction sent by a computer device to read data from a storage device, and a data write instruction to write data to a storage device. When the read/write permission is the read permission, the data read instruction can be supported; When the read/write permission is the read permission, the data write instruction can be supported; When the read/write permission is read-write, data read instruction and data write instruction can be supported.

In a possible embodiment, if the target device is an intermediate device with a protection module, the intermediate device receives data an interaction instruction sent by the computer device, and perform permission control on the data interaction instruction based on the current protection mode, and forwards the data interaction instruction to a storage device if the data interaction instruction meets the permission requirements, so that the storage device performs the read/write operation corresponding to the data interaction instruction. In another possible embodiment, if the target device is a storage device with a protection module, the storage device receives data an interaction instruction sent by the computer device, and perform permission control on the data interaction instruction through the current protection mode of the protection module, and the storage device performs the read/write operation corresponding to the data interaction instruction if the data interaction instruction meets the permission requirements.

It should be noted that the present application protects computer device and storage devices through a variety of protection modes, which can meet the application needs of users in different protection scenes; At the same time, the protection model of the target device is used to perform permission control and improve the security of computer devices and storage devices.

Figure 3:
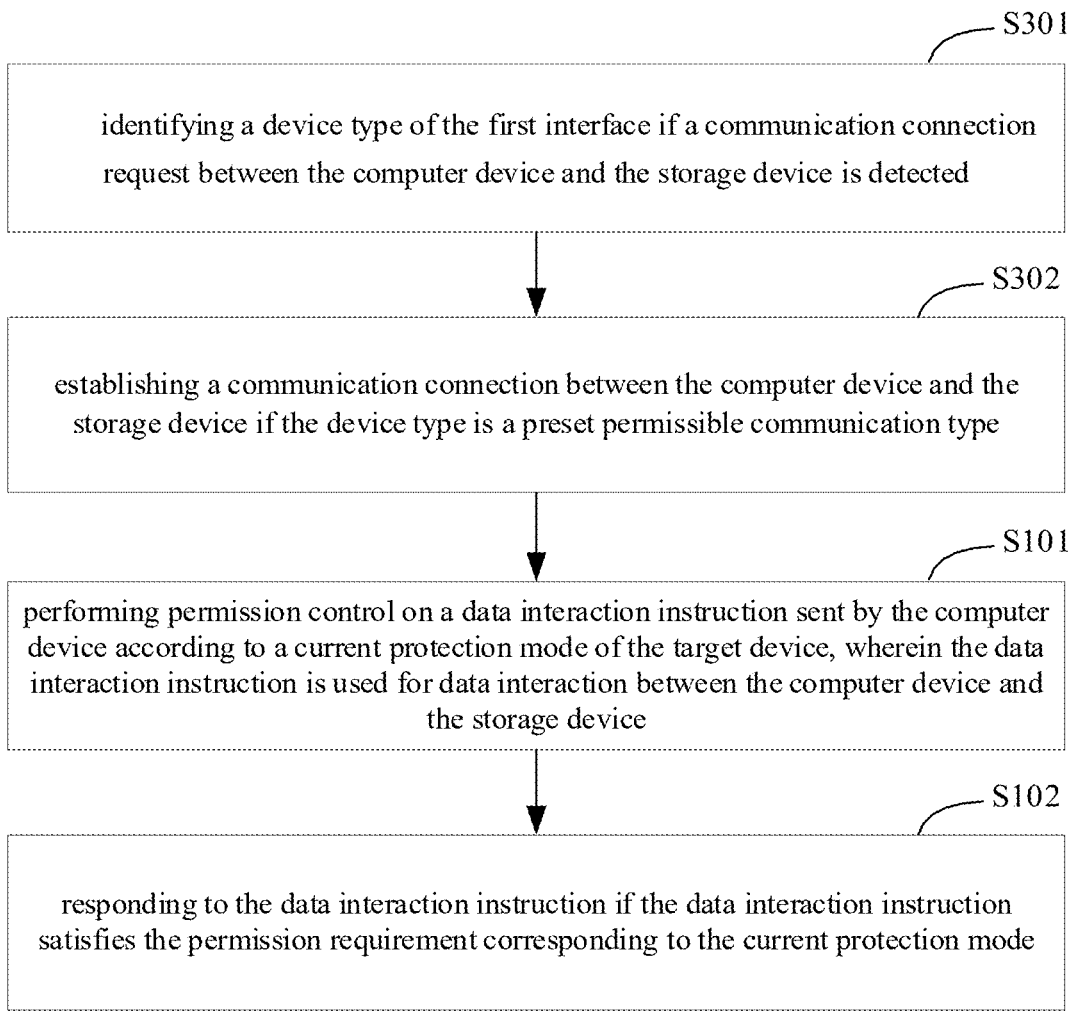
FIG. 3 is a flow chart of the data security protection method shown in the second embodiment of the present application.

In some embodiments, based on the embodiment shown in FIG. 1, FIG. 3 is a flow chart of the data security protection method of the second embodiment of the present application; The same steps as in FIG. 1 will not be repeated here. As shown in FIG. 3, the method further comprises:

Step S301, identifying a device type of the first interface if a communication connection request between the computer device and the storage device is detected;

Step S302, establishing a communication connection between the computer device and the storage device if the device type is a preset permissible communication type.

In the present embodiment, the preset permissible communication types include, but are not limited to, the mass storage device type or other preset security types. Optionally, the device type of the first interface can be determined by the read descriptor parameter. For the target device that is an intermediate device with a protection module, the descriptor parameters of the storage device are read from the storage device through the first interface of the intermediate device. For the target device that is a storage device with a protection module, the storage device can retrieve its pre-stored descriptor parameters.

In some embodiments, if the target device is an intermediate device with a protection module, the intermediate device is provided with a first interface for connecting a storage device and a second interface for connecting a computer device; Before the step S301, the following is further comprised:

detecting the communication connection request between the computer device and the storage device when the first interface is connected to the storage device, and the second interface is connected to the computer device.

In this embodiment, when an intermediate device is connected with a storage device and a computer device respectively, the intermediate device is powered on, and after analyzing the data information of the storage device and determining that it meets the requirements (such as determining that the storage device belongs to the device type specified in the current protection mode), the intermediate device sends an enumerable signal to the computer device, and then the computer device initiates an enumeration action to obtain the data information in the storage device. Based on the current protection mode, the intermediate device performs protective processing on the data information of the storage device, and feeds back the data information of the storage device after protective processing to the computer device, so as to establish a communication connection between the computer device and the storage device.

In some embodiments, if the target device is a storage device with a protection module, before the step S301, the following is further comprised:

detecting the communication connection request with the computer device when the storage device is connected to the computer device.

In this embodiment, after the storage device is physically connected with a computer device, in order to realize data interaction between the two, the computer device sends a communication connection request to the storage device, or the storage device sends a communication connection request to the computer device, and listens to the communication connection request through the protection module on the storage device.

It should be noted that because the storage device may be implanted with malicious programs such as Trojan viruses in other ways for some reasons, and the storage device itself does not discover the malicious program when it is not powered on, after the storage device is physically connected with the computer device and the storage device is powered on, in order to ensure the security of the computer device, the communication connection request between the computer device and the storage device is listened to so that the storage device can be identified subsequently.

In some embodiments, after the step S301, the following is further comprised:

interrupting the communication connection request if the device type is a preset prohibited communication type.

In this embodiment, the preset prohibited communication types include, but are not limited to, human interface device (HID), composite device with mass storage device (Mass Storage) and HID, or composite device types with other functions. Wherein a human interface device is a device class definition, HID devices such as a keyboard, mouse, game controller, joystick, barcode reader, volume control on headphone/speaker, auxiliary display, sensor, etc. Optionally, if the device type is a preset prohibited communication type, an interception information is also fed, and the interception information is used to indicate that the storage device is a prohibited communication device.

Optionally, the interception information is used to instruct the computer device to prompt via a drive letter string, for example, the computer device displays that the connected device is named "Rogue Device". There is an indicator light on the target device, and the interception information can be displayed through the indicator light. For example, indicator flashing (or turning red) means that the storage device currently connected to the storage device is forbidden device.

It should be noted that in the present embodiment, the illegal device can be avoided from being disguised as a keyboard and mouse device and other access to the computer device by verifying the device type of the storage device, so as to avoid the illegal device from causing security risks to the computer device and improve the security of the computer device.

In some embodiments, the step S302 comprise:

sending target hardware characteristic parameters of the storage device to the computer device, wherein the target hardware characteristic parameters are used to establish a communication connection between the computer device and the storage device.

In this embodiment, when the target device is an intermediate device, the target hardware characteristic parameter of the storage device is obtained, and the target hardware characteristic parameter is forwarded to the computer device; when the target device is a storage device with a protection module, the pre-stored characteristic parameters of the target hardware are sent to the computer device.

Optionally, the hardware characteristic parameters are parameters used to characterize the characteristics of the storage device, which include but not limited to the device manufacturer and product ID, device attribute, class used by the interface (such as mass storage device), endpoint attribute (such as bulk transfer), character string, transmission rate, power demand, etc. When the device is connected, the hardware characteristic parameters need to be verified. When it is determined that the hardware characteristic parameters meet the requirements for establishing a communication connection, the computer device establishes a communication connection with the storage device according to the hardware characteristic parameters.

In an embodiment, the target hardware characteristic parameter may be a hardware characteristic parameter directly obtained from a storage device. In another embodiment, the target hardware characteristic parameter may be a characteristic parameter after filtering the hardware characteristic parameter directly obtained by a storage device. In yet another embodiment, the target hardware characteristic parameter may be a preset hardware characteristic parameter that matches the hardware characteristic parameter obtained directly by the storage device. In yet another embodiment, the characteristic parameters of the target hardware may also be directly preset by the protection module.

In some embodiments, the sending the target hardware characteristic parameter of the storage device to the computer device comprises:

obtaining a target hardware characteristic parameter corresponding to the device type from a preset parameter template according to the device type of the storage device;

sending the target hardware characteristic parameter to the computer device.

In this embodiment, according to the device type of the storage device, a preset hardware characteristic parameter corresponding to the device type is obtained from a preset parameter template, and the preset hardware characteristic parameter replaces the hardware characteristic parameter obtained from the storage device as the target hardware characteristic parameter. Optionally, the preset parameter template includes preset hardware characteristic parameters corresponding to different device types that can be read by a computer and allow communication to be established.

It should be noted that, in this embodiment, the hardware characteristic parameters of the storage device are replaced and modified according to the hardware characteristic parameters corresponding to the device type, so as to protect the hardware characteristic parameters of the storage device from being acquired, so as to achieve secure access while protecting the privacy of storage devices.

In some other embodiments, the sending the target hardware characteristic parameters of the storage device to the computer device comprises:

obtaining hardware characteristic parameters of the storage device;

screening the hardware characteristic parameter according to the preset parameter type, so as to determine the target hardware characteristic parameter corresponding to the parameter type;

sending the target hardware characteristic parameter to the computer.

In this embodiment, the hardware characteristic parameters are screened to retain the target hardware characteristic parameters corresponding to the preset parameter types, and the screened target hardware characteristic parameters that meet the preset parameter types are sent to the computer device, and other parameters as unknown parameters are not sent to the computer device, so as to avoid sending illegal parameters of the storage device to the computer device, thereby ensuring the data security of the computer device.

In order to avoid sending illegal parameters of the storage device to the computer device, thereby ensuring the data security of the computer device, the embodiment of the present application provides a mechanism to simulate the characteristic parameters of the storage device, that is, the method provided by this embodiment may also comprise the following steps:

Step 11, simulating a control instruction of the computer device to obtain a first characteristic parameter of the storage device before establishing a communication connection between the computer device and the storage device through the protection module;

Step 12, determining whether the storage device is the device type specified by the current protection mode based on the first characteristic parameter; if so, performing step 13; if not, performing step 15 (see below);

Step 13, generating a second characteristic parameter that simulates the storage device based on the first characteristic parameter;

Step 14. sending the second characteristic parameter to the computer device, so as to establish a communication connection between the computer device and the storage device.

Wherein, in the above-mentioned step 13, "generating a second characteristic parameter that simulates the storage device based on the first characteristic parameter" comprises:

131, obtaining a preset parameter template; obtaining at least one parameter item that can characterize the device of the device type from the preset parameter template according to the device type of the storage device reflected by the first characteristic parameter, to obtain the second characteristic parameter; or 132, screening parameter items in the first characteristic parameter, and obtaining the second characteristic parameter based on at least one screened parameter item.

The parameter template replacement described above further protects computer device and hardware features. That is, before formal connection to the computer, the parameter template is used to replace or screen. Using a fixed template can prevent malicious or unknown and risky parameters in the hardware descriptor of the connected storage device from attacking the computer. For example, a storage device may have malicious hardware parameters. When a computer is connected, security software with a buffer overflow vulnerability may execute malicious instructions contained in the malicious hardware parameters when detecting the descriptor. By replacing the parameter characteristics, the hardware parameter values such as the vendor ID, device ID, and character string of the connected storage device can also be modified through the protection module. There are usually two usage scenarios: one is to protect the hardware characteristic parameters of the storage device from leaking, such as vendor ID, device ID, string, etc.; the other is that some security software of computer device can recognize the existence of the protection module and perform access control of USB devices, USB devices with non-specific USB hardware parameters are not allowed to access, and set the hardware parameters of the protection module to allow access, which can force the access of storage devices to access computer devices only through the protection module, and do not allow storage devices to directly access to protect the data security of computer device.

The method provided by the embodiment further comprises:

Step 15, terminating the communication with the storage device when determining that the storage device is not the device type specified by the current protection mode based on the first characteristic parameter;

Step 16, sending a first information to the computer device, so that the computer device displays a virtual disk identifier and/or abnormal device prompt information based on the first information;

wherein, if a virtual disk identifier is displayed, the first information also includes text corresponding to the first characteristic parameter, and the text is saved in the root folder corresponding to the virtual disk identifier. What needs to be added here is that the above steps 11 to 16 may be steps in the enumeration phase in the interaction process between the computer device and the protection module. Of course, in the enumeration phase, in addition to performing protective processing on the first characteristic parameter of the storage device, protective processing may also be performed on the first storage information related parameters of the storage device. This part uses the method of technical point dismantling to explain each of the single technical points. Hereinafter, there will be an overall embodiment to describe the solution provided by the embodiment of the present application in detail. For example, the interaction process between the computer device and the protection module includes: a preparation phase, an enumeration phase, and a data interaction phase; performing permission control on a data interaction instruction sent by the computer device according to a current protection mode of the target device, wherein the data interaction instruction is used for data interaction between the computer device and the storage device, and if the data interaction instruction meets the permission requirements corresponding to the current protection mode, responding to the data interaction instruction is a step in the data interaction phase.

Figure 4:
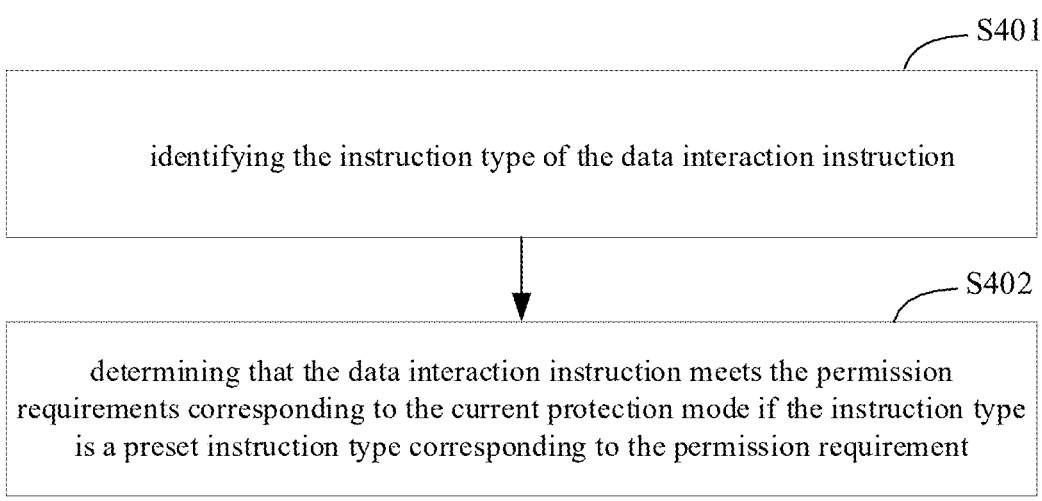
FIG. 4 is a specific flow chart of step S101 shown in an embodiment of the present application.

In some embodiments, based on the embodiment shown in FIG. 1, FIG. 4 is a specific flow chart of step S101. As shown in FIG. 4, step S101 comprises:

Step S401, identifying the instruction type of the data interaction instruction;

Step S402, determining that the data interaction instruction meets the permission requirements corresponding to the current protection mode if the instruction type is a preset instruction type corresponding to the permission requirement.

In this embodiment, the instruction type includes a data read instruction sent by the computer device for reading data in the storage device, or a data write instruction for writing data to a target location in the storage device. Optionally, the protection module analyzes the data interaction instruction based on the preset analysis rules to identify the actual interaction function of the data interaction instruction, and determines the instruction type according to the actual interaction function, so that the instruction type can be used as the identification basis to directly effectively perform permission control on the data interaction instructions sent by the computer device, and prevent the data interaction instructions from illegally reading and writing the storage device through camouflage and other methods, thereby improving the security of the storage device.

For example, the current protection mode is a read-only mode for file A, and the instruction type corresponding to the read-only mode should be a data read instruction, so if the instruction type is a data write instruction for file A, this instruction type cannot satisfy the permission requirements of the current protection mode; if the instruction type is a data read instruction for file A, then this instruction type meets the permission requirements of the current protection mode.

Figure 5:
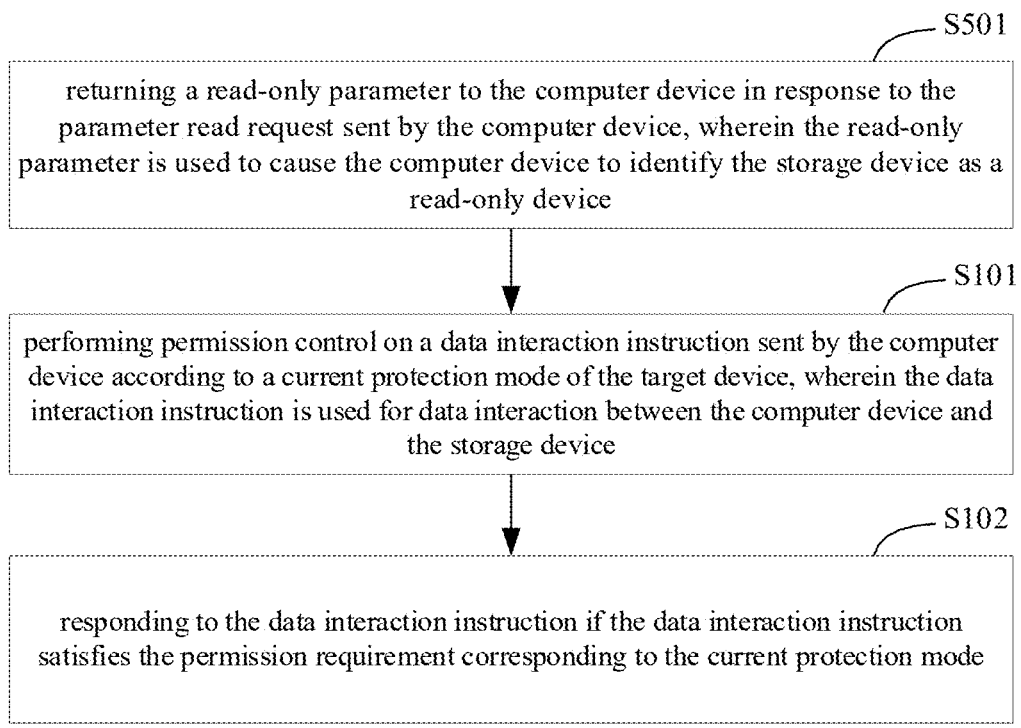
FIG. 5 is a flow chart of the data security protection method shown in the third embodiment of the present application.

In some embodiments, based on the embodiment shown in FIG. 1, the protection mode is a read-only mode, and FIG. 5 is a flow chart showing the data security protection method of the third embodiment of the present application; The same steps as in FIG. 1 will not be repeated. As shown in FIG. 5, the method further comprises:

Step S501, returning a read-only parameter to the computer device in response to the parameter read request sent by the computer device, wherein the read-only parameter is used to cause the computer device to identify the storage device as a read-only device.

In this embodiment, the read-only parameter is used to cause the computer device to identify the storage device as a read-only device. For example, when the computer device establishes a communication connection with the storage device and reads the read-write status of the device from the storage device, in the read-only mode, the target device feeds back a read-only parameter to the computer device to indicate that the storage device is read-only device, so that the computer device can recognize it as a read-only device, and the computer device will send only data read instructions to the storage device under normal circumstances, and to reduce the number of invalid instructions sent other than data read instructions.

Optionally, the above read-only mode can be compatible with other read-write modes, such as any one of the whole-disk read-only mode, read-only mode under specific file read-write mode, read-only mode under limited read-write mode, and the read-only mode under the file limited read-write mode.

The specific implementation effect of read-only mode:

Let the computer device identify a read-only device, and when the computer sends a request to obtain the read-write status of the device, the protection module feeds back the parameters of the read-only status. For example, when the computer device sends a configuration command (MODE 6) for obtaining the storage device, the protection module returns response information indicating that the storage device is a read-only device. The computer device will set the device as a read-only device at the driver layer, and does not allow data to be written.

Specifically, when a SCSI (a smart universal interface standard) or UFI (command block protocol) command received by the protection module and sent by the computer device is 0x1A (MODE 6) request, the protection module replies with parameter data with read-only status. For example, as a normal storage device (such as a USB flash disk), it will reply to the "0x03 0x00 0x00 0x00" status as read-write. In the read-only protection mode, replace the second bit (count from bit 0) with 0x08, and reply "0x03 0x00 0x08 0x00". After the computer device recognized the device, set it as a read-only device. For example, there is no button to create a folder on the interface, and the files of the computer device cannot be dragged and copied to the storage device.

Make the computer device unable to send the write data instruction. The protection module performs whitelist filtering on all communication commands sent by the computer device, and only allows information related to initialization and reading data to be forwarded to the storage device. Other non-whitelisted information (such as SCSI or UFI command code which is 0x28 (write instruction)) is directly discarded; or information of write operation (such as SCSI or UFI command code which is 0x28 (write instruction)) is prohibited from sending to the storage device to ensure storage device is always in a non-writable status at the communication layer, which effectively prevents malicious software from forcibly writing data to the storage device by bypassing the restrictions of the operating system.

Figure 6A:
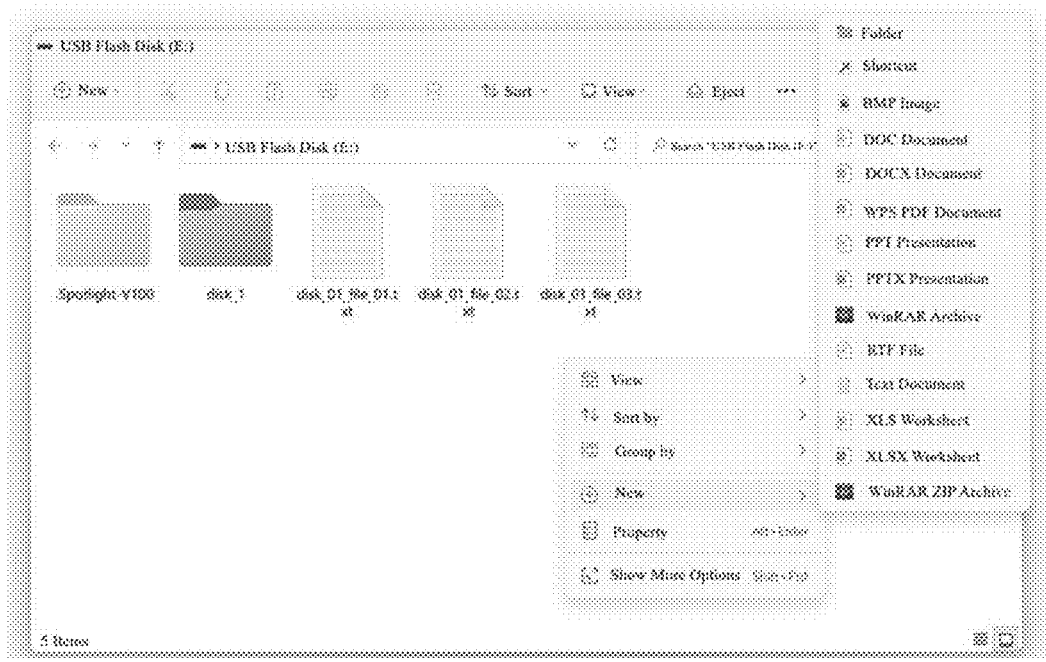
FIG. 6A is an example diagram showing a USB flash disk in the unlimited (readable-writable) status.

FIG. 6A is an example diagram showing a USB flash disk in the unlimited (readable-writable) status. In the unlimited (readable-writable) status, the contents of files on disk can be deleted, added, and edited. For example, as shown in FIG. 6A, there is a menu button for selecting "New file", and the created file can be selected.

Figure 6B:
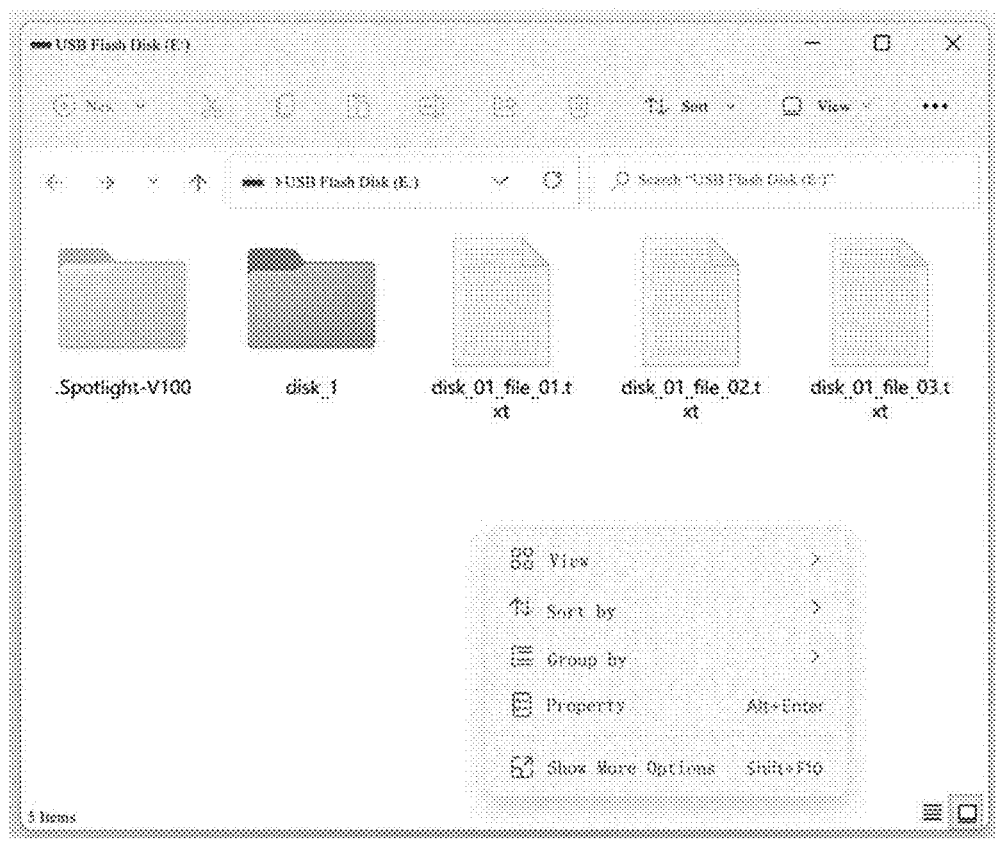
FIGS. 6B to 6D are schematic diagrams which are corresponding to setting an external USB flash disk to a whole-disk read-only mode.
Figure 6C:
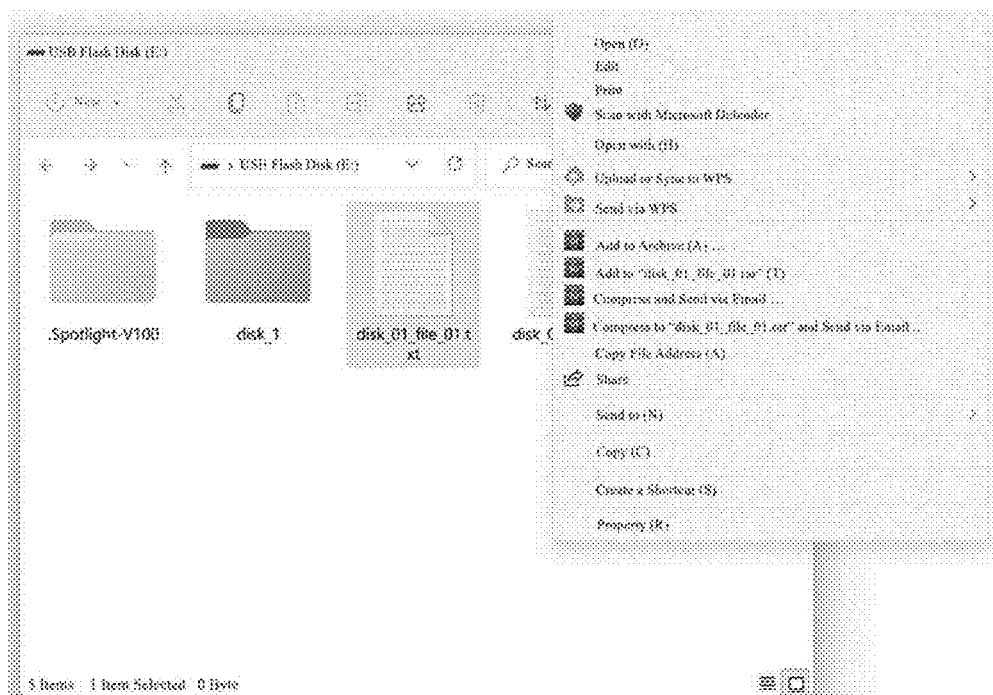
Figures 6D, 7:
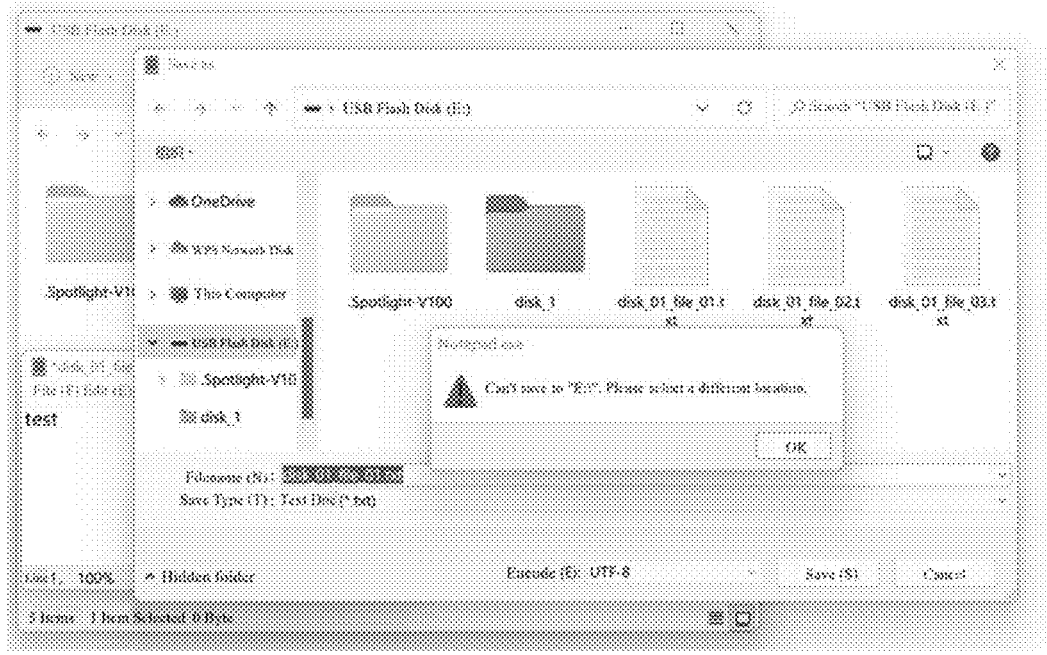
FIG. 7 is a specific flow chart of step S102 shown in an embodiment of the present application.

FIGS. 6B-6D are example diagrams showing the whole-disk read-only mode. As shown in FIG. 6B, in the whole-disk read-only mode (the intermediate device sets the connected removable storage medium to read-only), and there is no menu button for "creating" file in the called menu (such as clicking the right mouse button, etc.). As shown in FIG. 6C, in the whole-disk read-only mode, there is no "delete" menu button in the called menu. In the whole-disk read-only mode, the file cannot be edited and written, as shown in FIG. 6D, a prompt window is displayed. The examples corresponding to FIGS. 6B, 6C, and 6D are at the operating system and are read-only configurations level based on read-only parameters. If the user writes forcibly, the protection module also intercepts the written data interaction instruction. The "whole-disk" of whole-disk read-only has a special meaning. It does not refer to the real whole hard disk, but refers to the "whole-disk" of a connected the data source. For example, in the following logical split disk and specific folder modes, it can also be set to only read.

In some embodiments, based on the embodiment shown in FIG. 1, FIG. 7 is a flow chart of specific steps of step S102. As shown in FIG. 7, the step S102 comprises:

Step S601, performing read/write operation on the target file in the storage device in response to the data interaction instruction, wherein the read/write operation include at least one of a read operation and a write operation.

In this embodiment, the read operation includes reading the file data (that is, the data corresponding to sector address) in the target file, and returning the file data to the computer device; the write operation includes writing the data carried in the data interaction instruction to the target file (that is, the corresponding sector address). The target file is a file displayed on a computer device and allowed to be read and written by the computer device, including but not limited to a specific file based on sector mapping, a file corresponding to a preset sector address, and a file with preset file characteristics.

Optionally, when the target device is an intermediate device, if the data interaction instruction is a data read instruction, the intermediate device forwards the data read instruction that meets the permission requirements to the storage device, so as to perform a read operation on the target file in the storage device. When the target device is a storage device with a protection module, if the data interaction instruction is a data read instruction, the storage device performs a read operation in its target file according to the data read instruction.

It should be noted that, in this embodiment, the target file is used as the object of the read-write operation, so as to limit the read-write operation of the computer device to the read-write range under the current protection mode, thereby realizing effective control of the read-write operation and improving the security of the computer device and the computer device.

In some embodiments, if the protection mode is a specific file read-write mode, the step S601 includes:

mapping the sector address of the target file to the target address in response to the data interaction instruction, wherein the target file is a file displayed on the computer device;

performing read/write operation on the target file based on the target address.

In this step, the target file is a specific file, which is a file that is pre-selected by the user or automatically created by the protection module and allowed to be read and written by the computer device, which can be displayed to the user on the computer device. Mapping a specific file to a target address refers to mapping the sector address of a specific file in a storage device to a target address.

Optionally, the target address may be a certain sector address in the target device, or a certain sector address in the storage device different from the specific file, or a certain sector address of other storage devices connected to the target device, so that the computer device can only recognize the existence of a specific file (that is, only the specific file is displayed to the user on the computer device), so that only the specific file can be read and written. The term 'specific file' should be explained in an expanded manner, and the specific file can be a minimum-level file (for example, an A.txt text file), and the specific file can also be a folder.

Optionally, the specific file can be pre-selected, for example, the user can select the file through a computer device with global permission, and the specific file can also be automatically created by the target device. In some embodiments, when the storage device is connected to the computer device with global permission through the target device, the specific file can be put into a temporary sector area created by the target device to complete the file selection, so that the specific file can be mapped with the storage device.

A specific file read-write mode includes at least one of read-only mode, write-only mode, and read-write mode for a specific file. For example, if the specific file read-write mode is a read-only mode for a specific file, the target device will screen the instruction type of the data interaction instruction sent by the computer device, and only execute the data read instruction. For other types of instructions other than read instruction included in the data interaction instructions, the other types of instructions are not executed and the information that the execution has been completed is fed back to the computer device. If the read-write mode of the specific file is the readable and writable mode for the specific file, the target device responds to both the read instruction and the write instruction in the data interaction instruction sent by the computer device.

For example, in the specific file read-write mode, in the preparation phase, the target device pre-reads the sector address range of the root directory of the storage device (including the first address to the last address of the sector, and the order of address locations can be discontinuous) and the specific files data sector address range. In the data interaction phase, when the data interaction instruction is received, if the protection module analyzes that the sector address to be read and written by the data interaction instruction is within the address range of the root directory, it will read and write within the address range corresponding to the specific file, while the data in the original root directory cannot be accessed.

Optionally, the read and write of specific files can be realized through the read and write limit: the target device prohibits read and write for the data area of the non-specific file by establishing the read and write limit area, and for other file s than the specific file, it is only allowed to write in blank data area.

It should be noted that in this embodiment, a specific file is selected and mapped to the target device so that the computer device can only recognize the existence of the specific file, preventing the computer device from directly reading or writing the data of the non-specific file in the storage device, thereby protecting the data security of the storage device.

That is, when the current protection mode is a specific file mode, the method provided in this embodiment further includes the following steps:

Step 31, determining at least one specific file or folder in the storage device when the current protection mode is the specific file mode;

Step 32, obtaining address information of the at least one specific file or folder;

Step 33, establishing a mapping relationship between the address information of the at least one specific file or folder and the address of the root directory.

When it is set to the specific file read-write, the user first creates a fixed specific folder in the storage device, or the protection module automatically creates a fixed specific folder in the storage device, and can pre-store the folder or file data that needs to be read by the computer device, so that the computer device can read data, modify data or copy files, and can also set a read-only mode. When it is set to read and write to a blank folder, the protection module will automatically create a new folder in the storage device as a specific folder, so that the computer device can get the data of a "blank disk" when reading the root directory. It can cause the computer device to intelligently read and write specific files or folders that the user allows to operate, or can automatically create a new blank folder for the computer device to only write new files, but cannot read existing files, etc. Wherein, the available space is the remaining space of the actual storage device.

Figure 8:
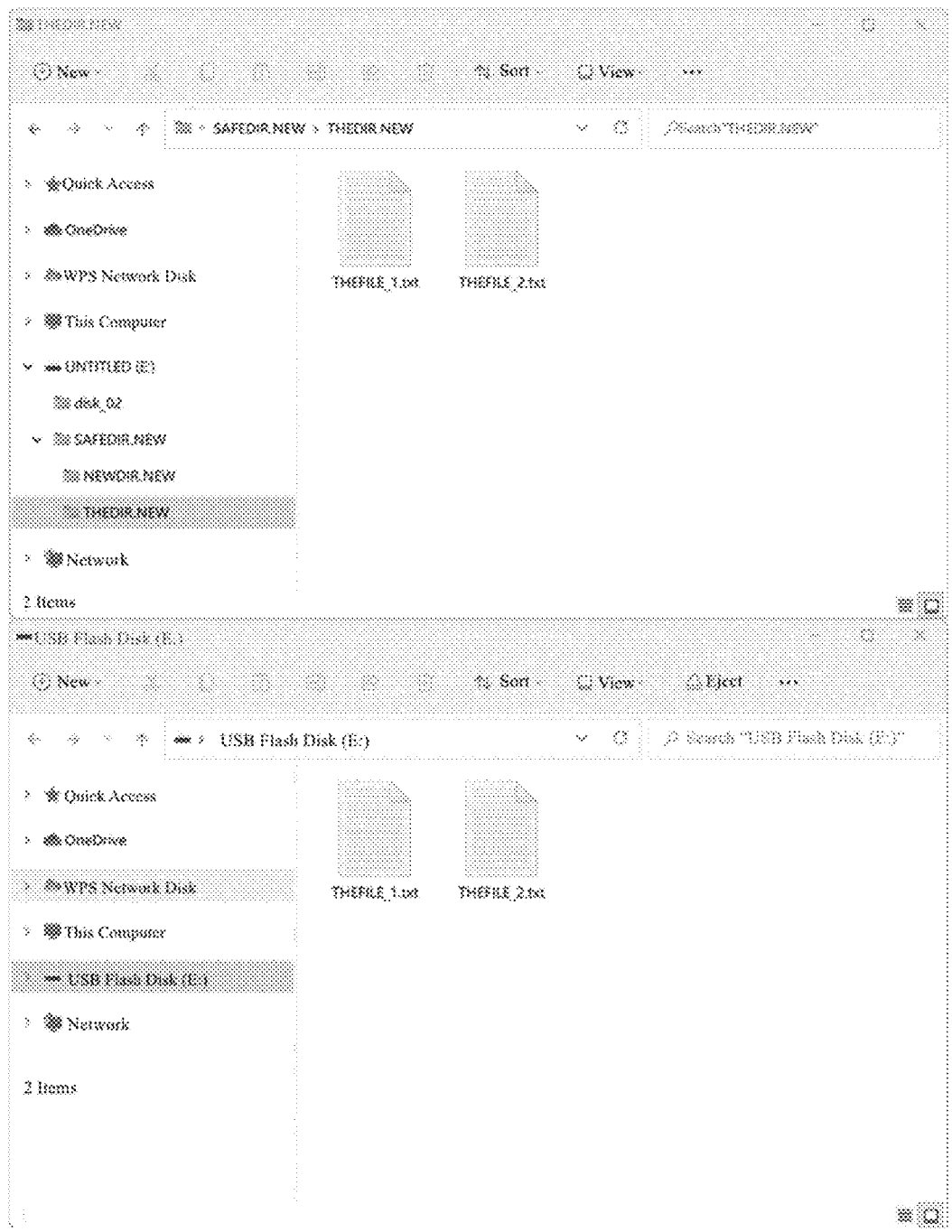
FIG. 8 is a comparison diagram, in which the upper part is the display of files on a computer device after a storage device without protection module is directly connected to the computer device, and the lower part is the display of the files on a computer device after a storage device with a protection module is connected to the computer device.

Referring to the comparison FIG. 8, the storage device not connected with the intermediate device or the storage device without the integrated protection module is directly connected to the computer device, and all the files in the root directory of the storage device are displayed first. Then click to open the "root directory/SAFEDIR.NEW/THEDIR.NEW" folder, and the files in this folder are displayed: THEFILE_1.txt, THEFILE_2.txt. Assuming that the solution provided by the embodiment of the present application is adopted, the "root directory/SAFEDIR.NEW/THEDIR. NEW/" folder is set as a specific folder. After the storage device is connected to the computer device through the protection module, only the two files of "THEFILE 1.txt" and "THEFILE 2.txt" in the "root directory/SAFEDIR.NEW/THEDIR.NEW/" folder can be displayed on the computer device and the upper directories and other files are not displayed.

It can be seen that the method provided in this embodiment may also include the following steps:

After the computer device establishes communication with the storage device and receiving a request from the computer device to read the root directory address of the storage device, determining address information of at least one specific file or file that has a mapping relationship with the root directory address based on the mapping relationship to read data corresponding to the address information.

The above-mentioned process for establishing a specific folder mapping by the protection module is described here:
1. The protection module reads the information of the storage device in advance, and obtains the address of the first sector of the root directory and the set of sector addresses;
2. If it is the specific folder mode, analyze the sector address of the root directory, according to the file system protocol, according to the file name, file path and other file characteristics of the specific folder, find the first sector address and the sector addresses set of the specific folder;
3. If it is a blank specific folder mode, then according to the file system protocol, according to the preset file path, file name and other rules, create a new folder as the first sector address and the sector address set of the specific folder.
4. Establish a mapping relationship between a sector address of a specific folder (or a storage data space addresses set) and a root directory sector address (or a storage data space addresses set). When the computer device requests to read the data corresponding to sector address of the root directory, the data corresponding to the mapped specific folder sector address are returned. For example, in the FAT file system, the set of sector addresses is the set of addresses of all sectors corresponding to the cluster chain of a specific folder or root directory. Specifically:
4.1. Based on the mapping between sector addresses. For example, the address of the first sector of the root directory of the storage device is Sector 17348. When the address of the first sector of the specific folder is Sector 17396, when the computer device sends an instruction to read Sector 17348, the protection module reads the data of Sector 17396 of the storage device and returns it. For example, the second sector address of the root directory of the storage device is Sector 17349. When the address of the second sector of the specific folder is Sector 17397, when the computer device sends an instruction to read Sector 17349, the protection module reads the data of Sector 17397 of the storage device and returns it.
4.2. Replacement based on the file allocation table. The file allocation table is all sets used to record sector addresses (the specific records are clusters or blocks divided by the file system) where the specific file content data is located. Generally, it is a chain structure (the cluster position is fixed, and the previous cluster records the cluster number of the next cluster). The computer device reads and writes file data based on the sector addresses recorded in the file allocation table.

For example, the addresses recorded by the root directory data of the storage device are: the 3rd cluster (recording the 4th cluster), the 4th cluster (recording the 5th cluster), and the 5th cluster (recording end mark). The addresses recorded in the specific folder data are: the 6th cluster (recording the 7th cluster), the 7th cluster (recording the 8th cluster), and the 8th cluster (recording end mark). When the computer device sends the instruction to read the sector data of the file allocation table, the protection module reads the data of the file allocation table of the storage device, replaces it with being in the 3rd cluster (recording the 7th cluster) and return it. For example, when the computer reads the second cluster of the cluster linked list of the root directory data (the data of the first cluster can pass the mapping between sector addresses), it directly jumps to the cluster chain of the specific folder data (the second cluster of the specific folder) Cluster), further read the sector address of the specific folder data.

4.3. Replacement based on file system boot information. The file system boot information generally stores the address (such as cluster number) of the content data of the first directory. When the computer device sent an instruction for reading the file system boot information sector data, the protection module reads the boot information sector data of the storage device, replaced the first directory address with being in the 6th cluster (recording the 7th cluster) and return it, so that the computer immediately takes the data beginning with the 6th cluster (the first cluster of the specific folder data) as the root directory data.

It can be seen that the address information of the at least one specific file or folder includes: the first sector address of at least one specific file or folder; or the cluster or block information recorded in the file allocation table for at least one specific file or folder.

The above-mentioned file system boot information sector address and file allocation table sector address are based on the file system and are obtained by the protection module pre-reading and analyzing data of the storage device.

In some embodiments, the target file includes an existing specific file or preset file of the storage device, or a file automatically generated before the computer device establishes a communication connection with the storage device.

In this embodiment, the existing characteristic file is a file permanently present in the storage device, and the preset file can be a blank file, that is, any existing data in the storage device will not be displayed in the preset file; the preset file can also be preset files containing non-critical data. The preset file can be automatically created before the storage device is connected to the computer device, or it can be an original blank folder of the storage device, or a temporary folder generated by the target device.

In one implementation, in case of the preset file being a blank file, there is no readable file data in it, so the corresponding file data cannot be read. When the write instruction is received, write data in the blank file (that is, the corresponding sector address) according to the write instruction. For the data successfully written to the blank file by the computer device in this data interaction, it can be used by the computer device Identify and read. In this embodiment, by creating a mapping between the blank file and the target device, the computer device cannot read the file data in the original data area in the storage device, and the blank file is read and written, thereby limiting the read/write permissions of the computer device to protect the data security of storage devices.

Optionally, when writing data into the preset file, the computer device may display the written data, or may not display the written data.

Also as mentioned above: when it is set to specific file read-write, the user first creates it in the storage device, or the protection module automatically creates a fixed specific folder in the storage device. Here is an explanation of the protection module automatically creating a fixed specific folder in the storage device. That is, the execution subject protection module of the method provided in the embodiment of the present application also has the function of automatically creating a specific folder. Specifically, the method provided in this embodiment also includes the following steps:

Step 21, outputting prompt information indicating whether to set a blank file or folder when the current protection mode is a specific file mode;

Step 22, creating a file or folder in the storage device as the specific file or folder corresponding to the specific file mode in response to the confirmation instruction of the user for the prompt information of setting a blank file or folder;

Step 23, obtaining at least one file or folder specified by the user in response to the users negative instruction for the prompt information of setting blank files or folders, and using the at least one file or folder specified by the user as the corresponding specific file mode specific file or folder.

In a specific scenario, after a specific file mode is selected, the carrier of the protection module, such as storage device, intermediate device, computer device, trusted device and other devices with interactive modules, will output prompt information whether to set a blank file or folder. If the user gives a confirmation instruction to the prompt information for setting a blank file or folder, a file or folder is created in the storage device as the specific file or folder corresponding to the specific file mode. If the user triggers a negative indication for the prompt information for setting a blank file or folder, it will wait for the user to designate at least one file or folder in the storage space as the specific file or folder corresponding to the specific file mode.

After the specific file mode is selected, the protection module provides the user with the option to choose to create a blank file as a specific file or folder, or to specify a file or folder as a specific file or folder, and the protection module determine a specific file or folder corresponding to the specific file pattern in the storage area according to the user's instruction. Of course, the protection module may also randomly determine an existing file or folder as the specific file or folder corresponding to the specific file mode. For example, based on a preset selection strategy or algorithm, the protection module selects at least one file or folder conforming to the strategy or algorithm from the storage space as a specific file or folder corresponding to a specific file pattern; specific files or folders can be automatically created without human intervention based on a preset strategy (such as file paths and file names). Wherein, this embodiment does not limit the specific implementation of the selection strategy or algorithm.

Figure 9A:
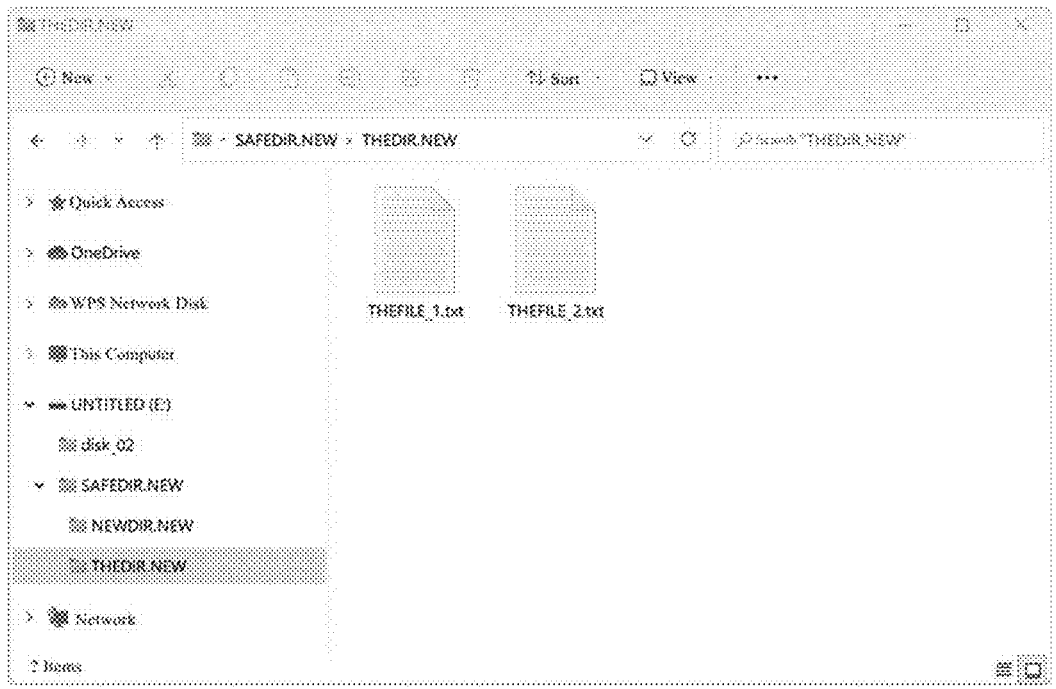
FIG. 9A is a schematic diagram showing that the files in the root directory can be seen from the global permission perspective.
Figure 9B:
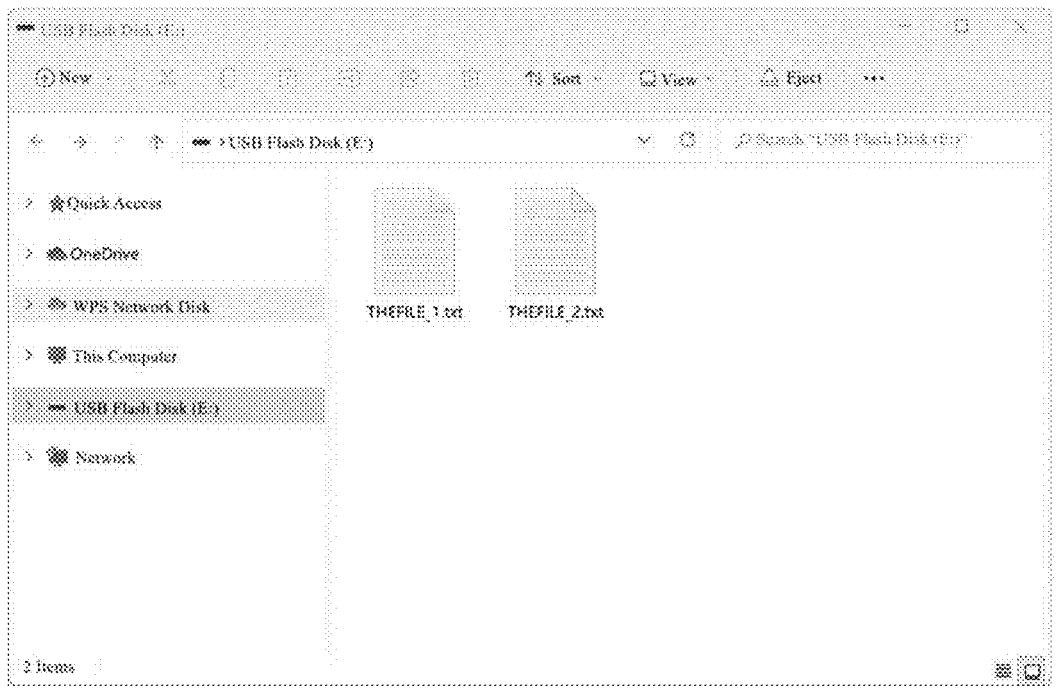
FIG. 9B is a schematic diagram showing that only specific files can be seen when mapped to a fixed specific folder in a specific file mode.
Figure 9C:
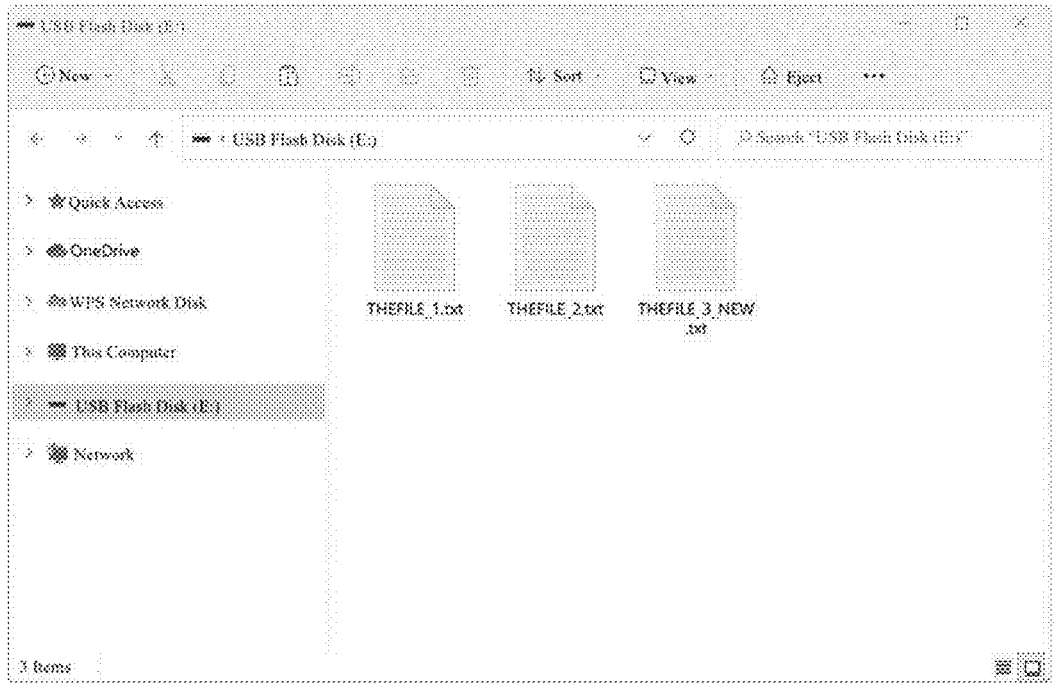
FIG. 9C is a schematic diagram showing continuing to add a new file in a specific file mode.
Figure 9D:
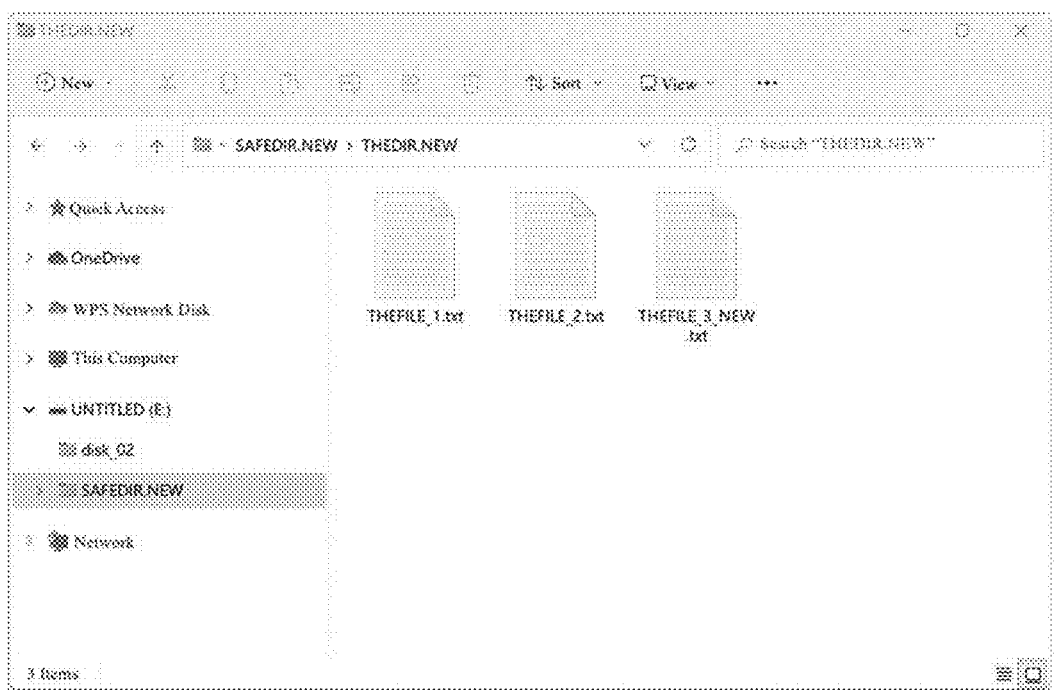
FIG. 9D is an embodiment showing that the files in the root directory and the new added file can be seen from the global permission perspective.

FIGS. 9B and 9C show example diagrams corresponding to a specific folder in a specific file mode. FIGS. 9A and 9D show what can be seen from the perspective of global permissions (that is, no specific folder mapping, no specific folder mode), the purpose is to produce a contrast effect and reflect the difference between the solutions of this application. Referring to FIG. 9A, at global permissions (that is, no specific folder mapping, no specific folder mode), one can see that there is a SAFEDIR.NEW folder (specific folder) in the root directory, and there is NEWDIR in the folder NEWDIR.NEW (blank folder root directory), THEDIR.NEW folder (fixed specific folder). This folder can be created by the user or automatically generated by the protection module. There are 2 files in folder THEDIR.NEW. As shown in FIG. 9B, in the specific file mode, it is mapped to a fixed specific folder. After the storage device with the protection module or the storage device is connected to the computer device through an intermediate device, only two files (THEDIR.NEW) under the root directory can be seen on the computer device, and can be read, or written, or read and write, etc., but the folder SAFEDIR.NEW and the root directory NEWDIR.NEW in the folder and other files, including the USB flash disk root other files in the directory are not visible. FIG. 9C shows an example of continuing to add a new file THEFILE_3_NEW.txt in a specific file mode (mapped to a fixed specific file). FIG. 9D shows the situation that the newly added THEFILE_3_NEW.txt file in the THEDIR.NEW folder can be seen from the perspective of global permissions (that is, no specific folder mapping is performed, and the specific folder mode is not enabled).

Figure 10A:
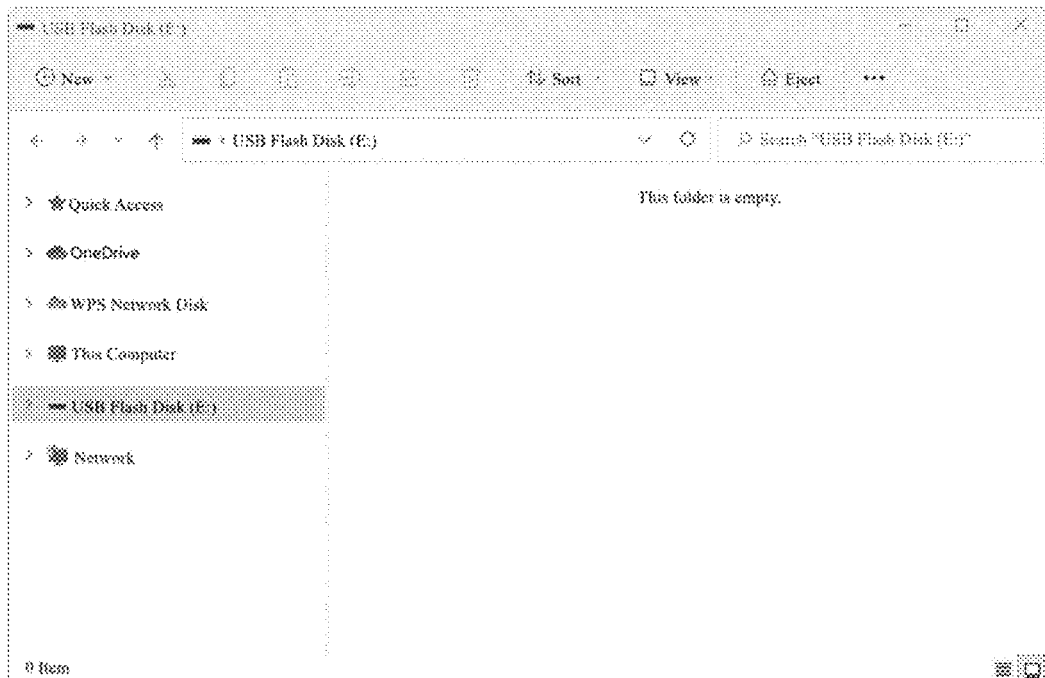
FIGS. 10A to 10D are schematic diagrams showing that a blank file is a specific file in a specific file mode.
Figure 10B:
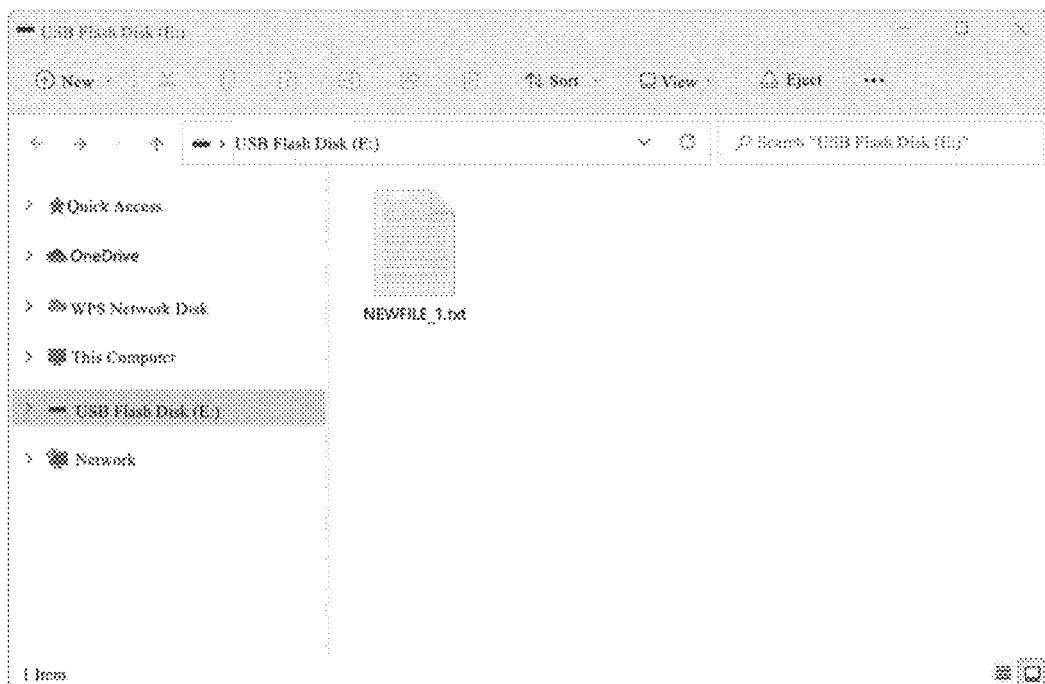
Figure 10C:
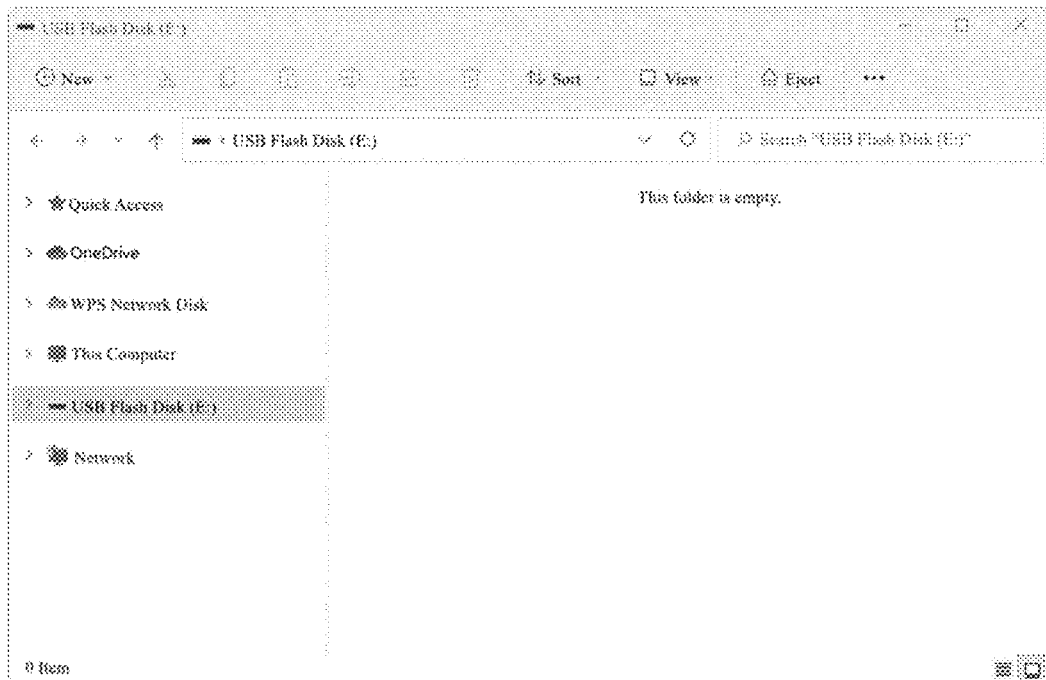
Figure 10D:
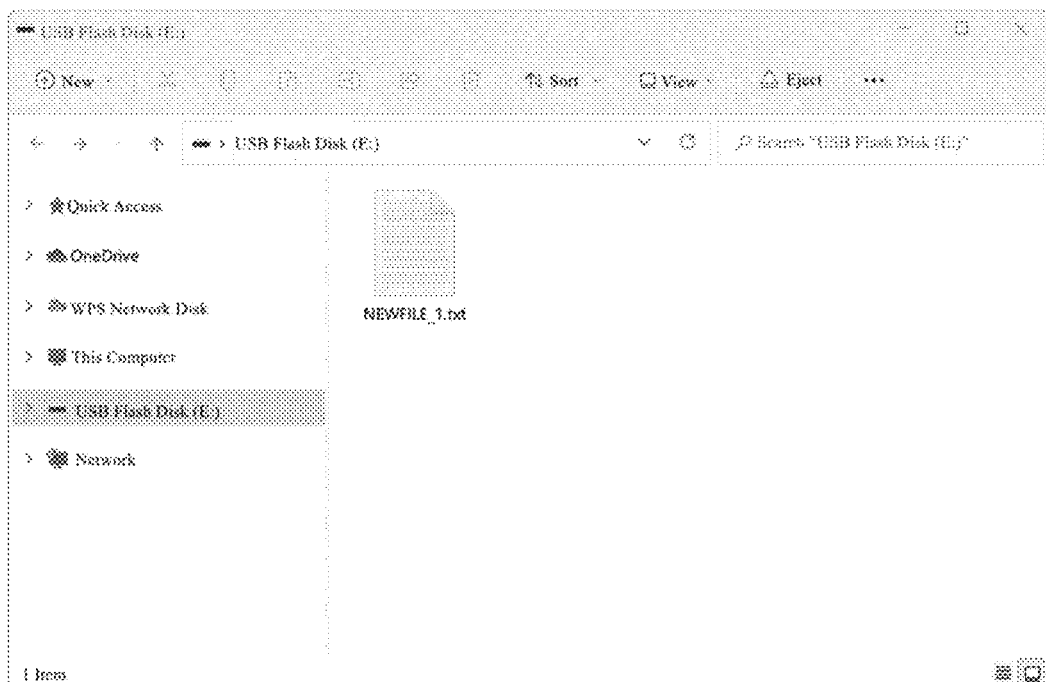

FIGS. 10A, 10B, 10C and 10D show examples of blank folders corresponding to specific files in the specific file mode. As shown in FIGS, when the specific file is a blank folder in the specific file mode, the USB flash disk displayed on the interface of the computer device is empty, as shown in FIG. 10A. Of course, the USB flash drive has data, but because the specific folder is a blank folder, and it is mapped to the blank folder, so that the USB flash drive is empty and has no data from the perspective of the user of the computer device. FIG. 1 GB shows the situation of the NEWFILE_1 file created automatically or by the user when the current protection mode is a blank folder under the specific file mode. FIG. 10B is the corresponding situation when the USB flash drive is running for the first time, and the user can see the newly created blank file. FIG. 10C shows that when the current protection mode is a blank folder under the specific file mode, the USB flash drive runs for the second time (that is, the USB flash drive with the protection module or the USB flash drive connected with the intermediate device is connected to the computer device again), and the file NEWFILE_1 in the above-mentioned FIG. 10B is not visible. FIG. 10D shows the situation of the NEWFILE_2 file created automatically or by the user when the current protection mode is a blank folder under the specific file mode. Because it is newly created this time, the user can see the NEWFILE_2 file.

Figure 11A:
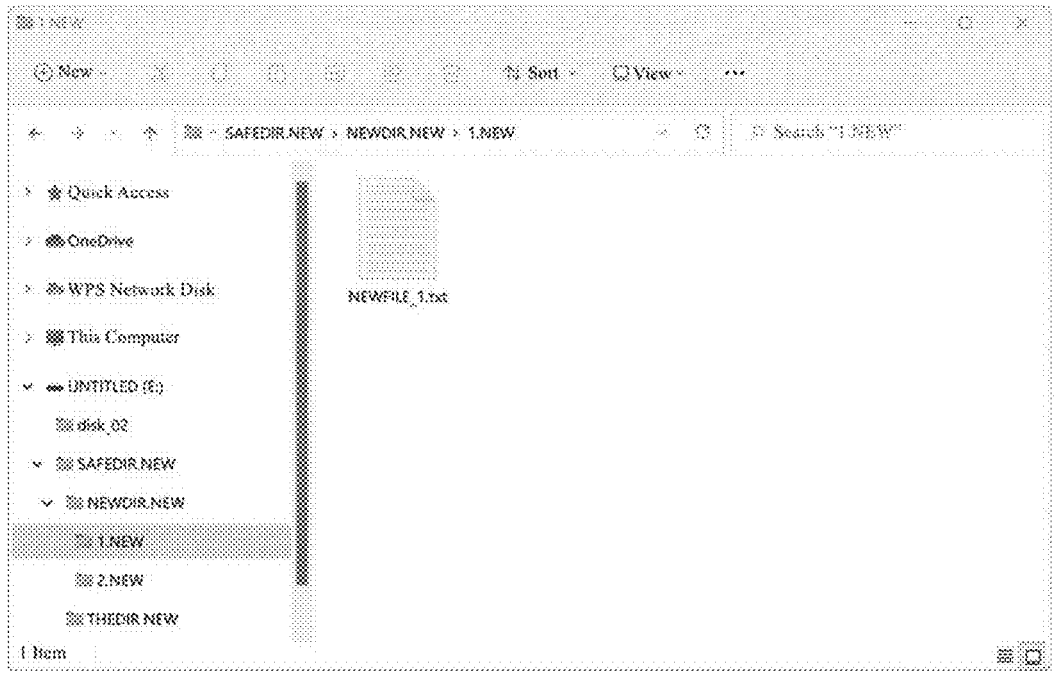
FIGS. 11A and 11B show viewing NEWFILE_1 file and NEWFILE_2 file from the global permission perspective and the directories corresponding to the two viewed files.
Figure 11B:
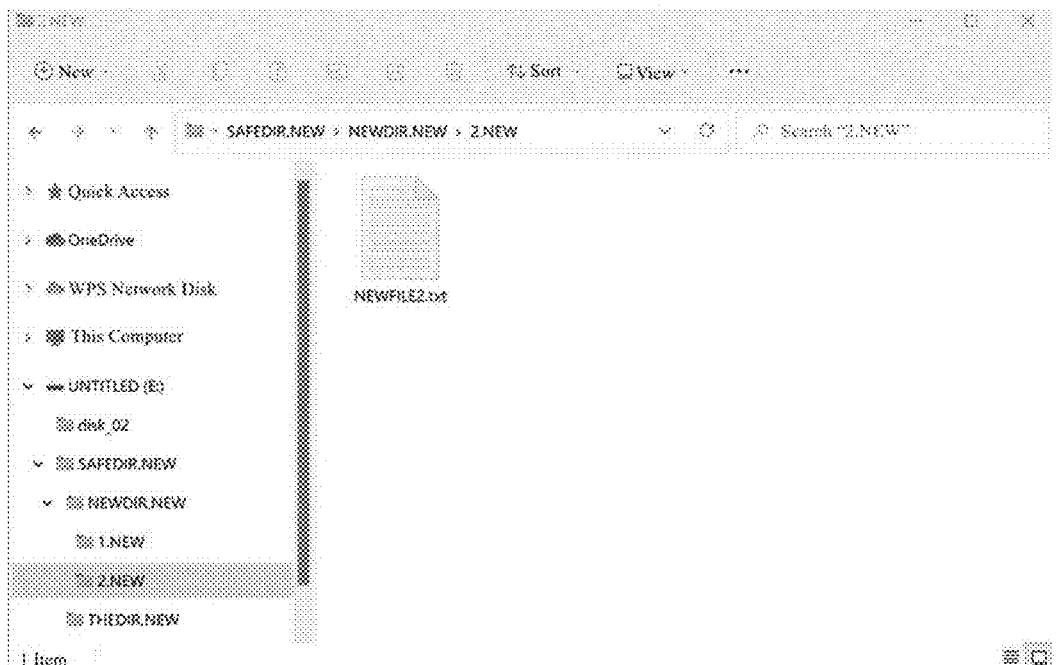

FIGS. 11A and 11B show viewing NEWFILE_1 file and NEWFILE_2 file from the global permission perspective and the directories corresponding to the two created files. Referring to the example shown in FIG. 11 a, a subdirectory 1.NEW is automatically created under the NEWDIR.NEW directory of the USB flash disk, and there is a NEWFILE_1 file created by running the "blank folder mode" for the first time. Referring to the example shown in FIG. 11B, the 2.NEW subdirectory is automatically created under the NEWDIR.NEW directory of the USB flash disk, and there is a NEWFILE_2 file created by running the "blank folder mode" for the second time.

In addition, it needs to be explained: because of the specific folder mode, the folder is only mapped to the root directory and does not affect the original storage space, which is different from the logical split disk mode mentioned below. The logical split disk mode divides the storage space (such as available space) of the storage device when splitting the disk.

In some embodiments, if the protection mode is an address-limited read-write mode, the step S601 includes:

verifying the target sector address corresponding to the data interaction instruction in response to the data interaction instruction and based on a preset sector address range, the target sector address is a sector address that the storage device executing the read/write operation based on the data interaction instruction;

performing read/write operation at the target sector address of the storage device if the target sector address is within the preset sector address range.

Through the sector limited read-write mode, for storage device users, data in a specific sector range of the storage device can be protected from being read, modified or written (based on the sector range). For computer device users, specific sector data cannot be read, which can protect computer device from malicious data attacks.

The specific implementation method is:

When the computer device sends an interaction instruction to read sector data or write sector data to the protection module, the protection module judges whether the sector address operated by the interaction instruction conforms to the preset specific sector range rules, and if it does, the interaction instruction will be executed, otherwise interaction instruction will not be executed.

Also, in the case of inconsistency, a failure status of writing or reading must be responded. The computer device will think that there is a problem with the storage device and will repeatedly perform invalid operations. For this reason, the protection module can return a response of successful execution, response of blank data, and response of other non-real data, so that the computer thinks that the execution is successful. In fact, the protection module does not actually operate the data of the storage device, so as to prevent the computer device from continuously attempting to operate because the operation fails.

Settings for the specific sector range rules above. A feasible technical solution is that the specific sector range can be manually preset, for example, the sector range from 0 to 9999 can only be read, the sector range from 50000 to 69999 can only be written, and the sector range from 80000 to 99999 can neither be read nor written, and other sectors can be read and written. Another feasible technical solution is: the specific sector range can also be automatically set by a protection module or an external device. For example, when further protecting read/write permission for specific file data (e.g. during preparation):

1. Establishing the protection sector address range of the boot area of the storage device and the boot area of the file system. The protection module reads the storage device in advance, finds the boot area of the storage device and the boot sector of the file system, establishes a set of corresponding sector ranges, and sets the sector range as a read-only permission. Prevent the computer from maliciously writing to destroy its data, resulting in file data that cannot be read normally.

2. Establish a protection sector address range for specific folders and files. The protection module reads the storage device in advance, judges the file data characteristics or file attribute (such as file type) characteristics of specific files and folders, and then searches for the data corresponding to the sector address corresponding to the specific files and folders according to file system rules, and establishes a data set corresponding to a specific file data sector range. And set the read-write permission for the sector set, and non-read-write permission for the sector addresses in the file system data area (except the file system boot area). Prevent non-specific folder data from being read by sector scanning (from sector 0 to the end sector).

3. Establish a readable and writable protection range for unused sector addresses. The protection module reads the storage device in advance, and analyzes the unallocated sector address range through the rules of the file system. For example, in a FAT file system (including FAT32, exFAT, etc.), reading the unallocated cluster number of the file allocation table can further convert the set of unallocated sector address ranges. And set the readable and writable permission. In the specific folder mode, the computer can create files and write data; it can also be set to write-only permission, which also prevents reading old data that has not been assigned a sector address (such as deleted file data). Wherein the principle of file deletion is generally as follows: computer device generally only marks deleted files as deleted status, and marks the data storage space as unallocated (such as clearing the cluster chain), but the data in the storage space still exists. If there is no overwriting, the data of the deleted files can be read out.

In this embodiment, the address limited read-write mode includes a read-only mode, a write-only mode, and a readable-writable mode for files within a preset sector address range. The preset sector address range includes all sector addresses that are allowed to be read and written by the computer device, which can be obtained by setting in advance.

Optionally, the protection module identifies the target sector address to be read and written in the data interaction instruction, and executes the read/write operation when the target sector address is within the preset sector address range, thereby controlling the computer device to be capable of reading and writing the sector address of data to protect the data security of the storage device. For example, the target sector address of the file to be read and written by the data interaction instruction is the 0th to 499th sector of the storage device. The target sector address is not within the preset sector address range if the current address limited read-write mode allows reading and writing of sectors 0 to 499 of the storage device, the target sector address is within the preset sector address range.

It should be noted that, in this embodiment, through the address limited reading and writing mode, the allowable reading and writing range of the storage device can be limited to the preset sector address range, so as to meet certain scenarios that require limited reading and writing.

In some embodiments, when the protection mode is a file-restricted read-write mode, the step S601 includes:
in response to the data interaction instruction, based on the preset file characteristics, verifying the target file characteristics corresponding to the data interaction instruction, and the target file characteristics are corresponding to when the storage device performs read/write operation based on the data interaction instruction. file characteristics;
if the characteristic of the target file conforms to the characteristic of the preset file, read/write operation is performed on the target file in the storage device.

Through the file-limited read-write mode, the computer device is restricted from reading or writing files that meet the preset rules to the storage device. The preset rules of the file include file name, file type (such as file name naming rules, file suffix, file content corresponding Eigenvalues at specific locations, etc. In some embodiments, if the protection mode is a specific file read-write mode, the step S601 includes:

For storage device users, the data of specific file types of storage devices can be protected from being read (for example, only DOC documents can be read, or PDF type files cannot be read), modified (for example, only DOC documents can be modified), or prohibit reading PDF type files), delete (for example, prohibit deletion of DOC documents, or only delete PDF type files), create (for example, prohibit writing files whose file type is EXE executable file type, only create DOC documentation). For computer device users, it can protect computer device from malicious programs. For example, only PDF and DOC files need to be copied in daily work scenarios, and only PDF and DOC files in the storage device are allowed to be read or written. Other files Types (such as EXE executable files) are prohibited from being read, so as to prevent advanced Trojan horse virus files from bypassing security software restrictions and attacking computer device.

The Specific Implementation Method:

1. When restricting computer device from reading (including copying) or modifying file content data:

1.1. Find the files that need to be controlled. The protection module finds in advance the files that are prohibited from being accessed or allowed to be accessed, and the sector address range corresponding to the file content data (such as the first sector, etc.) in the storage device.

1.2. Judging the read and write data interaction instructions. When the interaction instruction of the computer is the sector address of the read-write control file, a judgment is made according to the readable or writable permission.

1.3. Respond according to the set permissions. When the sector address has read or write permission, read or write the data of the corresponding sector of the storage device and return; when the sector address prohibits reading or writing, it can return an error status response or a successful execution response, or respond with blank data, or respond with other non-real data, so that the computer thinks that the execution is successful, but in fact the protection module does not actually operate the data of the storage device, so as to prevent the computer device from thinking that the operation failed and continuously trying to operate.

That is, the Above Process can be Summarized as:

The data interaction instruction satisfies the permission requirements corresponding to the current protection mode, and the data interaction instruction is to determine the sector address when reading or modifying file content data, read or write the data of the corresponding sector of the storage device and return;

When the data interaction instruction does not meet the permission requirements corresponding to the current protection mode, an error status response is returned, or an execution success response is returned, or blank data is responded, or preset data is used as feedback data for response.

2. When restricting computer device to create new files, delete files or modify file attributes:

2.1. Find the folder data sector address set (for example, in the preparation phase). Protect the situation of the module in the storage device, look for the root directory in advance, read the subdirectory and file information under the root directory, continue to read the lower-level directory and file information based on the subdirectory, until you find out the folder that needs to be controlled (can be at least one A specific file, a specific folder set or all folders including the root directory), and the sector address range corresponding to the folder data (such as the first sector, etc.).

2.2. Judges the read and write data interaction instructions. When the sector address written by the computer device is the folder data address, compare and read the data corresponding to the sector address of the storage device to judge the operation of the computer device (creating files, modifying file attributes, deleting files) and file types (According to file name rules, file suffix, file specific data, etc.). For example:

The data written by the computer device is A.txt, B.txt, and C.txt containing file information, but the existing data corresponding to the sector address of the storage device is A.txt and B.txt, then it is judged that the computer device to create a C.txt file;

The data written by the computer device is A.txt and B.txt (marked as deleted) containing file information, or the written data is A.txt containing only file information, then it is judged that the computer device will delete B.txt file;

The data written by the computer device is A.txt, C.txt (other attributes of the file remain unchanged), or the written data contains file information as A.txt, B.txt (deleted status), C.txt (other file attributes are consistent with B.txt), then it is judged that the computer device will modify the B.txt file name to C.txt;

The data written by the computer device is A.txt and B.txt (data such as file creation time are inconsistent with the existing data of the storage device) that include file information, then it is judged that the computer device will modify the file attribute information of B.txt.

Specifically, Table 3 to Table 6 shows examples of judging creating a file, judging deleting a file, judging modifying a file name, and judging modifying a file attribute. For example: the protection module pre-records the folder showdir (at least one or more or all folders, including the root directory, etc.) sector address set (at least one sector address). When the data interaction instruction sent by the computer matches the sector address set in the folder showdir, the protection module will pre-read the corresponding sector data for comparison and determination before performing the write operation, and execute the next step according to the preset protection mode operate.

TABLE 3

| An example of judging the creation of a file | | |
| --- | --- | --- |
| 1. The protection module pre-records the folder showdir sector address collection | The set of recorded sector addresses includes: 0x00010038 | Set the set of sector addresses to be identified by file operations |
| 2. Data interaction instructions sent by computer device | Write sector addresses include: 0x00010038 Data written to sector addresses 0x00010038 are: 2e20202020202020202020201000a5f5b3 a856a8560000f6b3a8561b0000000000 2e2e20202020202020202001000a5f5b3 a856a8560000f6b3a8560000000000000 4220202020202020205458542010a10ab4 a856a8560000cdb3a8561c0007000000 4120202020202020205458542010a40ab4 a856a8560000c8b3a8561d0006000000 | Hit the identified sector address The data written are: A.txt, B.txt, and C.txt, total of 3 files |

TABLE 3-continued

An example of judging the creation of a file

| | | |
|---|---|---|
| | 4320202020202020205458542010 9a8cb4 a856a85600008db4a85626000d000000 0000000000000000000000000000000 . . . Null bytes to 512 bytes | |
| 3. The protection module reads the comparison data before performing the write operation | Write sector addresses include: 0x00010038; Data of sector addresses 0x00010038 are: 2e20202020202020202020201000a5f5b3 a856a8560000f6b3a8561b0000000000 2e2e202020202020202020201000a5f5b3 a856a8560000f6b3a8560000000000000 <u>4220202020202020205458542010a10ab4</u> <u>a856a8560000cdb3a8561c0007000000</u> <u>4120202020202020205458542010a40ab4</u> <u>a856a8560000c8b3a8561d0006000000</u> 0000000000000000000000000000000 . . . Null bytes to 512 bytes | The comparison data are: <u>A.txt</u>, <u>B.txt</u>, total of 2 files<br><br>Comparison result: C.txt file data will be added to the original storage sector (or folder showdir). |
| 4. Protection module determining operation | The computer device wants to create C.txt files to the folder showdir | |
| 5. The protection module performs the next operation according to the protection mode: whether creation is allowed, etc., or other protection mode is triggered, etc. | | |

TABLE 4

Example of judging deleting files

| | | |
|---|---|---|
| 1. The protection module pre-records the folder showdir sector address collection | The set of recorded sector addresses includes:<br><br>0x00010038 | Set the set of sector addresses to be<br><br>identified by file operations |
| 2. Data interaction instructions sent by computer device to protection module (type 1) | Write sector addresses include: 0x00010038 Data written to sector addresses 0x00010038 are: 2e20202020202020202020201000a5f5b3 a856a8560000f6b3a8561b0000000000 2e2e202020202020202020201000a5f5b3 a856a8560000f6b3a8560000000000000 <u>e520202020202020205458542010a10ab4</u> <u>a856a8560000cdb3a8561c0007000000</u> <u>4120202020202020205458542010a40ab4</u> <u>a856a8560000c8b3a8561d0006000000</u> 4320202020202020205458542010 9a8cb4 a856a8560000d1b3a85626000d000000 0000000000000000000000000000000 . . . Null bytes to 512 bytes | Hit the identified sector address<br>The data written are: <u>A.txt</u>. <u>C.txt</u>, total of 2 normal file data, <u>1 file data marked as deleted (0xE5)</u> |
| 2. Data interaction instructions sent by computer device to protection module (type 2) | Write sector addresses include: 0x00010038 Data written to sector addresses 0x00010038 are: 2e20202020202020202020201000a5f5b3 a856a8560000f6b3a8561b0000000000 2e2e202020202020202020201000a5f5b3 a856a8560000f6b3a8560000000000000 <u>4120202020202020205458542010a40ab4</u> <u>a856a8560000c8b3a8561d0006000000</u> 4320202020202020205458542010 9a8cb4 a856a8560000d1b3a85626000d000000 0000000000000000000000000000000 . . . Null bytes to 512 bytes | Hit the identified sector address<br>The data written are: <u>A.txt</u> and <u>C.txt</u>, total of 2 files |
| 3. The protection module reads the comparison data before performing the write operation | Write sector addresses include: 0x00010038; Data of sector addresses 0x00010038 are: 2e20202020202020202020201000a5f5b3 a856a8560000f6b3a8561b0000000000 2e2e202020202020202020201000a5f5b3 a856a8560000f6b3a8560000000000000 <u>4220202020202020205458542010a10ab4</u> <u>a856a8560000cdb3a8561c0007000000</u> <u>4120202020202020205458542010a40ab4</u> <u>a856a8560000c8b3a8561d0006000000</u> 4320202020202020205458542010 9a8cb4 a856a85600008db4a85626000d000000 0000000000000000000000000000000 . . . Null bytes to 512 bytes | The comparison data are:<br><u>A.txt</u>, <u>B.txt</u>, and <u>C.txt</u>, total of 3 files<br><br>Comparison result: B.txt file in the original storage sector space (or folder showdir) will be marked as deleted (Type 1) or B.txt file data will be cleared (Type 2) |

TABLE 4-continued

| Example of judging deleting files |
| --- |

4. Protection module determining  The computer device wants to delete B.txt files in the folder showdir
5. The protection module performs the next operation according to the protection mode: whether creation is allowed, etc., or other protection mode is triggered, etc.

TABLE 5

| Example of judging and modifying file names | | |
| --- | --- | --- |
| 1. The protection module pre-records the folder showdir sector address collection | The set of recorded sector addresses includes: 0x00010038 | Set the set of sector addresses to be identified by file operations |
| 2. The data interaction instruction sent by the computer device to send the write data instruction | Write sector addresses include: 0x00010038<br>Data written to sector addresses 0x00010038 are:<br>2e20202020202020202020201000a5f5b3<br>a856a8560000f6b3a8561b0000000000<br>2e2e20202020202020202020201000a5f5b3<br>a856a8560000f6b3a856000000000000<br>43202020202020202054585420109
5d31d<br>a956a9560000cdb3a856370007000000<br>41202020202020202054585420109
8d31d<br>a956a9560000c8b3a856380006000000<br>00000000000000000000000000000000<br>. . . Null bytes to 512 bytes | Hit the identified sector address<br>The data written are:<br>A.txt and C.txt, total of 2 files |
| 3. The protection module reads the comparison data before performing the write operation | Write sector addresses include: 0x00010038<br>Data written to sector addresses 0x00010038 are:<br>2e20202020202020202020201000a5f5b3<br>a856a8560000f6b3a8561b0000000000<br>2e2e20202020202020202020201000a5f5b3<br>a856a8560000f6b3a856000000000000<br>42202020202020202054585420109
5d31d<br>a956a9560000cdb3a856370007000000<br>41202020202020202054585420109
8d31d<br>a956a9560000c8b3a856380006000000<br>00000000000000000000000000000000<br>. . . Null bytes to 512 bytes | The comparison data are:<br>A.txt and B.txt, total of 2 files<br>Comparison result: The B.txt file information in the original storage sector space (or folder showdir) is cleared, and C.txt file information is added. C. txt file information is the same except that the file name is inconsistent with the B.txt of the original file. |
| 4. Determine the operations of computer device | Modify the file name of the file B.txt to C.txt | |

5. Perform the next operation according to the protection mode: whether the file name can be modified or other protection mode can be triggered

TABLE 6

| Example of judging and modifying file attributes | | |
| --- | --- | --- |
| 1. The protection module pre-records the folder showdir sector address collection | The set of recorded sector addresses includes: 0x00010038 | Set the set of sector addresses to be identified by file operations |
| 2. The data interaction instruction sent by the computer device to send the write data instruction | Write sector addresses include: 0x00010038<br>Data written to sector addresses 0x00010038 are:<br>2e20202020202020202020201000a5f5b3<br>a856a8560000f6b3a8561b0000000000<br>2e2e20202020202020202020201000a5f5b3<br>a856a8560000f6b3a856000000000000<br>41202020202020202054585420106
3b2b5<br>a856a8560000c8b3a856270006000000<br>42202020202020202054585420106
8b2b5<br>a856a856000095b6a8562e000a000000<br>00000000000000000000000000000000<br>. . . Null bytes to 512 bytes | Hit the identified sector address<br>The data written are:<br>A.txt and C.txt, total of 2 files |

TABLE 6-continued

Example of judging and modifying file attributes

| | | |
|---|---|---|
| 3. The protection module reads the comparison data before performing the write operation | Write sector addresses include: 0x00010038; Data of sector addresses 0x00010038 are: 2e2020202020202020201000a5f5b3 a856a8560000f6b3a8561b0000000000 2e2e20202020202020201000a5f5b3 a856a8560000f6b3a856000000000000 <u>41202020202020205458542010636b2b5 a856a8560000c8b3a856270006000000 42202020202020205458542010686b2b5 a856a8560000cdb3a8562e0007000000</u> 0000000000000000000000000000000 . . . Null bytes to 512 bytes | The data comparison data are: <u>A.txt</u> and <u>B.txt</u>, total of 2 files Comparison result: The file attributes of B.txt the original storage sector space (or folder showdir) is to be modified, and the modified attributes are file size and modification time. File data modifications may be required for modifying the file size and modification time attributes |
| 4. Determine the operations of computer device | Modify the file attributes of file B.txt and further determine that the file data is to be modified | |
| 5. Performs the next operation according to the protection mode: whether the file attributes or data can be modified or other protection mode can be triggered | | |

That is, the above process can be summarized as:

When the data interaction instruction satisfies the permission requirements corresponding to the current protection mode, and the data interaction instruction is to create a new file, delete a file or modify a file, determining the sector address;

if the data interaction instruction includes information of multiple files, and the sector address corresponding to the storage device contains a part of files of the multiple files, determining that the computer device needs to create at least one file at the sector address; wherein, at least one file created is the remaining files of the multiple files except the part of files;

if the data interaction instruction includes information of multiple files, and at least part of the multiple files have deletion marks, finding at least one pre-deleted file in the sector address corresponding to the storage device that is associated with the part of files with deletion marks of the multiple files; determining that the computer device is to delete the at least one pre-delete file;

if the data interaction instruction includes a first file set, and the sector address corresponding to the storage device contains a second file set, and the first file set is a subset of the second file set, determining the computer device is to delete at least one file in the second file set that does not belong to the first file set;

if the attribute information except the file name of the first file included in the data interaction instruction is the same as the attribute information except the file name of the second file in the sector address corresponding to the storage device, determining that the computer device is to modify the file name of the second file in the sector address to the file name of the first file;

if the file name of the first file contained in the data interaction instruction is the same as the file name of the second file in the corresponding sector address of the storage device, and the attribute information of the first file except the file name is different from that of the attribute information except the file name of the second file is different, determining that the computer device is to modify the attribute information except the file name of the second file to the attribute information except the file name of the first file.

What needs to be added here: the attribute information to be modified can be attributes such as file size and time, and file data may also need to be modified. That is, the above step "if the file name of the first file contained in the data interaction instruction is the same as the file name of the second file in the corresponding sector address of the storage device, and the attribute information of the first file except the file name is different from that of the attribute information except the file name of the second file is different, determining that the computer device is to modify the attribute information except the file name of the second file to the attribute information except the file name of the first file" can be specifically is:

if the file name of the first file contained in the data interaction instruction is the same as the file name of the second file in the corresponding sector address of the storage device, and the attribute information of the first file except the file name is different from that of the attribute information except the file name of the second file is different, determining that the computer device is to modify the attribute information except the file name of the second file to the attribute information except the file name of the first file;

if the attribute information to be modified by the computer device includes file size and time, determining that the computer device is to modify the file data of the second file.

3. Respond according to the preset permissions.

The method provided by the embodiment of the application further comprises the following steps:

based on the current protection mode, permission determination is performed on the operation to be performed by the computer device or other protection modes are triggered.

For example, when it is determined that the computer device is to create at least one file at the sector address, the protection module determines whether to allow creation based on the current protection mode, or triggers other protection modes.

When determining that the computer device is to delete the at least one pre-deleted file or determining that the computer device is to delete at least one file in the second file set that does not belong to the first file set, the protection module based on the current protection mode determines whether to allow deletion, or trigger other protection modes.

When it is determined that the computer device is to modify the file name of the second file in the sector address to the file name of the first file, the protection module determines whether to allow modification of the file name based on the current protection mode, or triggers other protected mode.

When it is determined that the computer device is to modify the attribute information of the second file except the file name to the attribute information of the first file except the file name and/or to modify the file data of the second file, the protection Based on the current protection mode, the module determines whether to allow modification of attribute information and/or modification of file data, or trigger other protection modes.

Wherein, the above other protection modes triggered may be at least one protection mode combined with the current protection mode, such as encryption write mode, manual confirmation mode, and the like.

When the type of file to be written has restrictions on creating files, modifying file attributes, deleting files, etc.: First, it can return an error status response, or return a successful execution response, or respond with blank data, or respond with other non-real data (for example, when the computer further reads verification, the protection returns the data written by it), so that the computer device thinks that the execution is successful, but in fact the protection module does not actually operate the data of the storage device, preventing the computer device from thinking that the operation failed and constantly trying to operate. Second, when a file is created without permission, it is normally written in the folder data, but the written file content data is not real data, so that the computer device thinks that the execution is successful, and the storage device actually creates the file, but the file content data are unreal, which can avoid the execution of malicious codes, prevent computer device from thinking that the operation failed and continue to try to operate. The response may also include a determination of at least one protection mode, such as manual confirmation mode, encryption and decryption mode, and file abnormality mode.

Wherein, when restricting the computer device from reading the file attribute data in the folder, judging the data interaction instruction according to the file reading rule. When the file in the storage device does not comply with the file reading rules, respond to the computer device with unreal data, and hide the file in the computer device, for example: first, replace the file attribute with a deleted status, return to the computer device to cause the computer device to think that the file has been deleted, and no longer display it; second, replace the first sector address (or the first cluster and first block in the file system) in the file attribute with 0x00, and the file size with 0 bytes, so that the computer device cannot directly read the data of the file; third, blank data and other unreal data can be used to replace the data corresponding to the file, so that the computer device cannot read the real data, preventing the computer device from thinking that the operation failed and continuously trying to operate. This makes it impossible for the computer device to read the correct properties of the file, to display it on the computer, and to read further file content data, among other things.

In this embodiment, the address limited read-write mode includes a read-only mode, a write-only mode, and a read-write mode for files with a preset sector address characteristic. The preset file characteristics refer to the characteristic parameters of files that are preconfigured to allow computer device to read and write, including but not limited to file names, file suffixes, file types, file sizes, and preset sector data in file content data, hash value corresponding to a specific position in the preset sector data in the file (similar to a keyword comparison hit, for example, judging whether the 10th word on page 5 is 0x88, which is equivalent to judging whether the 10th byte in the 5th sector is 0x88) and other file characteristics. Optionally, by preset blacklist file characteristics or white list characteristics, reading and writing of corresponding files is prohibited or allowed. For example, if the file-limited read-write mode is specifically the read-only mode for the PDF file type, then when the read operation is performed, only the PDF file in the storage device is read, and other file types cannot be read.

For example, when the storage device establishes communication with the computer device, the target device automatically crawls the attributes of all file (such as file name, start sector address, etc.) in the storage device that are allowed to be accessed by the computer device according to preset rules of the corresponding file system, and establish the correspondence between the unique identifier of the file and the address of the starting sector. For read operation: when the read sector address of the computer device is the start address of a certain file, it considers that the file is to be read and written, and then inquires whether the file has the preset file characteristics. For read operations: when a computer device writes a file, first update and write the attributes of the file (file name, start sector address, etc.) to the corresponding folder data, and by comparing the written folder data, the attributes of the file to be written are determined, and then determine whether the file has the preset file characteristics.

It should be noted that, in this embodiment, using the file-limited read-write mode to meet the scenario requirement that the user wants the computer device to only read the file with preset file characteristics, thereby improving the data security of the storage device.

In some embodiments, the preset file characteristic includes a first hash value corresponding to preset sector data in the file; based on the preset file characteristics, verifying the target file characteristics corresponding to the data interaction instruction, includes:
    calculating a second hash value of the preset sector data in the target file;
    determining that the target file characteristic conforms to the preset file characteristic if the second hash value is consistent with the first hash value;
    determining that the target file characteristic does not conform to the preset file characteristic if the second hash value is inconsistent with the first hash value.

In this embodiment, the preset sector data is the data in the pre-selected sector. For example, the preset sector is the first sector, then the second hash of the data of the first sector part where the target file to be read and written by the computer device is calculated. When the second hash value is consistent with the first hash value, it is determined that the target file characteristic conforms to the preset file characteristic. For example, the first hash v of ale of the preset sector data B in file A is 533c3057ec5801aa39e9257066890928. When it is necessary to read and write the preset sector data B in file A, calculate the second hash value of the read and written sector data in file A, and judge whether the second hash value is 533c3057ec5801aa39e9257066890928. If yes, it means that the preset sector data B in file A is read and write is, which conforms to the preset file characteristics; if not, it indicates that the operation does not involve reading or writing the preset sector data B in file A, and thus does not conform to the preset file characteristic. In this embodiment, file characteristics are verified by comparing hash values, so that read control on certain file data can be more accurate.

In some embodiments, after verifying the characteristics of the target file corresponding to the data interaction instruction, further comprises: hiding the target file if the characteristics of the target file do not conform to the preset file characteristics.

In this embodiment, hiding a file refers to making the computer device recognize the file. The way to hide the target file can be by modifying the real sector address (including the starting sector address, cluster (block) chain data, etc.) and file size of the target file, so that the computer device recognizes it as an empty file with a file size of 0 bytes, and the content data of the target file cannot be directly read; the content data in the target file can also be replaced by non-real data such as blank data in the process of returning the data packet; the target file can also be modified to delete status so that the computer device recognizes it as deleted and does not display the file. The replacement or modification in this embodiment is only a disguise, not a real modification of the data, but only a replacement or modification of the data displayed to the computer device.

It should be noted that after the computer device establishes communication with the storage device, the computer device needs to read the file data of the storage device to display on the computing device. In this embodiment, to hide the file by identifying the preset file characteristics of the file before the computer device is displayed, and it can be compatible with all the protection modes of the present application. That is, the file can be hidden in all protection modes, so that all the protection modes can be configured for permissions on the storage device after the hidden file, so that only the files that are not hidden in the storage device are read and written, so as to protect the security of the privacy data of the storage device.

In some embodiments, if the protection mode is the encryption write mode, the step S601 includes:

encrypting the data to be written carried by the data interaction instruction to obtain the first target data in response to the data interaction instruction;

writing the first target data to the target file in the storage device.

In this embodiment, the protection module stores a key used for data encryption. For the scenario where the computer device needs to write data in the storage device, the computer device sends a write instruction carrying the data to be written, and the data to be written is encrypted through the protection module to obtain the second target data, and then the second target data is written to the storage device.

Optionally, when the target device is an intermediate device, the intermediate device responds to the write instruction and encrypts the data to be written through the protection module to obtain the second target data, and then forwards the second target data and the write instruction to the storage device, and the storage device writes the second target data according to a write instruction. When the target device is a storage device with a protection module, the protection module verifies the identity of the user before data writing (it should be understood that verification may not be required in other embodiments), e.g., the user input the unlock password of the protection module, so that the protection module can call its pre-stored encryption key during the write operation. When the storage device receives the write instruction, the storage device responds to the write instruction and encrypts the data to be written through the protection module to obtain the second target data and perform write operation on the second target data.

It should be noted that in this embodiment, the data to be written is encrypted by the protection module, so as to independently protect the data security of the storage device, and at the same time, the encryption key is stored in the protection module to realize separate storage of the key and data. Even after the storage device is lost, the data is difficult to be cracked, further improving data security.

In some embodiments, if the protection mode is the decryption read mode, performing a read operation and/or write operation on the storage device in response to the data interaction instruction includes:

feeding back second target data to the computer device in response to the data interaction instruction, where the second target data is data obtained by decrypting the data returned by the storage device in response to the data interaction instruction.

In this embodiment, the protection module stores a key for data decryption. For the scenario where the computer device needs to read the data in the storage device, the computer device sends a read instruction, obtains the target data in the storage device according to the read instruction, and decrypts the target data through the protection module to obtain the third target data.

It can be seen that the technical solutions provided by the embodiments of the present application can also implement encryption or decryption of data corresponding to specific sector address of the storage device through encryption writing or decryption reading.

The Specific Implementation Method:

1. Encrypting or decrypting the data of a specific sector address, similar to the process of the sector limited read-writing mode, pre-configuring (manually or automatically) a set of specific sector ranges that need to be encrypted or decrypted.

2. The protection module performing encryption or decryption when the read or write operation of the data interaction instruction sent by the computer satisfies the specific encryption and decryption sector range: 1) If the data in the specific encrypted sector range is read, after the protection module reads the data arrives in the storage device, performs decryption and responds to the computer; 2) If the data is written into a specific encrypted sector range, the protection module encrypts the data written by the computer, and then writes it to the storage device.

Specific Application Scenarios:

1. Manually configure the encrypted sector range. For example, configure the sector range from 0 to 9999 as the encrypted sector range. When the sector range is read, the protection module performs a decryption response; when the sector range is written, the protection module performs encryption writing.

2. Automatic encryption and decryption in the process of reading and writing computer device. For example, the types of files that need to be encrypted or decrypted are pre-configured, and the protection module reads in advance the address of the first sector and the set of sector addresses of the specific file data that needs to be encrypted or decrypted.

3. Automatic encryption in advance of the protection module, automatic encryption and decryption in the process of computer reading and writing. For example, the boot sector is automatically encrypted by the protection module. Similar to the process of the sector limited read-write mode, the protection module pre-reads the MBR, GPT and other boot sectors, the file system boot sector, and the sector addresses set or the sector address range of the file allocation table of the storage device according to the protocol or rules of the storage device boot sector and the file system, read the data for encryption, and write the encrypted data according to the original sector address, so that the storage device stores data related to the encrypted boot sector and the file system.

4. The protection module combines the encryption and decryption of the reading and writing process for specific files. For example, to encrypt and decrypt the read/write operation of files in a specific folder that is specified for reading and writing, for example, writing the file test.txt into the folder safedir and automatically encrypts it, and reads it out and decrypts it automatically. Other folders are not encrypted or decrypted. To encrypt and decrypt specific file types specified for reading and writing, for example encryption and decryption control for files with txt type, when the file test.txt is written, it will be automatically encrypted, and it will be decrypted when it is read.

The advantage of this is that the key data for encryption or decryption is stored in the protection module, and the encryption or decryption operation is also performed by the protection module. First, the protection module and the storage device can be kept physically separated. When the storage device is lost, the key data cannot be obtained maliciously reversely (in the prior art, the key and the storage device are designed as a physical integration, which is easy to be reversely extracted key data, such as a USB flash disk with an encryption function); second, the key is not encrypted or decrypted by the computer, and the computer cannot obtain the key data, so as to prevent the key from being stolen after the computer is maliciously controlled (in the prior art, the key The key is stored in the computer, and the computer performs the encryption or decryption operation, e.g., the encryption or decryption software of the USB flash disk needs to be installed in the computer for encrypting the USB flash disk); third, that only the protection module knows the specific encrypted sector address range, and it is difficult to analyze for the computer reading directly through the storage device, such that it is difficult to discover the existence of encrypted data. Fourth, the encryption and decryption process does not require the participation of a computer device, and the computer cannot know or control the encryption and decryption process.

Optionally, if the target device is an intermediate device, when the computer device sends a read instruction, the intermediate device forwards the read instruction to the storage device, and the storage device obtains the target data according to the read instruction to forward it to the intermediate device. The protection module of the intermediate device decrypts the target data to obtain the third target data, and forwards the third target data to the computer device. When the target device is a storage device with a protection module, the protection module verifies the identity of the user before reading the data (it should be understood that verification may not be required in other embodiments), such as the user input an unlock password of protection module, so that the protection module can call the pre-stored decryption key during the read operation; after the computer device sends a read instruction, the storage device obtains the target data according to the read instruction, and decrypts the target data through the protection module to obtain the third target data, then return the third target data to the computer device.

It should be noted that in this embodiment, the data acquired by the storage device is decrypted by the protection module, so as to independently protect the data security of the storage device, and at the same time, the decryption key is stored in the protection module to realize separate storage of the key and data. Even after the storage device is lost, the data is difficult to be cracked, further improving data security.

The decryption read mode and encryption write mode can be compatible with other protection modes, for example, the current protection mode can be a specific file read-write mode, decryption read mode and encryption write mode at the same time.

In some embodiments, if the protection mode is a manual confirmation mode, the step S601 includes:
  prompting the user whether to confirm execution of the data interaction instruction in response to the data interaction instruction;
  continuing to perform read/write operation on the target file in the storage device if a confirmation execution instruction of the data interaction instruction is received.

Based on the preset rules, manually confirm the data interaction instructions sent by the computer, such as reading and writing specific sector addresses, and if it is confirmed, the data interaction instructions continue to be executed in the storage device; if it is not confirmed, the data interaction instructions are not executed.

The Specific Implementation Method:
  based on the preset rules of the data interaction instruction, the protection module judges whether the interaction instruction needs to be manually confirmed.

Preset rules for data interaction instructions may include, but are not limited to:

1. Manual confirmation based on sector address read/write operation. For example: The first one is a process similar to the sector limited read-write mode, which establishes a set of sector ranges in the boot area of a storage device and a file system boot area, or establishes a set of sector ranges for specific file data. As a sector range that requires manual confirmation.

2. Manual confirmation based on file attribute operations. For example: similar to the process of the file limited read-write mode, the first one is to establish rules for creating, deleting, modifying file attributes, and reading and writing file content data for specific file types (according to file suffixes, file content data characteristics, etc.); the second one is to establish rules for creating files, modifying file attributes, and deleting files for unspecified files. For example, when it is set that the read and write of an exe executable program need to be confirmed, when the computer reads or writes a file named abc.exe from the storage device, the intermediate device or protection module detects this action and requires manual confirmation for this operation by lighting up or displaying on the screen rather than responding immediately. After manual confirmation, the intermediate device or protection module will respond and continue the file read/write operation.

3. Manual confirmation based on device access operations. For example, when the protection module finds that the computer device starts to connect to and enumerate the storage device (read device descriptor, configuration descriptor, interface descriptor, endpoint descriptor, character string descriptor, device capacity information, etc.), the connection needs to be manually confirmed. The protection module finds that the computer device sends a specific instruction (for example, descriptor requests with tags, passwords, and keys), and then manually confirms the connection after manually confirming that it conforms to the agreement.

The advantage of this is that the user of the storage device can know the transmission process of writing or reading data or specific files, and has further fine-grained control over the sector data or specific file transmission in the storage device (which cannot be realized in the prior art, but only through read-only control); Computer device is prevented from performing operations on storage devices that users do not know, such as maliciously formatting storage devices, stealing and copying sensitive files, maliciously modifying sensitive files, or writing malicious program files, etc. At the same time, allowing computer device users to explicitly know the content of file data transmission can avoid the unreliability of computers or computer control software and antivirus software without computer software control or antivirus software.

In this embodiment, the manual confirmation mode is a mode that requires the user to participate in the confirmation during the data interaction process. That is, the data interaction instructions sent by the computer device need to be confirmed manually on the intermediate device or the storage device with the protection module. For example, for the exe executable program, when the computer device needs to read and write the abc.exe file in the storage device, when the protection module detects the read/write operation, it will prompt the user to perform confirmation on the read/write operation by turning on the light or displaying on the screen. After manual confirmation, the corresponding read/write operation is performed. The manual confirmation mode is compatible with other protection modes.

Figure 12:
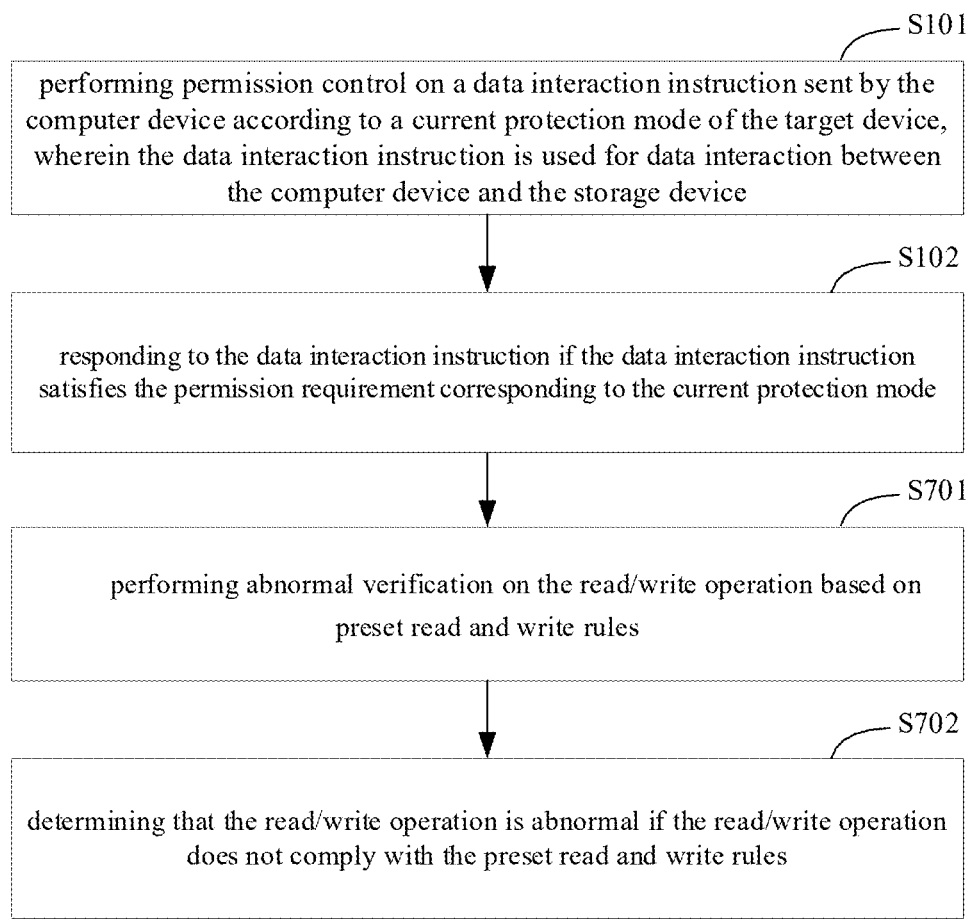
FIG. 12 is a flow chart of the data security protection method shown in the fourth embodiment of the present application.

For example, the target device is an intermediate device, whose schematic diagram is shown in FIG. 12. When the computer device needs to write data to the file abc.exe in the storage device, the intermediate device displays the corresponding operation information. When the confirmation option is clicked by the user, it means that the confirmation execution instruction is triggered, and the computer device is allowed to write data to the file abc.exe in the storage device. When the cancel option is clicked, the operation is interrupted.

It should be noted that this embodiment can monitor illegal behaviors in some scenarios through the manual confirmation mode, so as to avoid data leakage or security risks caused by computer device illegally reading and writing storage device without the users knowledge, thereby improving the security of the storage device and computer device.

When the current protection mode is the manual confirmation mode, the above-mentioned "responding to the data interaction instruction when the data source directed by the data interaction instruction is one of at least one of the data sources specified in the current protection mode and the operation type by the data interaction instruction on the data in the data source conforms to the operation type specified by the current protection mode" can be specifically:

displaying pre-write or read information about the data when the data source targeted by the data interaction instruction is one of at least one data source specified in the manual confirmation mode, and when the operation type of the data interaction instruction in the data source is a read-write type;

writing the data to or reading the data from the storage device based on the data interaction instruction in response to the user triggering a confirmation operation on the related information.

The read-only mode mentioned herein may include, but not limited to, a whole-disk read-only mode, a partial-disk read-only mode, and the like. In the following embodiments, the whole-disk read-only mode will be used as an example, that is, in some embodiments, if the protection mode is the whole-disk read-only mode, the step S601 includes:

feeding back the third target data to the computer device in response to the data interaction instruction, wherein the data interaction instruction is a read instruction, and the first target data is data returned by the storage device in response to the read instruction.

In this embodiment, the whole-disk read-only mode is a mode that allows the computer device to read all file data in the storage device. When the computer device wants to perform data interaction with the storage device, it will send a data interaction instruction. But in the whole-disk read-only mode, only when the read instruction meets the permission requirements, the target device will respond to the read instruction, and feedback the first target data to the computer device. The first target data is the data read from the storage device.

For example, the target device identifies the instruction type of the data interaction instruction and verifies it according to the read/write permission in the whole-disk read-only mode, when the data interaction instruction is a read instruction, the target device calls the first target data in the device, and send the first target data to the computer device. When the data interaction instruction is not a read instruction, but for example a write instruction (such as instruction 2A of the SCSI protocol, which means write) or other types of instructions, the data interaction instruction will not be forwarded to the target device. Optionally, when the data interaction instruction is not a read instruction, the protection module will not forward the data interaction instruction, and will send feedback information that the execution has been completed to the computer, so as to realize the restriction on the read/write permission of the computer.

In this embodiment, the data interaction between the storage device and the computer device is controlled through the whole-disk read-only mode, so as to prevent the computer device from modifying or deleting the data of the storage device, thereby protecting the data security of the storage device.

In some embodiments, based on the embodiment shown in FIG. 1, FIG. 12 is a flow chart of the data security protection method of the fourth embodiment of the present application. The same steps as those in FIG. 1 will not be repeated. As shown in FIG. 12, for the execution process of the read/write operation, the method further includes:

Step S701, performing abnormal verification on the read/write operation based on preset read and write rules;

Step S702, determining that the read/write operation is abnormal if the read/write operation does not comply with the preset read and write rules.

Based on the preset rules, the data interaction instructions sent by the computer (such as reading or writing sector addresses) are automatically verified. If they do not meet the rules, they will not be executed, or enter the manual confirmation mode for judgment.

The specific implementation method mainly establishes rules, which mainly include but are not limited to:

1. Rules of reading and writing the file system based on the normal enumeration of the computer. For example, the rules for computer reading and writing are: first read the address of sector 0 (analyze the boot sector data, read the address of the file system boot sector)→read the address of the file system boot sector (analyze the file allocation table and first directory sector address of the file system)→read data corresponding to sector address of file allocation table→read data corresponding to first directory sector address.

The above rules are regular and jumping, which are starting from sector 0 address, non-continuous, and generally jumping. If it is maliciously read, when analyzing the read, it will be read continuously from the address of the sector to the address of the specific sector, and there is no rule for the computer to read and write the file system normally, it is considered abnormal.

2. Contextual rules based on the normal reading and writing files of the computer. For example, when a computer reads file content data, it will first read the record of the folder data where the file is located (obtain the start sector address of the file (or called first cluster, first block, etc.)); when writing file data, it will write the record of the folder data where the file is located (recording the address of the starting sector of the file (or called the first cluster, first block, etc.)). It is considered abnormal if there is no context operation.

3. Rules based on the file system data management. For example, a file system generally divides multiple sector addresses into a sector range for management ("cluster" in the FAT file system, or "block" in other file systems). When the computer normally operates the file system, the read or write operation should be performed from the address of the first sector of the cluster or block. If the read or write operation does not start from the first sector address of the cluster or block, and the sector address of the operation is other positions in the cluster, it is considered to be abnormal.

4. Rules based on business habits. For example, if the computer reads multiple files (more than the preset number) from the storage device within a preset time (or within one access), it is considered to be abnormal.

Corresponding handling based on abnormalities may include but not limited to:

When the operation is prohibited, the protection module can return an error status response or a successful execution response, or respond with blank data, or respond with other non-real data, so that the computer thinks that the execution is successful, but in fact the protection module does not actually operate the data of the storage device, so as to prevent the computer from thinking that the operation failed and continuously trying to operate. The second is to switch to the process of the manual confirmation mode.

In this embodiment, the preset read-write rules include, but are not limited to, general read/write rules for sector addresses, read/write numbers of file, and the like. For example, for the general read and write rules of the sector address, usually start reading and writing from the first sector address, if the current read/write operation does not start reading and writing from the first sector address of the file, but starts reading and writing from other sectors, for example, the 100th sector to the 9999th sector of the data area are continuously read and written, it is considered that the read/write operation is abnormal. For the read/write number of file, since crawler-style read scans and reads all files in the storage device in batches, by setting the read number of file to, for example, 10, if more than 10, the read/write operation is considered to be abnormal.

Further, the step "responding to the data interaction instruction" in the method provided by this embodiment may include:

Step 41, sending the data interaction instruction to the storage device, so that the storage device reads data and/or writes data based on the data interaction instruction;

Step 42, obtaining the procedure information of the storage device reading data and/or writing data based on the data interaction instruction;

Step 43, determining whether there is an abnormality based on the procedure information;

Step 44, sending a stop instruction to the storage device if there is an abnormality.

Based on the corresponding content in the above-mentioned rules about the normal reading of files by computer device, the above step 43 of "determining whether there is an abnormality based on the procedure information" may include at least one of the following:

determining that there is an abnormality if the process of the storage device reading data based on the data interaction instruction does not conform to the set process rule;

determining that there is an abnormality if a context operation is not specified in the process of the storage device reading data and/or writing data based on the data interaction instruction; wherein, when reading data, the specified context operation is the operation of reading the folder where the data is located; when writing data, the specified context operation is the operation of obtaining the folder where the data is located;

determining that there is an abnormality If the process of the storage device reading data and/or writing data based on the data interaction instruction does not start the read or write operation from the first sector address of the cluster or block where the data is located;

determining that there is an abnormality if the storage device reads more than a set number of files within a preset time period based on the data interaction instruction.

Optionally, when the read/write operation is abnormal, manual confirmation can be performed in combination with the manual confirmation mode, or information can be fed back to the computer device. For example, the method provided in this embodiment also includes the following steps:

Step 51, sending feedback information to the computer device if there is an abnormality; wherein, the feedback information includes: false information that simulates successful writing, or takes preset data as data successfully read from the storage device; and/or Step 52, outputting manual confirmation prompt information if there is an abnormality, so that the user can determine whether to continue execution based on the manual confirmation prompt information.

Figure 13:
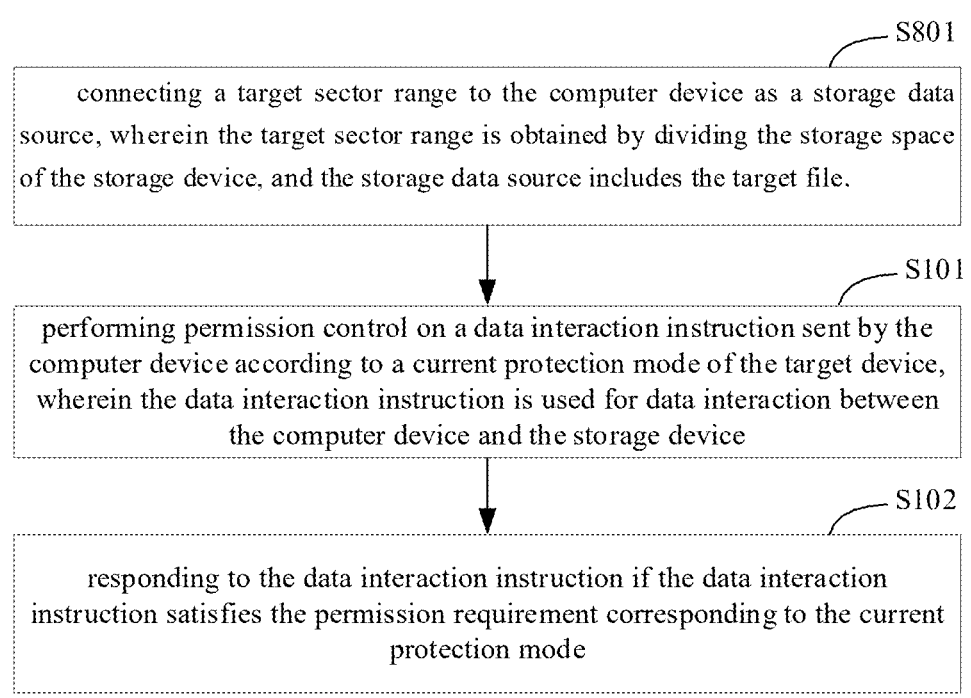
FIG. 13 is a flow chart of the data security protection method shown in the fifth embodiment of the present application.

In some embodiments, based on the embodiment shown in FIG. 1, FIG. 13 is a flow chart of the data security protection method of the fifth embodiment of the present application. The same steps as in FIG. 1 will not be repeated, as shown in FIG. 13, the method also includes:

Step S801, connecting a target sector range to the computer device as a storage data source, wherein the target sector range is obtained by dividing the storage space of the storage device, and the storage data source includes the target file.

In this embodiment, when the protection mode is the logical split disk mode, the storage device is logically split. The logical splitting is a process of dividing the storage space of the storage device based on the sector address of the storage device, which is different from the current system disk partition that only displays multiple partitions on a computer device but actually stores files in the same sector range. For example, the sector address range of hard disk 1 is 0 to 999, and the system disk partition is performed on hard disk 1 to display hard drive 1 and hard drive 2 on the computer device, but the data of hard drive 1 and hard drive 2 are actually stored in the 0 to 999 sector address range of the hard disk 1, and the data of hard drive 1 or hard drive 2 can also be accessed at the same time. However, the logic division mode of the present embodiment is to divide the sector address range of the hard disk 1 into two sector address ranges of 0 to 499 and 500 to 999, which correspond to disk A and disk B respectively, and the data of disk A is stored in the sector address range of 0 to 499, the data of disk B is stored in the sector address range of 500 to 999, so that the data of disk A and the data of disk B do not affect each other in the underlying logic, for example, they can be formatted into different file system. Optionally, the multiple sector ranges after dividing can be accessed to the computer device in the form of independent split disks, or can be accessed to the computer device in the form of files.

That is, when the current protection mode is the logical split disk mode, correspondingly, the method provided in this embodiment further includes the following steps:

Step 61, splitting the specific storage space of the storage device to obtain at least one split disk if the current protection mode selected by the user is a logical split disk mode;

Step 62, selecting one split disk from the at least one split disk as the target split disk, and connecting it to the computer device.

Further, the method provided in this embodiment also includes at least one of the following steps:

Step a, determining the specific storage space in response to user settings; wherein the specific storage space may be all or part of the storage device;

Step b, determining the specific storage space based on the selection rules of the specific storage space in the logical split disk mode.

Wherein, in the above-mentioned step 61, "splitting the storage device to obtain at least one split disk" may include:

reading sector information of the specific storage space in response to a users split instruction, and splitting the specific storage space based on the sector information; or reading sector information of the specific storage space, and splitting the specific storage space based on the sector information and using a preset division strategy; or generating at least one image file in the file system of the storage device, and splitting the specific storage space of the storage device according to the address ranges respectively corresponding to the at least one image file.

Specifically, the "preset disk splitting strategy" can be obtained locally; or obtain the preset disk splitting strategy from the network side server-side.

It should be noted that the server-side in this application is a terminal that uses a network connection (such as using a TCP/IP connection, etc.) or a non-network connection (such as a point-to-point connection using Bluetooth, LoRa, etc.). For example, if two terminals establish a data interaction relationship, and the first terminal provides a data source for read/write operation to the second terminal, then the first terminal can be understood as a server-side. Of course, the server-side can also be understood as servers deployed on the network side, virtual servers, clouds, server clusters, and so on. In addition, the sector in this application should be understood as the storage space address in a broad sense, that is, the area that divides the storage space of the storage device. The sector information includes but is not limited to the total number of sectors (sector address range) and each sector bytes etc. The logical split disk mode is compatible with all protection modes, that is, other protection modes are aimed at the target split disk connected to the computer device after the logical splitting, and the computer device cannot recognize other split disks that are not connected to the computer device. Therefore, the data interaction instructions sent by the computer device can only be oriented to the target split disk.

Through the logical split disk mode, the effect is similar to the "dual hard disk and dual system for computer" of the computer. The hard disk is switched to the internal network system or the external network system through the physical isolation card of the two hard disks, and the storage area and the system are independent of each other. The splitting here is to divide a storage device with only one physical storage area or logically one physical storage area, and logically divide it into two or more storage areas of any number and capacity.

The Specific Implementation Method:

1. Pre-dividing the split disks and select the split disks. Dividing multiple sector ranges in the storage device in advance, and selecting the corresponding sector ranges. For example, the total available sectors of the storage device are 2000, which are divided into 2 split disks equally, and the total number of available sectors of each split disk is 1000. In addition, each split disk can be assigned automatically or manually: vendor ID (Vendor ID), device ID (Product ID), character string information and other hardware characteristic parameters.

2. Responding to computer requesting hardware characteristic parameters. The first is to respond with the split disk capacity parameter. Responding with the relative total number of the capacity of the selected split disk when the computer device sends an instruction requesting a capacity parameter. For example, when the computer sends the SCSI or UFI instruction code 0x25 (READ CAPACITY), the protection module responds with the last logical block address of the logical split disk. When the computer sends the SCSI or UFI command code 0x23 (SCSI_READ_FORMAT_CAPACITIES), the protection module responds with the number of available sectors (or available blocks) and the number of bytes of a single sector (or block). So that the computer thinks that the capacity value of the storage device is the capacity value of the logical split disk. The second is to respond with hardware characteristic parameters such as the vendor ID (Vendor ID) and the device ID (Product ID) of the split disk. Responding with hardware characteristic parameters corresponding to the split disk when the computer sends an instruction requesting hardware characteristic parameters. For example, when the computer sends a device descriptor (0x80 0x06 0x00 0x01 0x00 0x00 0x12 0x00) request in the USB protocol, the protection module responds with the corresponding vendor ID (Vendor ID) and product ID parameters in the device descriptor. The third is to respond with the character string information parameters of the split disk. Responding with the character string information corresponding to the split disk when the computer sends an instruction requesting a character string descriptor. For example, when the computer sends a request for the string descriptor (0x8006010309040200, 0x8006020309041200, 0x8006030309042800) in the USB protocol, the protection module responds with the corresponding string information in the string descriptor.

3. Read and write mapping. When the computer sends a data interaction instruction, the protection module maps it to the corresponding sector range by offset. When disk 1 is selected, if the computer reads sector 0, it reads sector 0 of the removable storage device and returns; if the computer reads sector 1, it reads sector 1 of the storage device and returns, and so on, and the maximum readable sector is sector 999; when disk 2 is selected, the computer reads sector 0, then it offsets 1000 sectors, reads 1000 sectors of the removable storage device and returns; when the computer reads sector 1, then it reads sector 1001 of the storage device and return, and so on, and the maximum readable sector is sector 1999, and the data of sectors 0 to 999 of the storage device cannot be read. The address of sector 0 and sector 1 written by the computer is also consistent with the above sector position read by offset mapping, and so on. When the sector address read or written by the computer beyond the range of the split disk, it returns the read or write error status.

If the capacity of the storage device is 2000 k bytes, it is assumed that the storage device has two split disks after splitting, which are disk 1 and disk 2 respectively. The capacities of split disk 1 and split disk 2 are the same, for example, both are 1000 k bytes. When disk 2 is selected, the total capacity displayed by the computer is 1000 k bytes. Formatting disk 2 and copying data to it will not affect all the data in split disk 1. What needs to be added here is that the above sector range and total capacity data are examples for easy understanding, and the number will be much larger in actual scenarios.

The difference between logical split disk and a specific-folder read and write. The idea of realizing logical split disk is roughly the same as that of specific file read-write and blank folder. It mainly maps the sector addresses for read/write interaction instruction of a computer to the relevant sector addresses of a storage device. Specific folder read/write and blank folder are mainly to map the sector address of one file to the sector address of another file, wherein the file system, total storage capacity and remaining space are consistent with the original disk, and the file system cannot be formatted. The split disk mode does not consider specific files, but directly maps a sector address range, wherein the total storage capacity and remaining space are independent, and the file systems can be formatted separately.

Specific scenarios for splitting storage devices:

The first is to automatically divide the external storage into logical split disks (storage media splitting). In the form of an intermediate device or a card reader, any connected storage device is split. The protection module reads the basic information of the storage device (connected USB flash disk, SD card, TF card) in advance: the total number of sectors, the number of bytes in each sector, vendor and device ID, string information, etc. For example, when the capacity of the storage device (such as USB flash disk, etc.) is 16G, if the storage device is divided into 2 split disks by default, it will be automatically divided into 2 split disks of 8G; if the storage device is divided into 3 split disks by default, it will be divided into one 8G split disk and two 4G split disks; 16G and 2*8G for 32G, and 2*16G for 64G, etc.

The second is to automatically divide the internal storage space (storage media splitting). As a form integrated in the removable storage device, one or more physical storage areas can be stored in the internal storage (FLASH) for logical splitting. Since the storage medium is fixed inside the device, and the storage physical capacity is known and fixed at the time of production, the above step of pre-reading the basic information of the storage device is omitted. Preset the basic information of the storage media device: the total number of sectors, the number of bytes in each sector, vendor ID and device ID, string descriptor, etc.

The third is to split in the form of file mirroring. An image file is generated in the file system of the storage medium, and the content data of the image file is used as sector ranges for splitting the split disk. Map all sectors of the split disk directly to the content data of a specific file. The size of the split disk can be pre-set by means of file occupation. For example, a blank "split disk 1.dd" file of 16 GB is generated, and at this time, the size of the split disk is 16G. It can also be written by appending file data when there is a need to read/write, and the size of the split disk is the size of the existing data on the split disk plus the total remaining space of the USB flash disk (or called blank data area), which can make full use of the data space of the storage device. To be more specific, for example, the path of the split disk image file is "My USB flash disk\My folder\split disk 1.dd". And the basic information corresponding to the split disk (the total number of sectors, the number of bytes in each sector, vendor ID and device ID, character string information, etc.) is preset.

When using the split disk 1, when the computer enumerates, the protection module returns the basic information of the split disk, and when the computer reads and writes data, the protection module actually reads and writes the file content data of "split disk 1.dd" for mapping. For example, when the computer reads sector 0, it will return the address of the first sector of the content data of the "split disk 1.dd" file; when the computer reads the data corresponding to the sector address 100, it will return the data corresponding to the sector 100 of the file "split disk 1.dd"; when the computer writes data into the sector 200 to 300, then write the data into the data corresponding to the sector 200 to 300 of the "split disk 1.dd" file.

The fourth is to split the disk through the network service (actually, it is connected to the network data source). As the principle of splitting in the form of file mirroring, the basic information corresponding to splitting is preset locally on the storage device or on the server-side: the total number of sectors, the number of bytes in each sector, vendor ID and device ID, string information, etc. The difference is that the image files generated and used are stored on the server-side. The networked protection module (networked USB flash disk) itself may not store data, or store a small amount of data (for optimizing the startup method, or the network configuration of the connected network server-side), and the networked USB flash disk is connected to the network server through wired or wireless methods, and sends the identification information of the networked USB disk. The background server associates the corresponding image file (such as "split disk 1.dd") according to the identification information of the networked USB disk. When the computer sends interactive instructions to the USB flash disk (such as reading sectors), forward the read/write requirements of the interactive instructions to the server (the main information of the command is: read or write operation, starting sector address, continuous read or write sector length). After receiving the request sent by the USB flash disk, the server returns the data corresponding to the sector address corresponding to the related image file (such as "split disk 1.dd" corresponding to disk A) file.

In addition, the identification symbol can be bound to three files: "split disk 1.dd" corresponding to Drive A, "split disk 2.dd" corresponding to Drive B, and "split disk 3.dd" corresponding to Drive C, which can be switched according to the data source. In addition, for the above-mentioned logical split disk mode (division of connected storage devices (such as USB flash disk), division of internal storage media, division of image files stored in files, division of network image files), parameters that can customize descriptors are required, so that the computer can distinguish them into different storage devices (such as different USB flash disks), and the realization method is "configuration information"+"data source". Configuration information includes: descriptor set and basic information. The descriptor set includes: device descriptors, configuration descriptors, interface descriptors, endpoint descriptors, etc. Basic information includes: capacity information such as the total number of sectors, the number of bytes in each sector, and parameters of the mass storage device such as read-only or read-write status. In addition, "configuration information" can be stored in a hidden location of the data source, for example, the last sector and cannot be accessed by the computer as USB flash disk data; it can also be stored in the database of the server-side; it can also be stored in a certain sector or file stored in the built-in protection module.

The Advantages of Doing this are:

It can give full play to the storage space of the storage device, and effectively reduces the hardware cost compared to using multiple storage devices or memory chips for switching to achieve isolation, so that one storage device or memory chip can meet a variety of different needs, for example, it can be formatted into different file systems in the split disk mode to realize the use in different scenarios. In addition, more secure protection can be achieved. Each split disk is directly independent of each other (the data source is independent, and the hardware characteristics can also be different), and the control is performed at the data communication layer. The computer only considers the connected storage device as the capacity of the split disk, and will not read the sector beyond the range. If it is forced to read sectors beyond the range of the split disk, the protection module will not execute the instruction. In addition, the solution provided by the embodiment of the present application may not depend on the type and kind of the storage device and the formatted file system, as long as a communication connection and read-write control can be established with the protection module, logical splitting can be realized.

Data is stored in the server-side, and the protection module can switch data sources at any time according to different scenarios. Data reading and writing are all stored in the server-side, and the protection module is essentially just a front-end device. When the protection module is lost, the data is still stored in the server-side. In addition, the computer device cannot know the data source, and the protection module can use the built-in mobile cellular network, or the WiFi of the protection module user, etc., instead of connecting to the network via the computer, and the network traffic does not pass through the computer. Also, for the computer, it is impossible to intuitively control whether the data of the storage device is stored in the server-side or in the local storage medium of the protection module. In addition, the protection module of the embodiment of the present application is different from the existing network USB flash disk. In the prior art, the files of the server-side are first downloaded to the network USB flash disk storage device, and then the files in the file system of the storage device are read and downloaded by the computer; Or the computer first writes the file into the file system of the storage device of the USB flash disk, and then uploads the file to the server-side by the network USB flash disk. In this case, it needs to occupy the capacity of the network USB flash disks own storage space. For example, a 16G network USB flash disk cannot transfer 32G files, or a network USB flash disk with less than 4G remaining space cannot transfer files larger than 4G. The present invention does not have the problem of file limitation by means of data forwarding. On the other hand, the data of the entire storage split disk cannot be switched. And in the present invention, based on sector address reading and writing, Drive A can be formatted as FAT32 file system correspondingly, and there are files A.txt, B.txt; Drive B can be formatted as exFat file system, and there are files C.txt, D .txt, and can be directly connected to the computer for display. However, existing network USB flash drives can only select specific files to copy. In addition, image files such as "split disk 1.dd" mapped on the server-side can be database data, or the combination, splicing, and mapping of multiple files based on distributed storage technology, optimized storage, and CDN network acceleration, etc.

How to Choose a Data Source:

1. Selecting by physical button. By switching the physical button of the protection module (such as the physical switch buttons corresponding to the selection of the data sources of the split disk in FIGS. 2B and 2C), select the corresponding split disk data source (such as storage medium split disk, image file split disk, networked image files split disk, etc.).

2. Selecting by NFC. Through the communication module such as Bluetooth, WiFi, and serial port interface of the protection module, an instruction for selecting a split disk data source is sent to it. After receiving the instruction, the protection module selects the corresponding split disk data source.

3. Selecting by remote communication. Through the networking of the protection module, the instruction of the split disk data source is obtained from the server-side, and the corresponding split disk data source is selected. The instruction of the server-side is set by the user connecting to the server-side through APP, applet, webpage and other programs.

4. Selecting by the key (or characteristic value) sent by the computer. When split disk is created, its basic information contains corresponding key information. After the protection module is connected to the computer, the computer sends an interactive instruction with key (or characteristic value) information, and the protection module matches the basic information set of the split disk according to the key. When the match hits, select the corresponding split disk data source. For example, split disk 1 corresponds to key A, split disk 2 corresponds to key B, and the key to access all split disks at the same time is C. When it is verified that the instruction carries key A, it is confirmed that the split disk 1 is connected to the computer device; When it is verified that the instruction carries key B, it is confirmed that the split disk 2 is connected to the computer device; When it is verified that the instruction carries key C, it is confirmed that the split disk 1 and split disk 2 are connected to the computer device at the same time. When being connected to the computer device, it is verified by the key sent by the computer to determine that the selected target storage data source is connected, so as to improve the security of the storage data source.

Based on the above method of selecting a data source, it can be known that the step "selecting a split disk from the at least one split disk as a target split disk" in the method provided by the embodiment of the present application may include:

taking a split disk selected by the user as the target split disk in response to the users selection operation of the at least one split disk through an interaction device; or taking the split disk indicated by the split disk selection instruction as the target split disk when receiving the split disk selection instruction sent by the specifying device, wherein the specifying device communicates with the protection module through near-field communication or remote communication;

wherein the specifying device and the computer device are different devices; or receiving the information carrying the disk key sent by the computer device, verifying the disk key, and after the verification is passed, taking the split disk with the disk key in the at least one split disk as the target split disk.

Optionally, the access mode of the target split disk can be set by toggling a switch, remote control, and computer configuration. As an example, in one possible implementation, the target device is provided with a physical switch to select the split disk, and the target split disk can be selected by toggling the physical switch. In another possible implementation, the target device is provided with a communication unit such as WiFi, Bluetooth, infrared, or ultra-wideband to be used to connect with the remote-control device, through which the target split disk is selected. In another possible implementation, the communication connection is performed through a computer device to select a target split disk through that computer device.

Optionally, when the computer device reads the total number of sectors of the storage device, it returns the total number of sectors of the selected split disk to the computer device; When a computer device sends a data interaction instruction to read/write sector, it maps the real sector position of the split disk sector.

It should be noted that the term "dividing" in the "target sector range by dividing the storage space of the storage device" as used above, and the "splitting" in the "splitting the specific storage space of the storage device" as used above essentially refer to a mapping strategy in terms of actual technical implementation. The mapping strategy can be pre-configured. For the storage medium (or storage device), there is actually no change, and its disk capacity information, sector address read/write have not changed; It is only based on this mapping strategy in the protection module that the user sees the effect of splitting on the computer device side. In other words, the splitting of the specific storage space of the storage medium by the protection module is a virtual and conceptual splitting, and what is presented to the user on the computer device side is the splitting effect without any change on the storage medium.

In some embodiments, based on the embodiment shown in FIG. 13, it also comprises before step S102:

reading sector information of the storage device;

based on the sector information, dividing the storage space of the storage device to obtain a plurality of sector ranges corresponding to the storage device, wherein the target sector range is at least one of the plurality of sector ranges.

In this embodiment, based on the preset number of split disks, the sector address range of the storage device is divided to obtain the sector address range of each storage space. The preset number of split disks can be a preset value, or a quantity selected by the user in real time before logical splitting. The range splitting manner may be a manner of dividing the sector address of the storage device based on a preset range size, or a manner of dividing the sector address of the storage device based on a range size selected by the user in real time.

Optionally, if the preset allocation quantity is a preset value, when the computer device and the storage device are connected in communication, when the target device is in the logical split disk mode, the sector information of the storage device is divided into ranges according to the default value, so as to realize plug and play.

For example, if the preset allocation quantity is the quantity selected in real time, when the computer device and the storage device are connected in communication, when the target device is in the logical split disk mode, the options to provide the user with the split disk quantity and sizes of each split disk are displayed on the computer device, and the storage device is logically split based on the quantity and sizes of the split disks selected by the user in real time. For example, the sector address range of the storage device is 0 to 1999, and the number and the sizes of split disks are displayed on the computer device. If the user selects the number of split disks as 2 and the sizes of each split disk are the same, the split disk corresponding to the sector address range 0 to 999 and the split disk corresponding to the sector address range 1000 to 1999 are obtained.

When the target device is an intermediate device, and the intermediate device is connected with multiple storage devices at the same time, it can perform logical splitting on multiple storage devices, or perform physical splitting based on each storage device to obtain the same number of split disks as the number of storage devices.

Figure 14A:
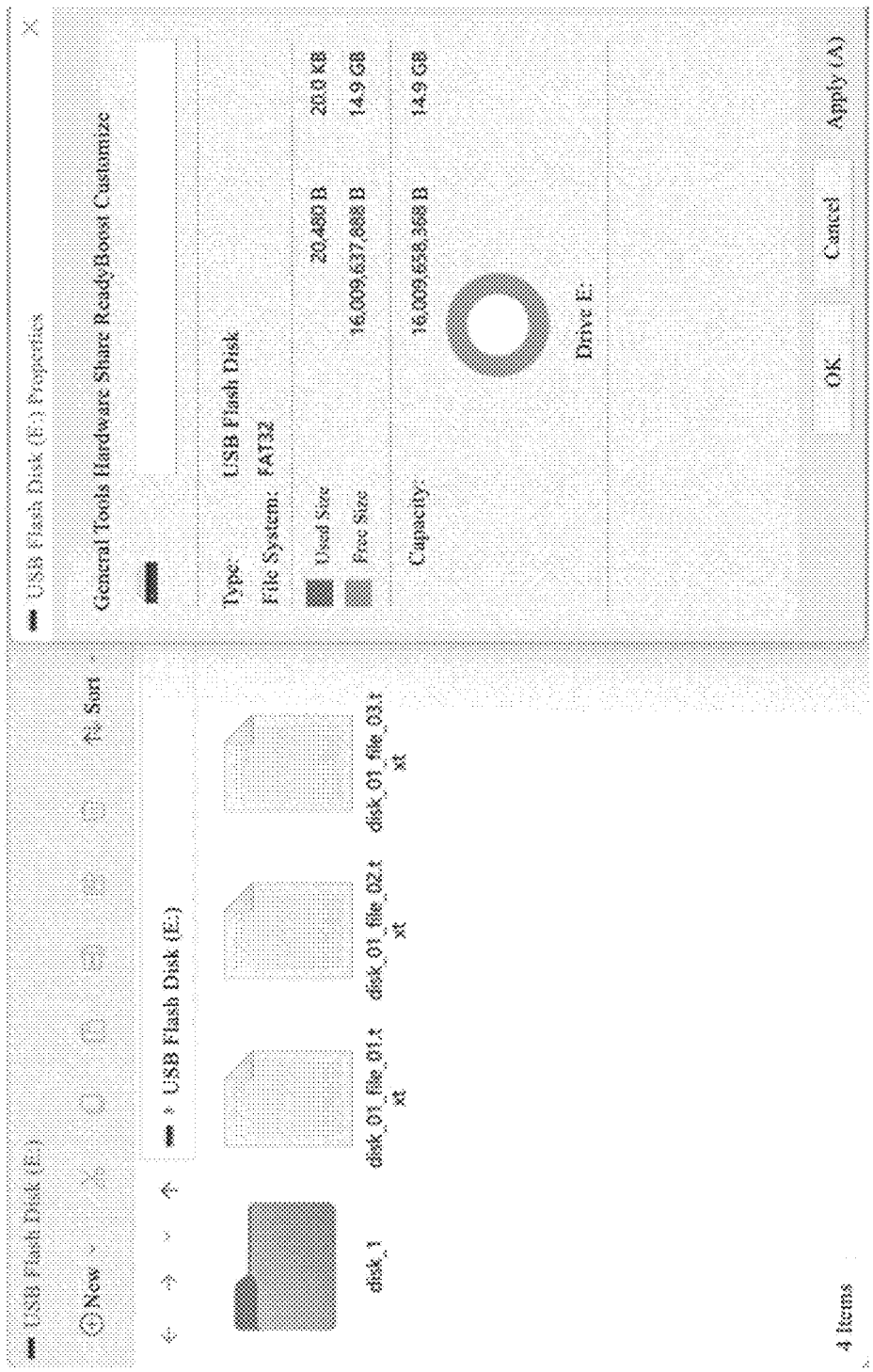
FIGS. 14A, 14C, 14E, and 14G are example diagrams showing the logical split disk mode.
Figure 14B:
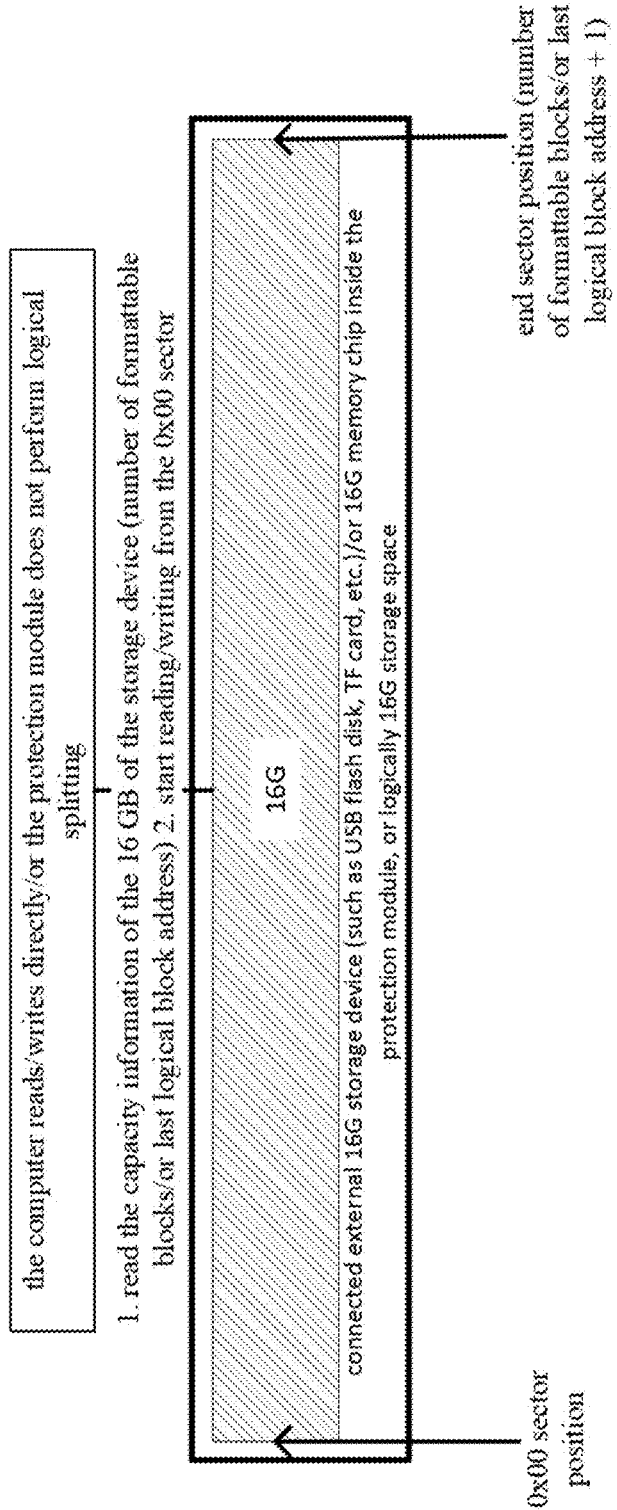
FIG. 14B is a schematic diagram showing the storage space before logical splitting of the available space from a physical perspective.
Figure 14C:
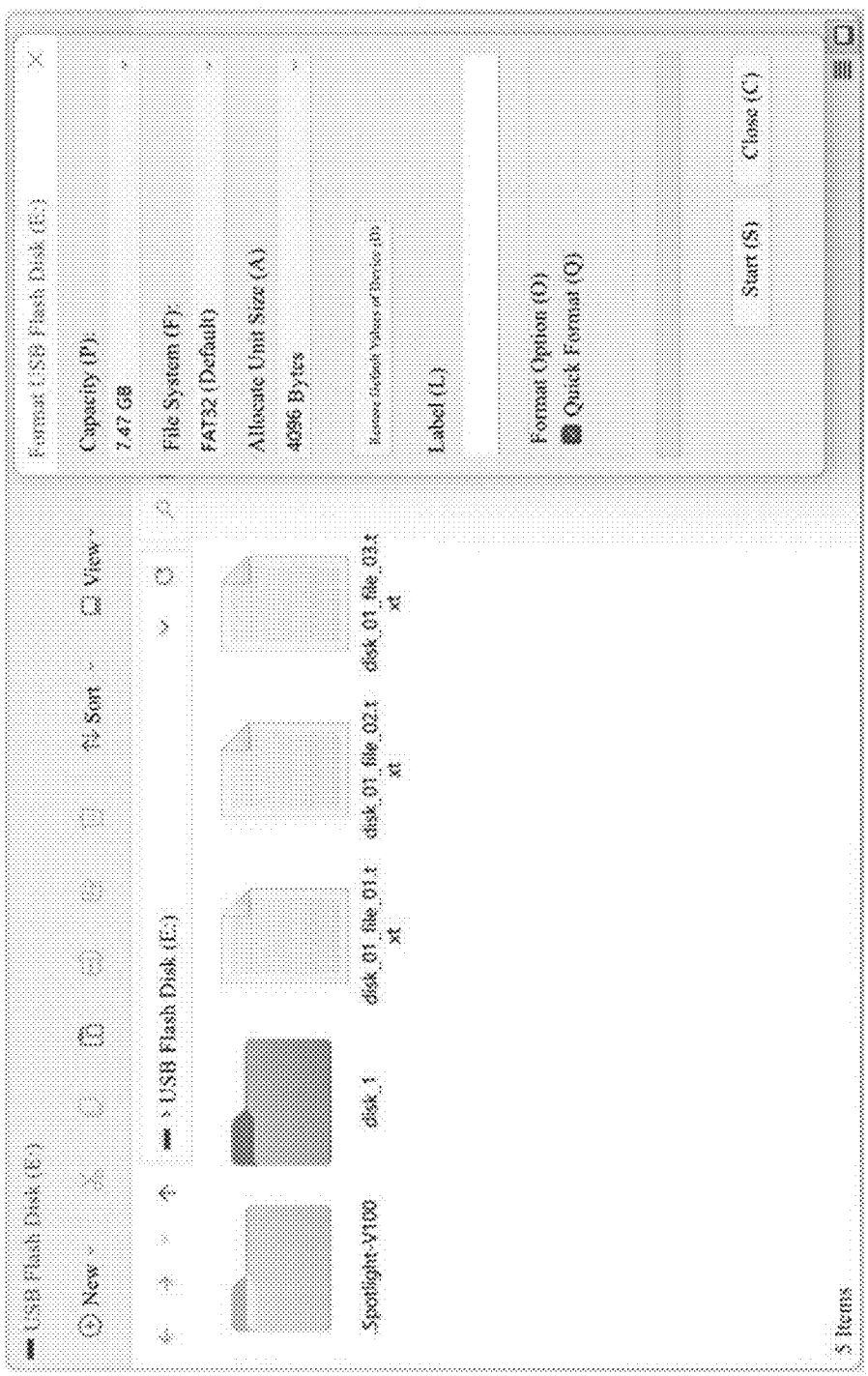
Figure 14D:
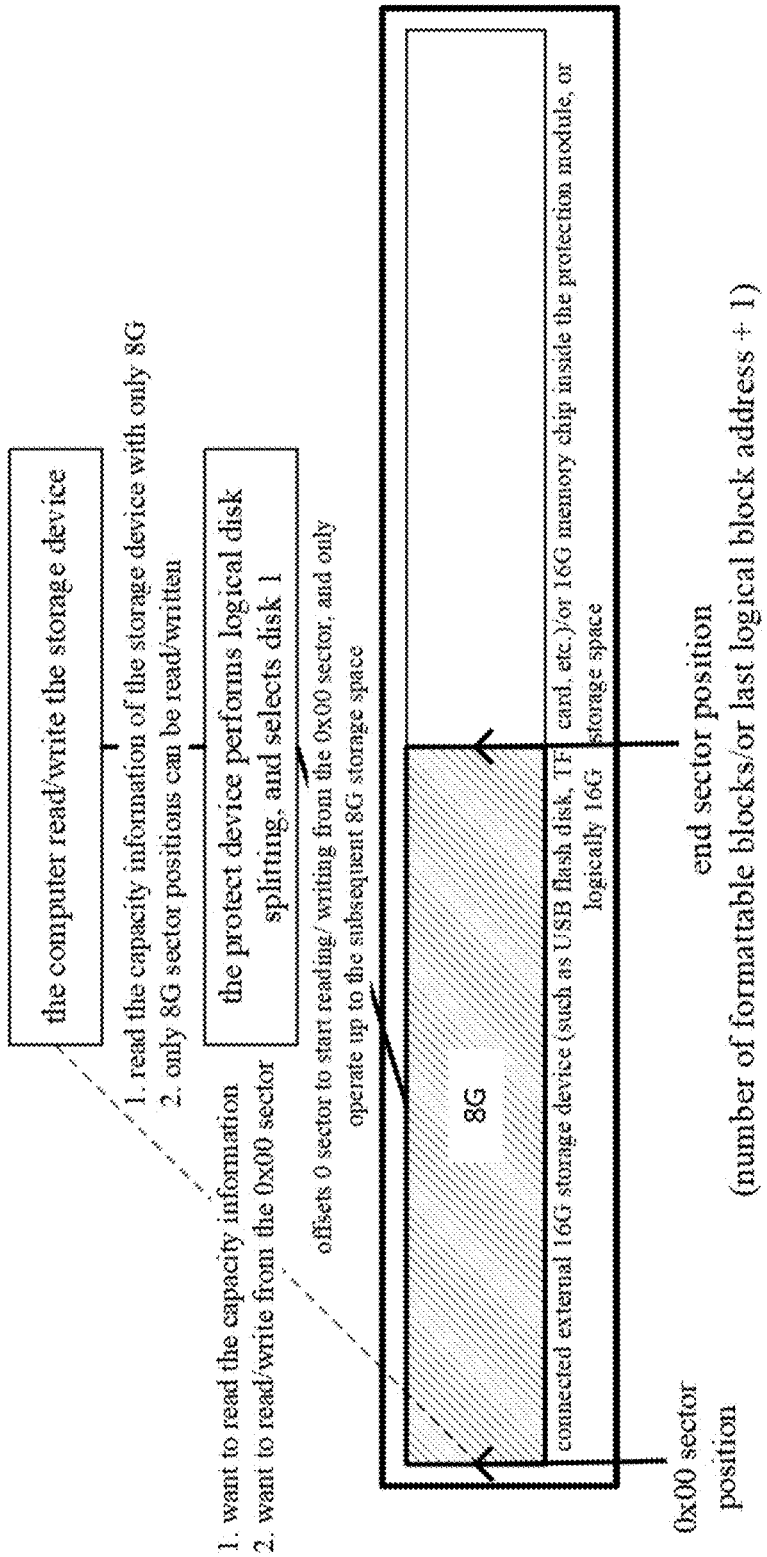
FIG. 14D is a schematic diagram showing an 8 GB storage space corresponding to the first split disk from a physical perspective.
Figure 14E:
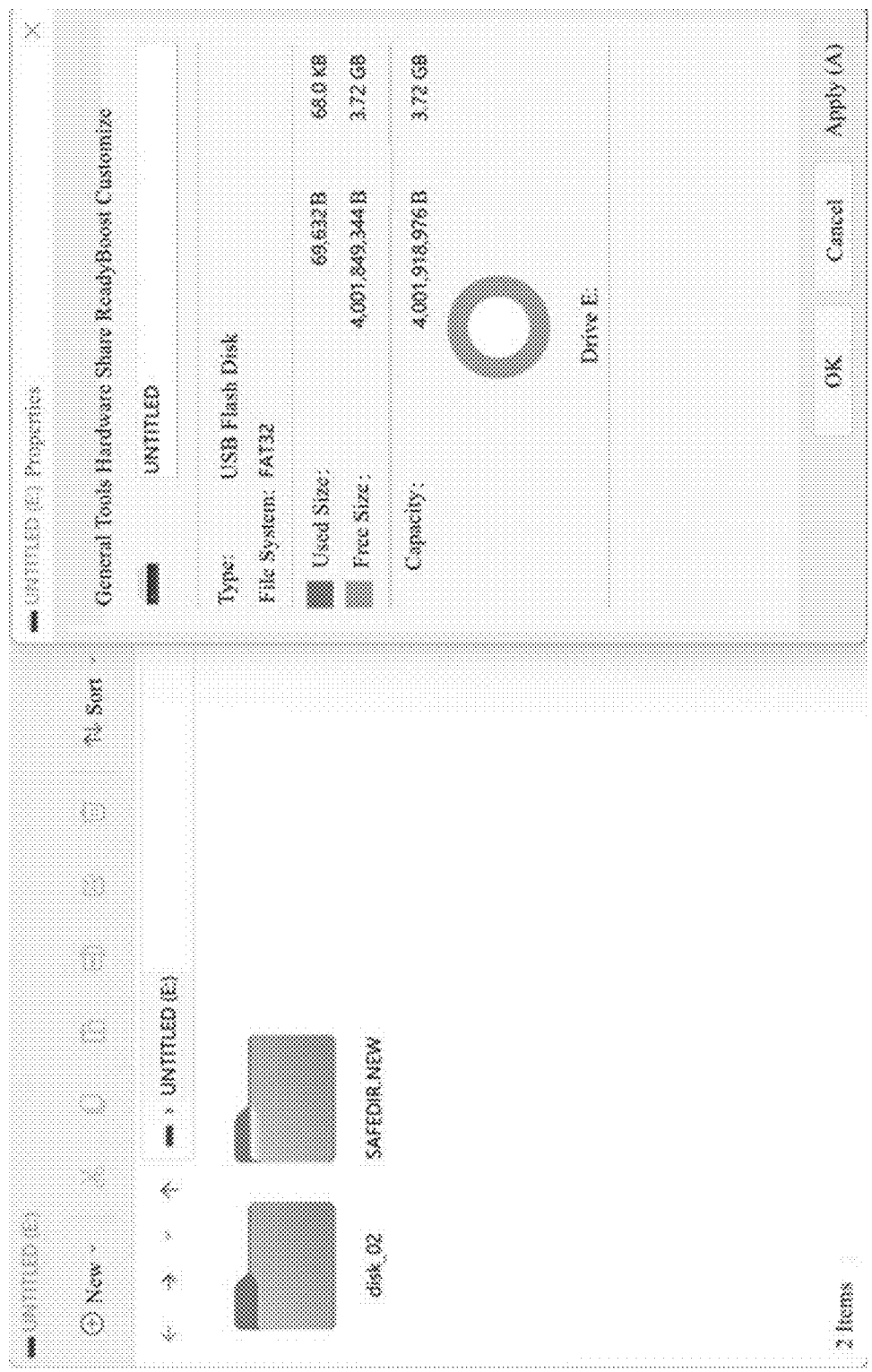
Figure 14F:
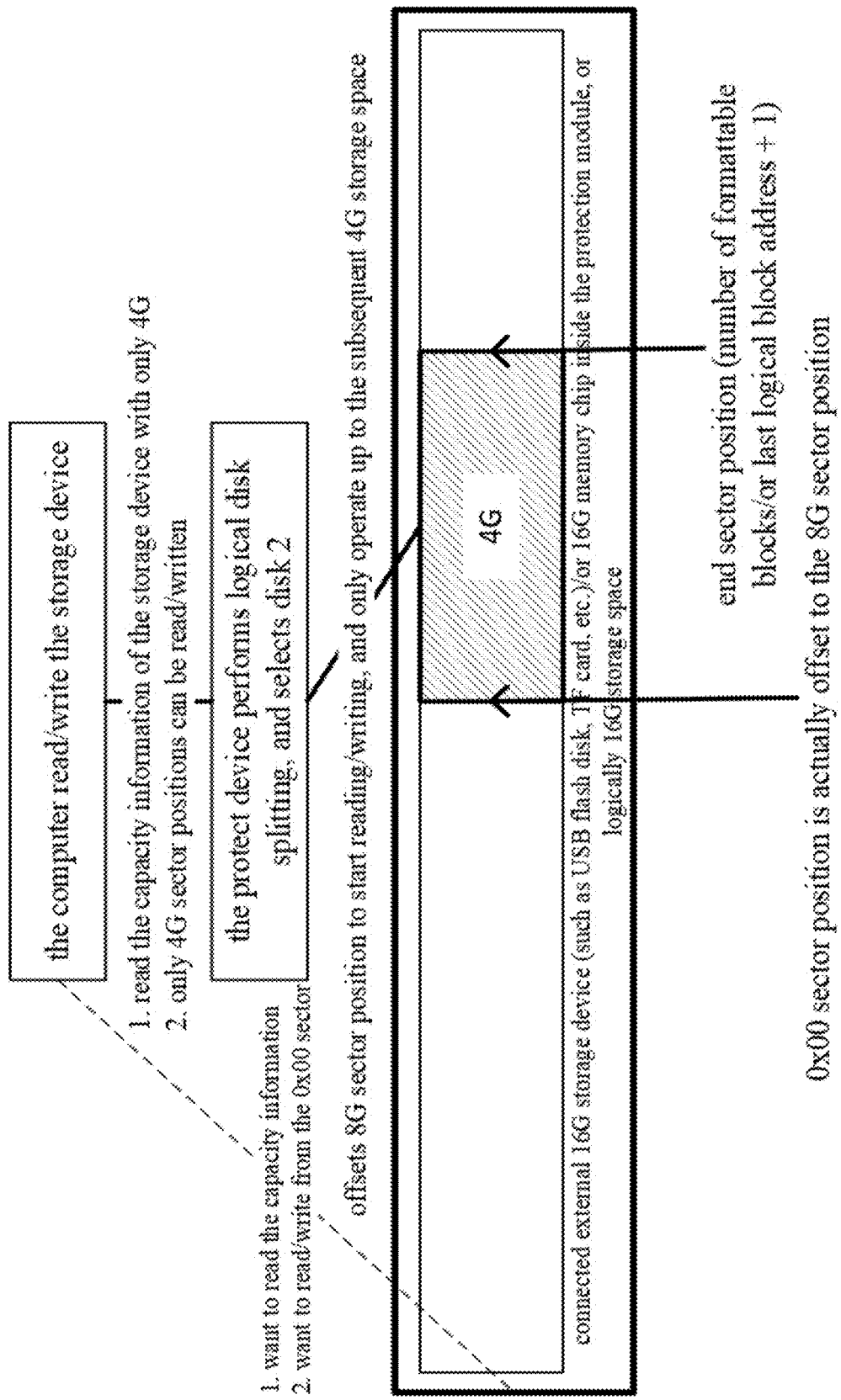
FIG. 14F is a schematic diagram showing a 4 GB storage space corresponding to the second split disk from a physical perspective.
Figure 14G:
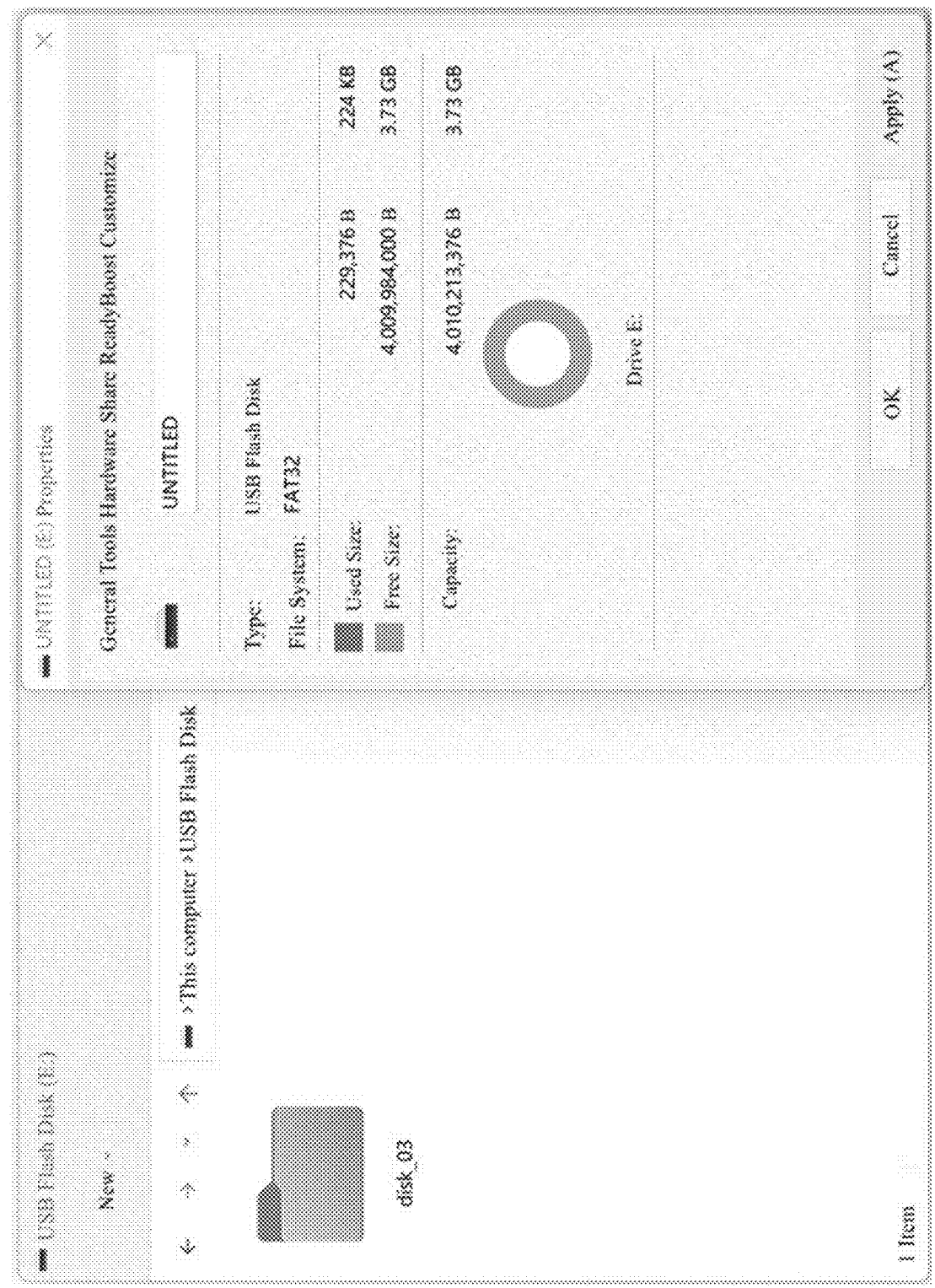
Figure 14H:
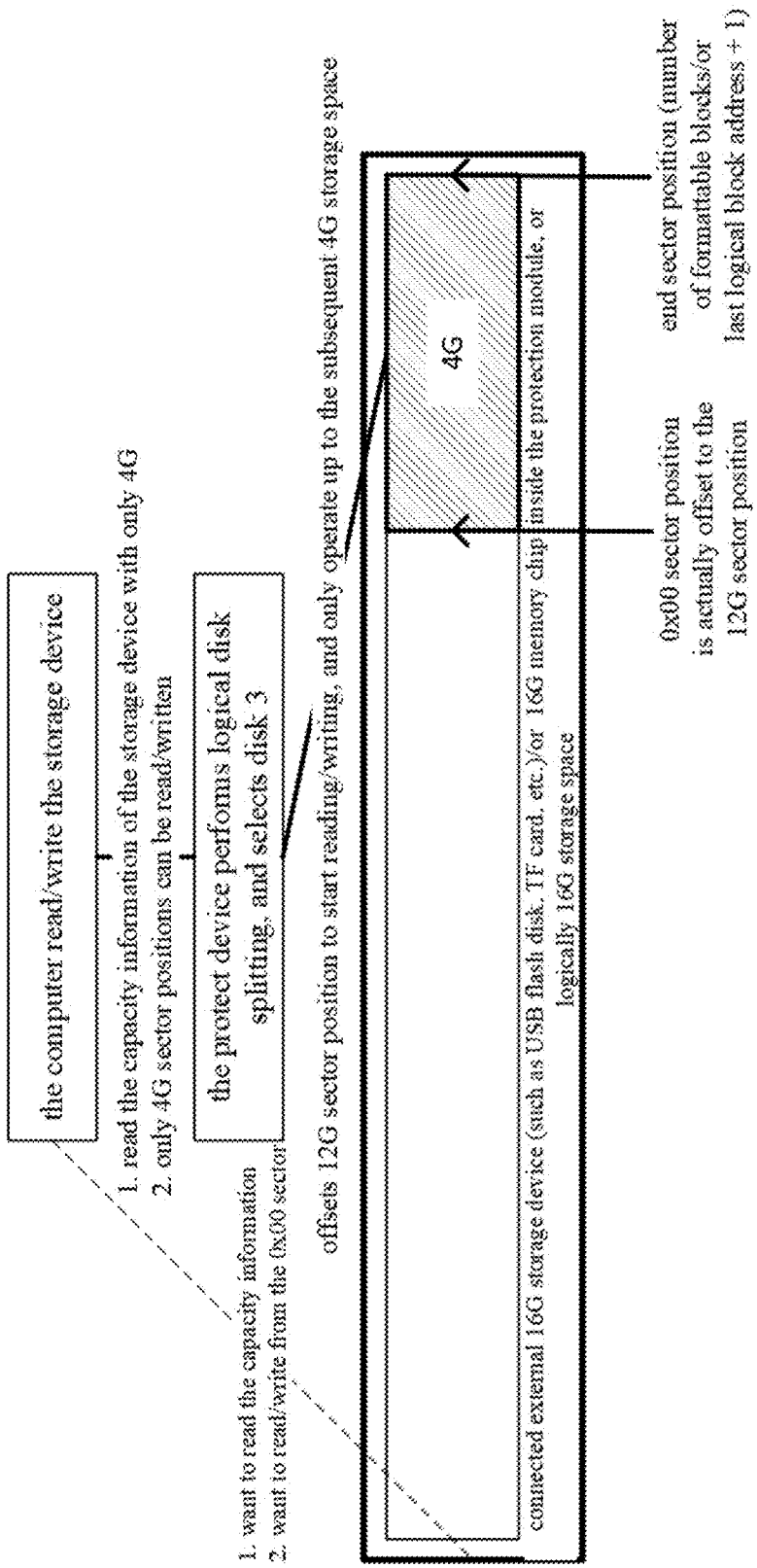
FIG. 14H is a schematic diagram showing a 4 GB storage space corresponding to the third split disk from a physical perspective.

FIGS. 14A, 14C, 14E, and 14G are example diagrams showing the logical split disk mode. FIG. 14A shows that the display value of the available space of the storage medium (such as a USB flash disk with a protection module or a USB flash disk connected with an intermediate device) is 14.9 GB (the theoretical available space is about 16 GB). FIG. 14B is a schematic diagram showing the storage space before logical splitting of the available space from a physical perspective, for example, from the 0x00 sector position to the end sector position (that is, the number of sectors corresponding to the available space or the last logical block address of the available space+1). Assume that it needs to be divided into one 8 GB (theoretical value) split disk and two 4 GB (theoretical value) split disks, for a total of 3 logical split disks. Refer to FIG. 14C, which shows the information related to the first logical split disk, such as capacity, file system, split disk unit size, remarks, etc., the quick format in the format option can also be checked, and the action of restoring to defaults can also be controlled to trigger through the "Restore Device Defaults", and so on. The example shown in FIG. 14C shows that the capacity of the first logical split disk is 7.47 GB (theoretically it can be 8 GB), the file system is FAT32 (default), and the allocated unit size is 4096 bytes. The window shown in FIG. 14C is a formatting page displayed after the first logical split disk is selected. The formatting page shows that the capacity of the first logical split disk is 7.47 GB (theoretical value is 8G). After the user clicks the "Start" control, the first logical split disk can be reformatted. FIG. 14D is a schematic diagram showing an 8 GB storage space corresponding to the first split disk from a physical perspective. Referring to FIGS. 14E and 14G, it shows the attribute information of the other two logical split disks, that is, two 4 GB logical split disks, disk_02 and disk_03. FIG. 14F is a schematic diagram showing a 4 GB storage space corresponding to the second split disk from a physical perspective. FIG. 14H is a schematic diagram showing a 4 GB storage space corresponding to the third split disk from a physical perspective.

After splitting, the sector ranges corresponding to each disk are independent of each other, do not interfere with each other, and the data is isolated from each other. For example, the file directories of the above three logical split disks are completely different, and cannot access each other.

Figure 14I:
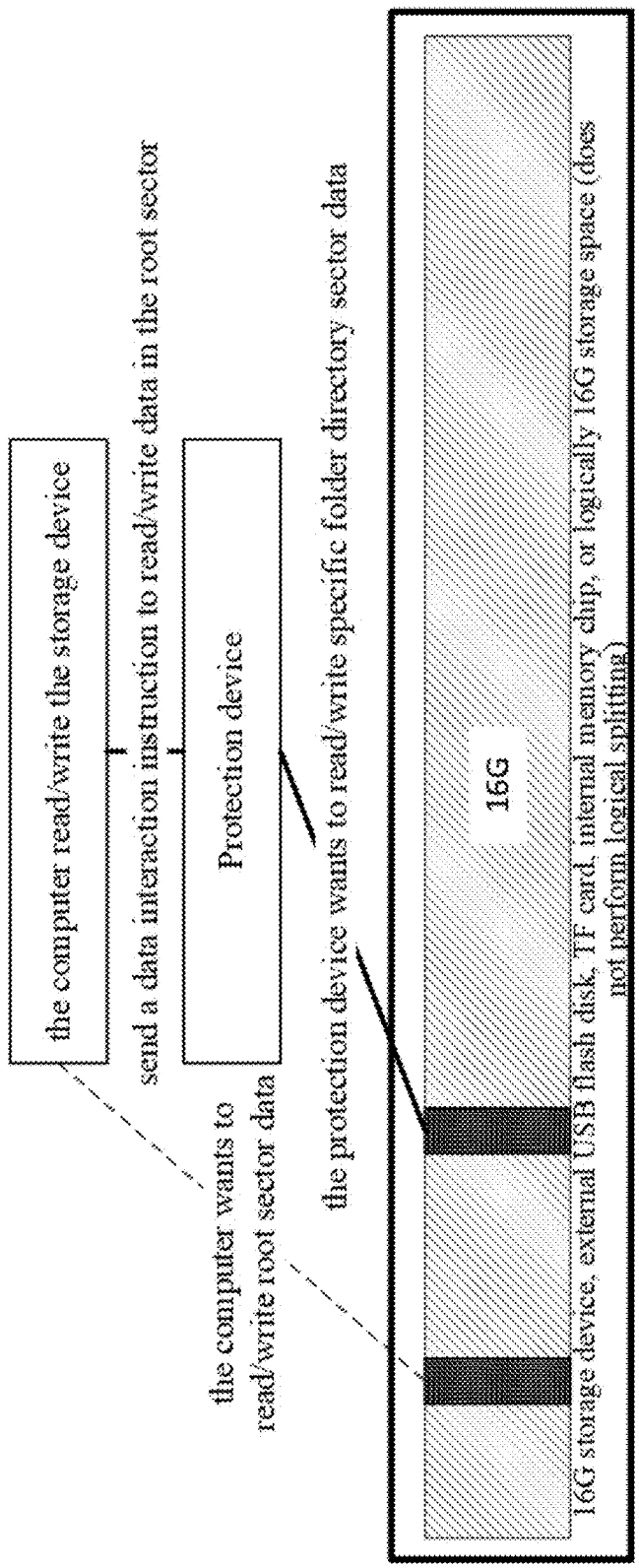
FIG. 14I is a schematic diagram showing responding to the computer reading/writing the storage space in a specific folder mode when the protection module does not perform logical splitting.

FIG. 14I is a schematic diagram showing responding to the computer reading and writing to the storage space in a specific folder mode when the protection module does not perform logical splitting. As shown in FIG. 14I, the dotted line indicates that the computer device wants to read/write the sector data of the root directory. In fact, after the protection module receives the data interaction instruction for reading/writing the sector data of the root directory sent by the computer, the protection module reads/writes specific folder directory sector data and return it.

Figure 14J:
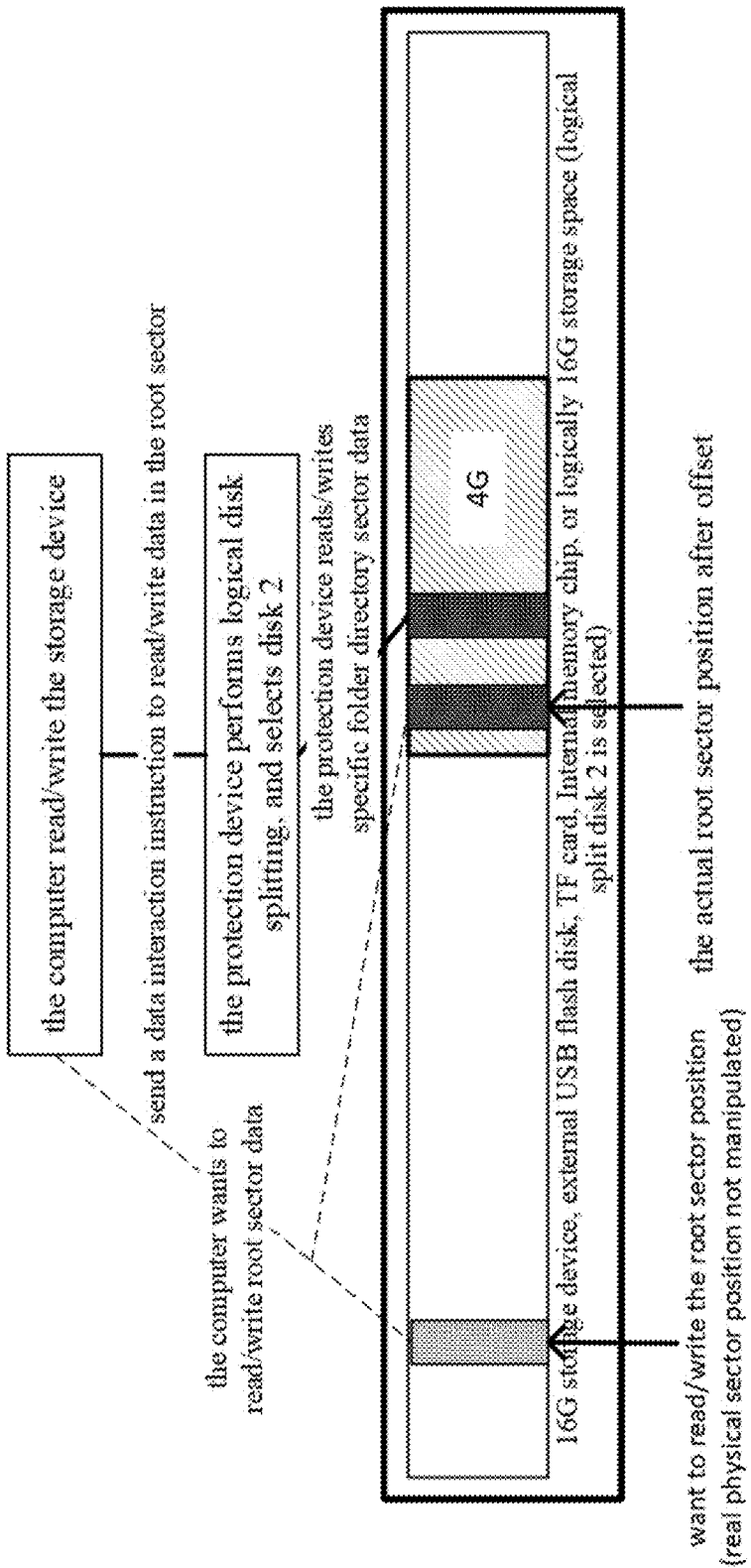
FIG. 14J is a schematic diagram showing that the current protection mode of the protection module is a combination mode of a logical split disk mode and a specific folder mode, and a logical split disk 2 is selected in the combination mode of the logical split disk mode and the specific folder mode.

FIG. 14J is a schematic diagram showing that the current protection mode of the protection module is a combination mode of a logical split disk mode and a blank folder mode, and responds to the computer reading/writing the storage device in the case that the storage space is divided into three logical split disks under the combination mode of logical split disk mode and blank folder mode. As shown in FIG. 14J, the dotted line indicates that the computer device wants to read/write the sector data of the root directory, and the sector position of the root directory can be offset to the sector position corresponding to the second logical split disk. After the computer device sends the data interaction instruction for reading/writing the sector data of the root directory, the protection module selects the split disk 2, and the protection module reads/writes the sector data of the specific folder directory on the split disk 2 and returns it.

Figure 15:
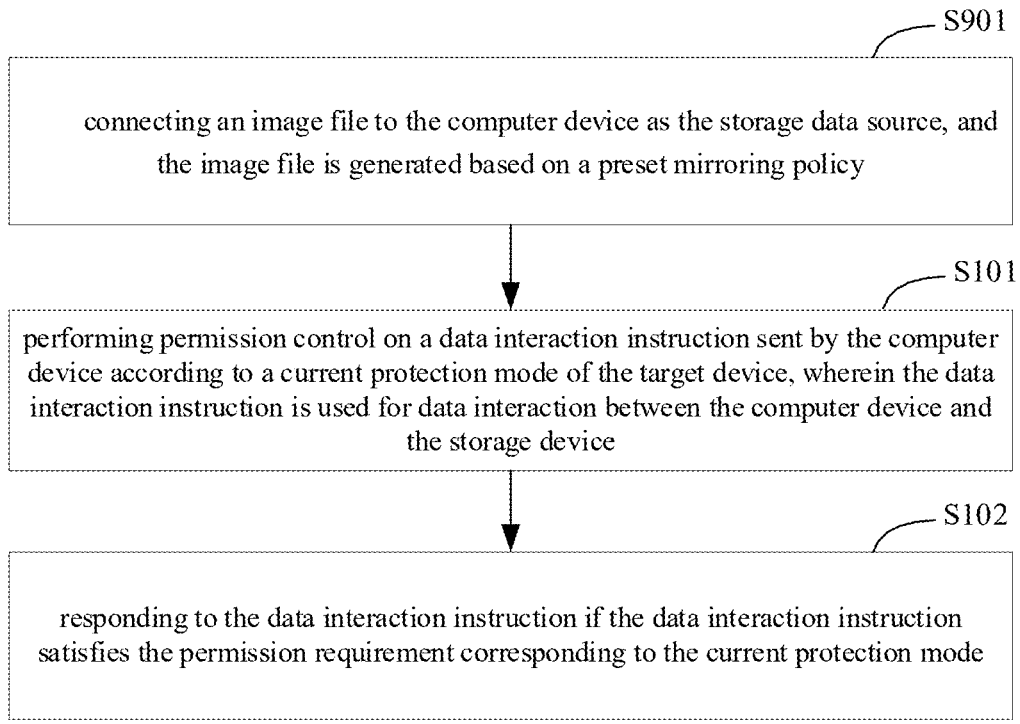
FIG. 15 is a flow chart of the data security protection method shown in the sixth embodiment of the present application.

In some embodiments, based on the embodiment shown in FIG. 1, FIG. 15 is a flow chart of the data security protection method of the sixth embodiment of the present application. The same steps as in FIG. 1 will not be repeated, as shown in FIG. 15, the method also includes:

Step S901, connecting an image file to the computer device as the storage data source, and the image file is generated based on a preset mirroring policy.

In this embodiment, the preset mirroring policy can be obtained by creating a blank image file; it can also be obtained by copying an existing image file, and it can also be obtained by mirroring the data area of the storage device.

For example, for the method of creating a blank image file: generating a preset storage image file (which may be a blank file "split disk 1.dd" with a size of 16G) on the storage device to obtain the image file. For the method of copying the existing image file: saving the data of all sectors of the hard disk A of another storage device as the storage file of "hard disk A image file.dd", then "hard disk A image file.dd" is called hard disk A image file, then copy the "hard disk A image file.dd" to a storage device with storage capacity. Through the protection module, the above "split disk 1.dd" or "hard disk A image file.dd" can be connected to the computer device as a data source.

Optionally, for the method of mirroring the data range of the storage device, the size of the data range can be preset by means of file occupancy, for example, to generate a blank "split disk 1.dd" file with a size of 16G, then the data size of the range is 16G; it can also be written by appending file data when there is a need for read/write, then the size of the data range is the size of the existing data in the data range plus the total remaining space of the storage device (or called blank data region), so that the data space of the storage device can be fully utilized.

For example, the computer device reads/writes the storage data source in the form of a file: the file path corresponding to the data range is "E:\My folder\split disk 1.dd" in the USB flash disk, when reading/writing the split disk 1, the target device actually reads/writes the file data of "split disk 1.dd" for mapping. When the computer device reads the 0th data block, it will return the data from 0 to the following 512 bytes (the size of a single sector is 512 bytes) of the first address of the data of the file "split disk 1.dd", that is, return data of the file data block 0, and the file data is read/written in the fashion of (sector address×512) operated by the computer device as the offset. If the computer can directly read/write the sector data corresponding to the file, then directly read/write the corresponding sector of the file.

It should be noted that, for the file split disk in this embodiment and the network split disk in the following embodiments, the sector address should be extended and interpreted as "file data block", that is, one file data block corresponds to one sector. For example: in the case of a single sector size of 512 bytes, reading sector 0 corresponds to reading file data block 0, that is, reading a total of 512 bytes of data from the first address of the file to the following 511 bytes; writing sector 1 corresponds to writing file data block 1, which is equivalent to writing a total of 512 bytes of data from the 512 bytes of the file offset to the next 511 bytes. The subsequent steps will not be described in detail.

Figure 16:
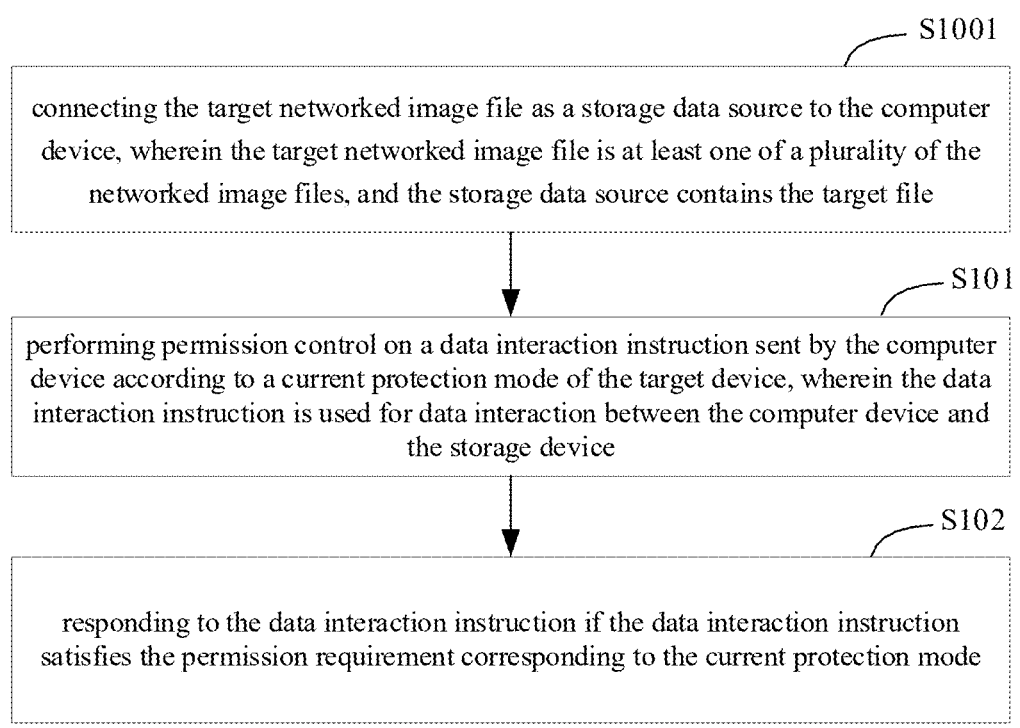
FIG. 16 is a flow chart of the data security protection method shown in the seventh embodiment of the present application.

In some embodiments, based on the embodiment shown in FIG. 1, FIG. 16 is a flow chart of the data security protection method of the seventh embodiment of the present application. The same steps as in FIG. 1 will not be repeated. The storage device is a networked storage device which is connected to a server-side, and the server-side contains a plurality of networked image files, as shown in FIG. 16, the method further includes:

Step S1001, connecting the target networked image file as a storage data source to the computer device, wherein the target networked image file is at least one of a plurality of the networked image files, and the storage data source contains the target file.

In this embodiment, the storage device is a networked storage device. The networked storage device may not store data or may store data, and it communicates with the server-side through a wired or wireless method, wherein the server-side includes multiple networked images files. Optionally, in the case of distributed storage technology, optimized storage and CDN network acceleration, the networked image file can be the data of the database, or the combination, aggregation and mapping of multiple files.

Optionally, the networked storage device is connected to the server-side, and sends identification information to the server-side. The server-side associates the corresponding networked image file according to the identification information of the networked storage device, and forwards the read/write requirements of the data interaction instruction (such as read or write operation, the sector address at which the operation starts, and the length of sector continuously read) to the server-side when the computer device sends a data interaction instruction. After the server-side receives the read/write requirements sent by the networked storage device, it returns the address of the sector file data block corresponding to the networked image file to realize the expansion of the data space of the networked storage device.

Optionally, according to the identification information of the networked storage device, the target networked image file corresponding to the networked storage device is switched and controlled at the server-side, so as to access the target networked image file to the computer device. For example, according to the identification number of the networked storage device (or the users identification information (bound through account login)), three networked image files "split disk 1.dd", "split disk 2.dd" and "split disk 3.dd" are bound, so as to switch the data source connected to the computer device among the 3 networked image files.

For example, the target device is connected to the server-side, and the networked image file "split disk 1.dd" stored on the server-side is connected to the computer device, and the computer device sends data interaction instructions in a single sector size of 512 bytes. If the data interaction instruction is used to read the data of the 0th sector address and write data to the 1st sector address, then the protection module sends a request to the server-side, and the server-side converts the 0th sector to the first address of "split disk 1.dd", and convert the 1st sector to the 512th byte offset address of "split disk 1.dd". According to the converted address, the server-side returns the data from 0th to 511th bytes of the first address of the image file "split disk 1.dd". Write data to the 512th byte of "split disk 1.dd" for the data with the offset address to the next 511 bytes, and the networked storage device returns the result returned by the server-side to the computer device.

The networked storage device of this embodiment can freely switch between different storage data sources without installing software tools on the computer device. The real address of the data source is invisible to the computer, and the data source is stored in the cloud. When the networked storage device is lost, the data source can be canceled remotely, thereby improving the data security of the data storage device. At the same time, in this embodiment, the data corresponding to the specific offset address (or the data corresponding to the sector address corresponding to the file) of the file associated with the server-side is directly read/written, and the data is forwarded directly to the server-side or computer device in a forwarding manner, so that it is not limited by the storage space of the storage device itself, improving efficiency and increasing applicable scenarios.

In some embodiments, the descriptor set (and related configuration files) are used to distinguish data sources in different forms such as independent split disks, files and networked forms, so that computer devices can distinguish different storage devices. The "descriptor set" can be stored in a hidden location of the data source, for example, the last sector, and cannot be accessed by the computer as storage device data. It can also be stored on the server-side, or it can be stored in a sector or file stored in the built-in storage of the protection module.

If the protection module is arranged at the intermediate device, the intermediate device has a networking function to connect to the cloud or the storage module on the server-side. Correspondingly, the step "responding to the data interaction instruction" in the solution provided by the embodiment of the present application includes:

sending the data interaction instruction to the storage module on the network side, so that the storage module reads and/or writes corresponding data based on the data interaction instruction.

In some embodiments, on the basis of any one of the embodiments in FIGS. 13, 15 and 16, the method further includes:

in response to a verification instruction input by the user, connecting a target storage data source corresponding to the instruction type of the verification instruction to the computer device, wherein the target storage data source is at least one of a sector range, an image file, and a networked image file.

In this embodiment, the verification instruction is an instruction for determining that the selected target storage data source is connected to the computer device, and it may carry password information corresponding to the target storage data source. For example, if the target storage data source is connected to a computer device in the form of split disks, split disk 1 corresponds to password A, split disk 2 corresponds to password B, and the password to access all split disks at the same time is C. When it is verified that the instruction carries password A, it is confirmed that the split disk 1 is connected to the computer device; When it is verified that the instruction carries password B, it is confirmed that the split disk 2 is connected to the computer device; When it is verified that the instruction carries password C, it is confirmed that the split disk 1 and split disk 2 are connected to the computer device at the same time. In this embodiment, the user identity can be verified by a password when accessing the target sector range to determine that the selected target storage data source is accessed, thereby improving the security of the storage data source.

Figure 17:
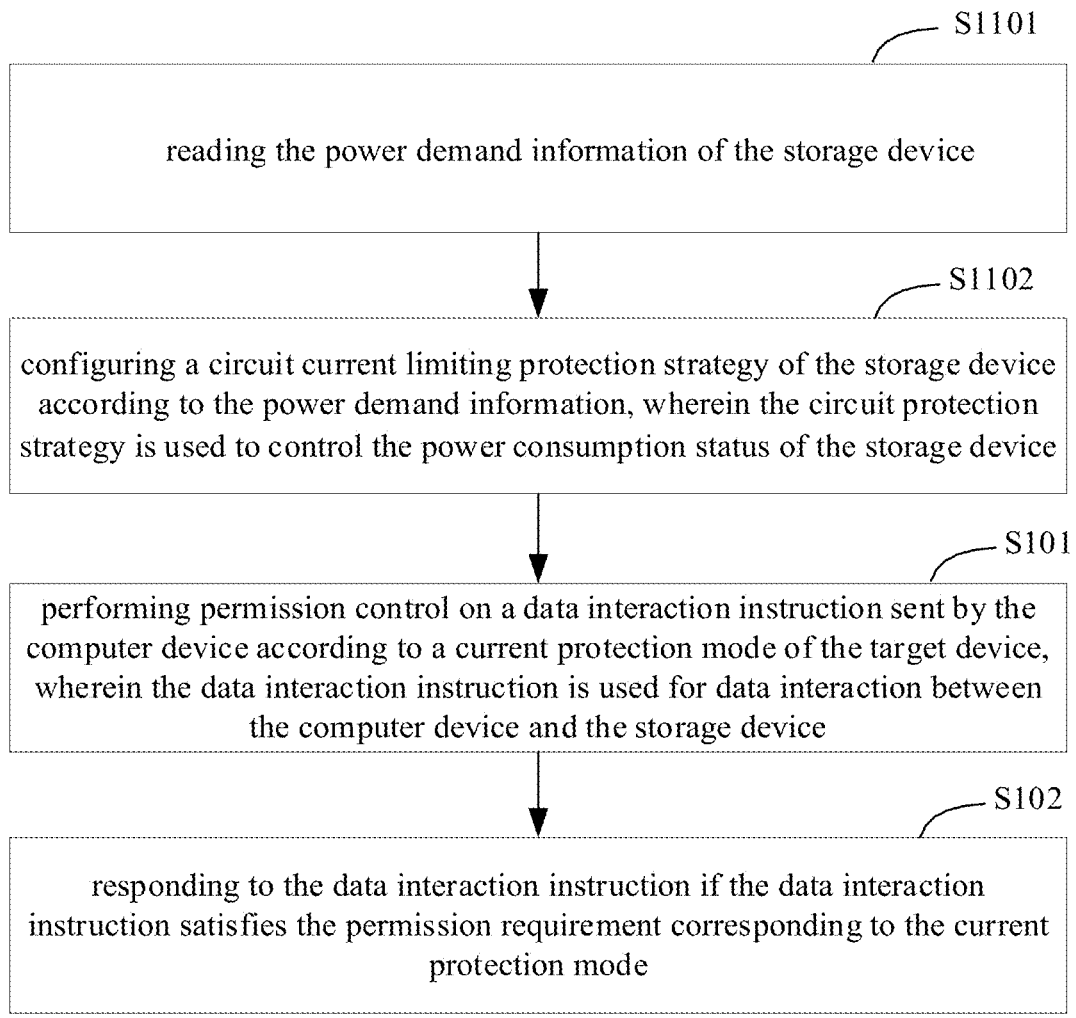
FIG. 17 is a flow chart of the data security protection method shown in the eighth embodiment of the present application.

In some embodiments, based on the embodiment shown in FIG. 1, FIG. 17 is a flow chart of the data security protection method of the eighth embodiment of the present application. The same steps as in FIG. 1 will not be repeated, as shown in FIG. 17, the method also includes:

Step S1101, reading the power demand information of the storage device;

Step S1102, configuring a circuit current limiting protection strategy of the storage device according to the power demand information, wherein the circuit protection strategy is used to control the power consumption status of the storage device.

In this embodiment, the power demand information includes, but is not limited to, power current, power voltage, and circuit status, and circuit protection strategy includes protection strategy for storage device and protection strategy for computer device.

Optionally, in order to prevent the storage device from burning out due to the input of high current from the computer device, the protection strategy is configured according to the power consumption current of the storage device. For example, the path current between the second interface of the intermediate device connected to the computer device and the first interface of the intermediate device connected to the storage device does not exceed the power consumption current, or does not exceed the preset allowable upper limit (such as 10%) of power demand, or does not exceed a preset fixed value (such as 500 mA). In order to prevent the computer device from being burned due to the short circuit in the storage device, the protection strategy is configured according to the circuit status of the storage device. For example, if the circuit status of the storage device is short-circuited or there is an instantaneous high current, the intermediate device disconnects the connection path to the first interface connected to the storage device, or increases the resistance to the first interface.

In some embodiments, the method further includes:

generating an interaction log which is used to record processing records of the data interaction instruction sent by the computer.

In this embodiment, the processing records of the data interaction instruction sent by the computer device (for example, data related to recording forwarding and execution) are stored in the interaction log, so as to facilitate subsequent auditing. Optionally, when the interaction log is read out, it can be configured as a read-only mode, so that it cannot be tampered with and ensures the reliability of the interaction log storage records.

In some embodiments, if the current protection mode is the backup mode, correspondingly, the step "responding to the data interaction instruction" may include:

synchronously writing the data written by the computer device into the specified backup storage area when the data interaction instruction is a write instruction; and/or the protection module reading the data corresponding to the sector address written by the computer device and writes it into the specified backup storage area before executing the write instruction when the data interaction instruction is a write instruction.

The advantage of the above-mentioned "synchronously writing the data written by the computer device into the specified backup storage area" is: when important data is copied on the computer device and the important data is found to have been maliciously written by another computer device, the data recovery can be performed through backup recovery.

The above-mentioned "the protection module reading the data corresponding to the sector address written by the computer device and writes it into the specified backup storage area before executing the write instruction" has the advantage that it is equivalent to retaining the original data before writing, after being maliciously deleted or modified by a computer, it can be restored from the backup storage area. For example, data such as the boot sector, FAT table, and file item information are backed up in advance before the computer writes the data. When it is found that it has been corrupted by malicious writing by the computer, when the storage device cannot be accessed normally (for example, it prompts that it needs to be reformatted) or the file cannot be displayed or read/written, the data can be restored through the backup.

Further, when the current protection mode is the backup mode, the data protection method provided in the embodiment of the present application may further include the following steps:

storing the data backup of the important data sectors connected to the storage device in the specified backup storage area;

reading out the data in the specified backup storage area and writing into the original data sector of the storage device when the restoration is triggered.

Wherein, the important data sector can be set manually, for example, specified by the user through the interactive device, and the data sector specified by the user can be marked as an important sector. Or, the important data sector is set by the protection module itself; or, the important data sector is selected based on a preset importance judging strategy, etc., which is not specifically limited in this embodiment.

Figure 18A:
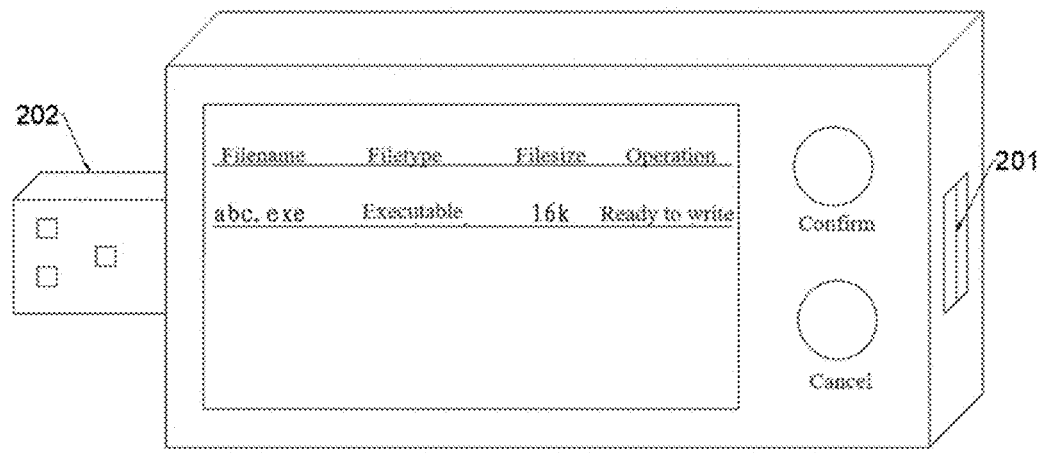
FIG. 18A shows an example of a structural form of an intermediate device.
Figure 18B:
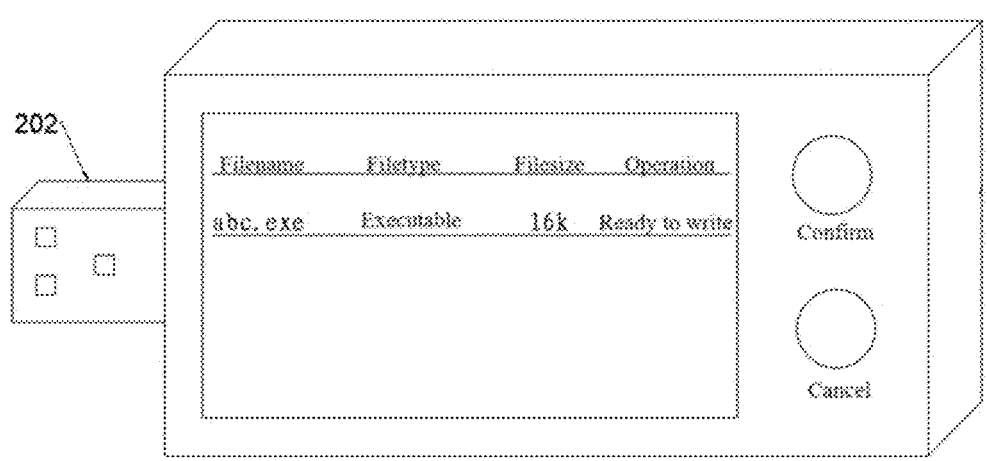
FIG. 18B is a schematic diagram showing a storage device integrated with a protection module with the corresponding functions of the protection methods provided in each embodiment of the present application.

Refer to an example of the structure of the intermediate device shown in FIG. 18A. Or FIG. 18B shows a storage device integrated with a protection module having functions corresponding to the protection methods provided by various embodiments of the present application. The intermediate device shown in FIGS. 18A and 18B can display information that requires manual confirmation, such as file name, file type, file size, operation, etc., when it is in the manual confirmation mode. The user can confirm the operation through the "Confirm" control, and can also cancel the operation through the "Cancel" control. According to different usage scenarios, the user can manually operate on the panel of the intermediate device or storage device as shown in FIG. 18A or 18B:

1. Selecting the protection mode. Selecting the protection switches corresponding to the protection modes such as whole-disk read-only, specific-folder write-only (blank folder), specific-folder read-only, and specific-folder read-write to complete the setting of the current protection mode of the intermediate device.

2. Selecting the physical data source. Selecting the data source as USB storage device, SD card, built-in memory chip or external network storage device, etc.

3. Selecting the logical split disk data source. Further dividing the sector address of the physical data source to form multiple data sources for selection, and select one of the split disks as the data source. For example, a 16G USB flash disk can be divided into 3 data sources of 8G, 4G, and 4G.

4. Connecting the intermediate device to the computer device. Inserting the USB male interface of the storage device into the USB female interface of the intermediate device, inserting the USB male interface of the intermediate device into the USB female interface of the computer device, and using the USB interface of the computer device to supply power for the intermediate device and the storage device.

Figure 19:
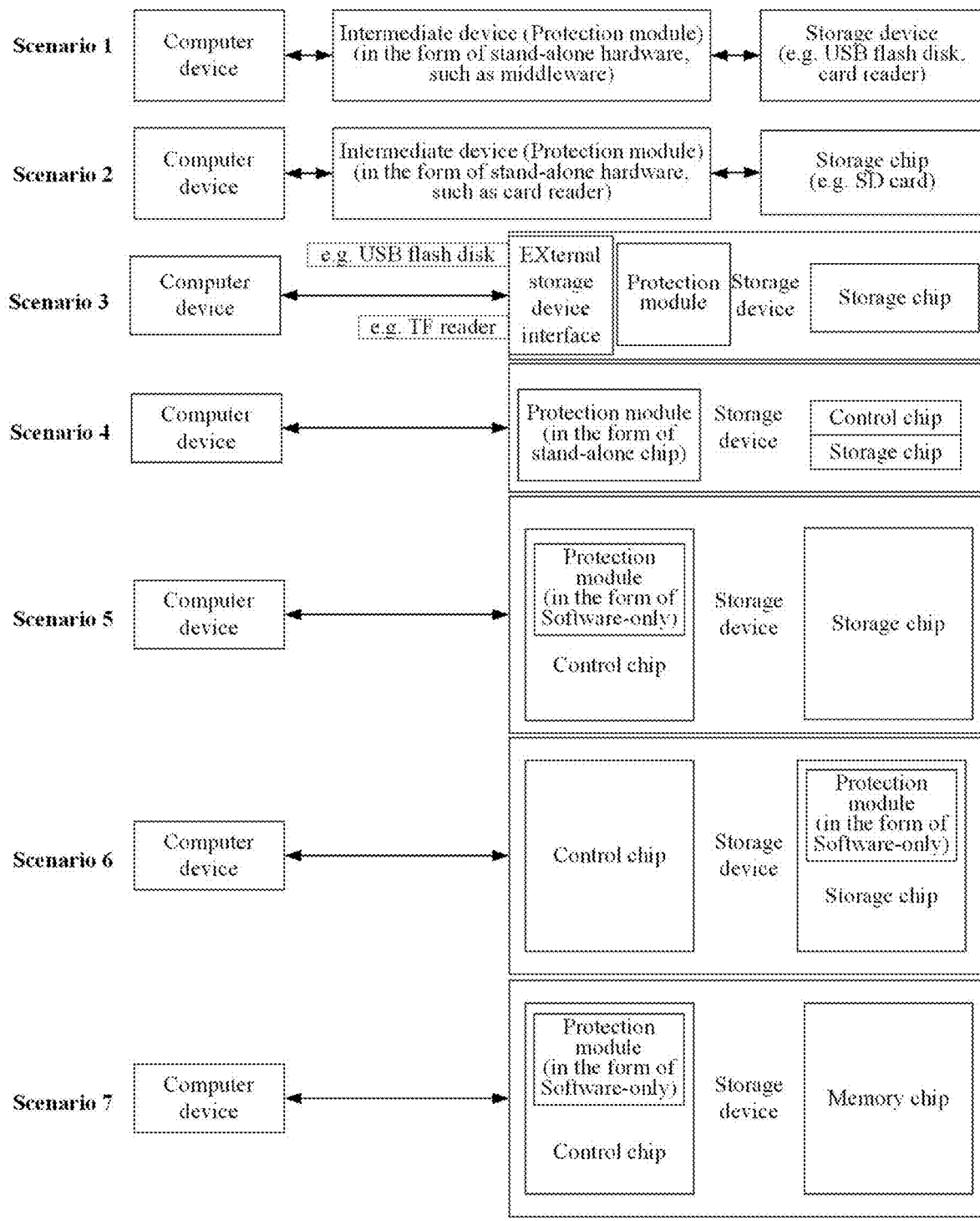
FIG. 19 is a schematic diagram showing seven specific scenarios.

FIG. 19 shows several scenarios:

Scenario 1: The computer device and the storage device are connected through an intermediate device, and the intermediate device isolates the computer device and the storage device. The product form of the intermediate device corresponding to the scenario 1 may be a hardware device similar to an interface converter as shown in FIG. 2A, 2B or 18A.

Scenario 2: The product form of the intermediate device is a card reader, which is used to connect card and chip storage devices (such as SD card). The card reader has a control function and a protection function. The control function and the protection function can be integrated in one chip in the form of pure software, or they can be two independent chips in the card reader.

Scenario 3: The storage device has a protection module and built-in at least one or more storage chips (or memory chip), as well as an interface for connecting at least one or more external storage devices (such as a TF Card interface for accessing SD cards, TF cards, the USB interface is used to access the USB flash disk, etc.). Wherein, the protection module can be in the form of an independent chip (such as scenario 4), or it can be configured on the control chip of the storage device in the form of pure software similar to scenario 5, or it can be configured on the storage chip, etc., in the form of pure software in scenario 6, which are not limited in this embodiment. If a storage device is connected to the external storage interface, the protection module can switch the physical data source as required, such as selecting an external storage device or a storage chip (or memory chip).

Scenario 4: The protection module is part of the hardware of the removable storage device, but exists independently in the form of a protection chip inside the hardware. For example, an ordinary removable storage device can be transformed into the device of the present application through hardware upgrade.

Scenario 5: The protection function of the data security protection method is integrated in the control chip in the form of software, that is, the protection module is in the form of software. For example, an ordinary removable storage device can be transformed into the device of the present invention by upgrading the software (firmware) of the control chip and installing external button switches.

Scenario 6: The protection module is directly used as a part of the storage chip, and in terms of thinking, it can be protected according to the software and hardware methods of Scenario 4 and Scenario 5. At present, there are storage chips with protection functions, such as SD cards that can be set to be read-only.

Scenario 7: The protection function of the data security protection method is integrated in the control chip in the form of software, that is, the protection module is in the form of software. The difference from Scenario 5 is that the data storage device does not have a control chip, and all read/write operations are directly completed by the control chip.

What needs to be added here is: one of the protection modes mentioned above is the logical split disk mode. In the logical split disk mode, the protection module will determine the logical split disk connected to the computer device based on the current protection mode (that is, logical data source). For the above scenario 3, the protection module is arranged at the first storage device, and the first storage device is provided with at least one or more storage chips and interfaces for connecting at least one or more external second storage devices, and at least part of the interfaces on the first storage device are connected with the external second storage device; correspondingly, at least one data source specified by the current protection mode of the protection module may include but not limited to:
- at least one physical data source in the at least one or more storage chips, the external second storage device connected to at least part of interfaces on the first storage device; and/or
- at least one logical split disk of the at least one or more storage chips; and/or
- at least one logical split disk in the external second storage device connected to the first storage device.

Figure 20A:
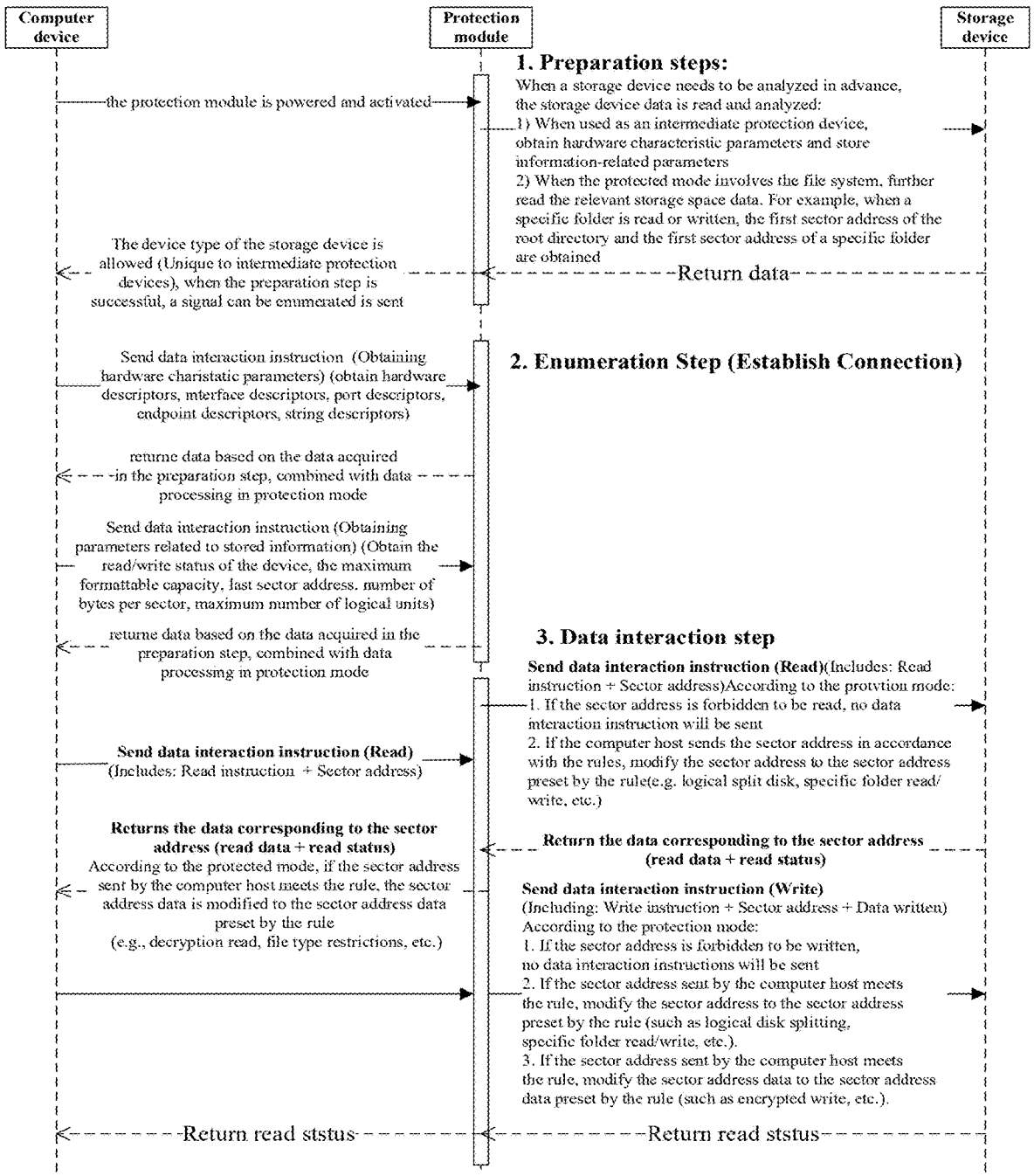

It is mentioned above that the interaction process between the computer device and the protection module in the technical solutions provided by the various embodiments of the application may include but not limited to: preparation phase, enumeration phase and data interaction phase. Referring to FIGS. 20A and 20B, the basic operating logic of the protection module can be briefly summarized as follows:
- The first phase, the physical storage data source (storage device) connection phase. According to selecting the physical data source, and establishing the physical connection. If the protection module is an intermediate device, establishing a communication connection with the storage device. If the storage device is an SD card, TF card, built-in memory chip, etc., establishing a communication connection according to its interface (such as SDIO, SPI, HSPI, etc.). If the storage device is a USB flash disk, the protection module establishes a communication connection according to its USB interface. If the storage device is a hard disk, etc., the protection module performs connection according to its SATA, M.2 and other interfaces.

The second phase, a phase that the protection module reads the physical storage data source (storage device), which is the preparation phase mentioned above. During the preparation phase, storage devices can be pre-analyzed. One situation is: the intermediate device has a protection module, and the computer device and the storage device are connected through the intermediate device; in this case, the protection module reads and analyzes the data of the storage device. Another situation is: the storage device is integrated with a protection module, and at this time, there is no need to read, and it is sufficient to directly analyze the data of the storage device. As in the corresponding embodiment above, the data information of the storage device is analyzed. More specifically, the first is to read the descriptor. For example, when the protection module is an intermediate device and the physical data source is a storage device with a USB interface, read the device descriptor, configuration descriptor, interface descriptor, port descriptor and string descriptor of the storage device, and judge whether it is a legal device type, for example, mass storage device hardware type. The second is to read the storage information related parameters of the storage device. For example, when the physical data source is a USB device, SD card, TF card, built-in memory chip, etc., read the storage space capacity (or available sector size), read-write permissions, etc. The third is, if the protection mode is the logical split disk mode, the sector offset relationship is established according to the storage space. The fourth is, when the protection mode involves the file system, further read the relevant storage space data, such as when being the specific-folder read-write, obtain the address of the first sector of the root directory and the address of the first sector of the specific folder. For example, when the protection mode is a specific file mode, according to the rules of the file system, search for relevant data for mapping, such as the address of the first sector of the specific folder of the storage device (or create a new blank folder), the address of the root directory (first directory), and so on.

When the first phase and the second phase are completed, and the device type of the device connected to the protection module is a device type that is allowed to be accessed, the preparation step is successful, and the interface sends an enumeration signal to the computer device to enter the enumeration phase. As shown in FIG. 20A, the device type of the storage device is determined based on the data information of the storage device. This step is unique to the connection between a computer device and a storage device through an intermediate device with a protection module.

That is, in a specific embodiment of the present application, when the target device is an intermediate device, the protection method provided in the present application may further include: in the preparation phase, the target device reads and analyzes the data information of the storage device. If the target device is a storage device, the method may further include: in the preparation phase, the protection module analyzes data information of the storage device.

Referring to FIG. 20A, when the computer device provides a power supply signal to the protection module or the protection module starts, the preparation phase can be entered. If the target device is an intermediate device, "the target device reads the data information of the storage device" in the corresponding above steps may include:
- in the preparation phase, the protection module simulating the computer device to send a control instruction to the storage device;
- receiving the data information of the storage device fed back by the storage device.

In a specific implementable technical solution, "analyzing data information" may include:
- based on the data information, determining whether the storage device is a device type specified by the current protection mode;
- if so, sending a signal that enumeration is possible to the computer device to enter the enumeration phase.

The third phase, the enumeration phase. 3.1. In the enumeration phase, based on the current protection mode, processing the data information of the storage device to obtain the processed information; 3.2. Sending the processed information to the computer device so as to establish the communication connection between the computer device and storage device.

Wherein, 3.1 "based on the current protection mode, processing the data information of the storage device to obtain the processed information" may specifically include:

3.1.1. According to the current protection mode, processing the data information to generate a second characteristic parameter simulating the storage device; and/or 3.1.2. According to the current protection mode, processing the data information to generate second storage information related parameters simulating the storage device;

3.1.3. Sending the second characteristic parameter and/or the second storage information related parameters to the computer device, so as to establish the communication connection between the computer device and the storage device.

During implementation, the above-mentioned 3.1.1 may specifically include: obtaining a preset parameter template corresponding to the current protection mode; according to the device type of the storage device reflected by the first characteristic parameter in the data information, obtaining at least one parameter item that can characterize the device type device from the preset parameter template to obtain the second characteristic parameter; or using the screening strategy corresponding to the current protection mode to screen the parameter items of the first characteristic parameters, and obtaining the second characteristic parameter based on at least one screened out parameter item.

Wherein, the first characteristic parameter may include but not limited to: descriptor data; wherein, the descriptor data includes at least one of the following: hardware descriptor, interface descriptor, port descriptor, endpoint descriptor, string description character, etc.

Further, the data information includes the first storage information related parameters, and the first storage information related parameters include but not limited to: the read-write status of a storage device, the total number of formattable blocks, the last logical block address, the number of bytes per sector, the maximum number of logical units, and device information.

The above 3.1.2 may specifically include during implementation:

3.1.2a. According to the operation type specified by the current protection mode, modifying the read-write status parameter in the first storage information related parameters.

Figure 21:
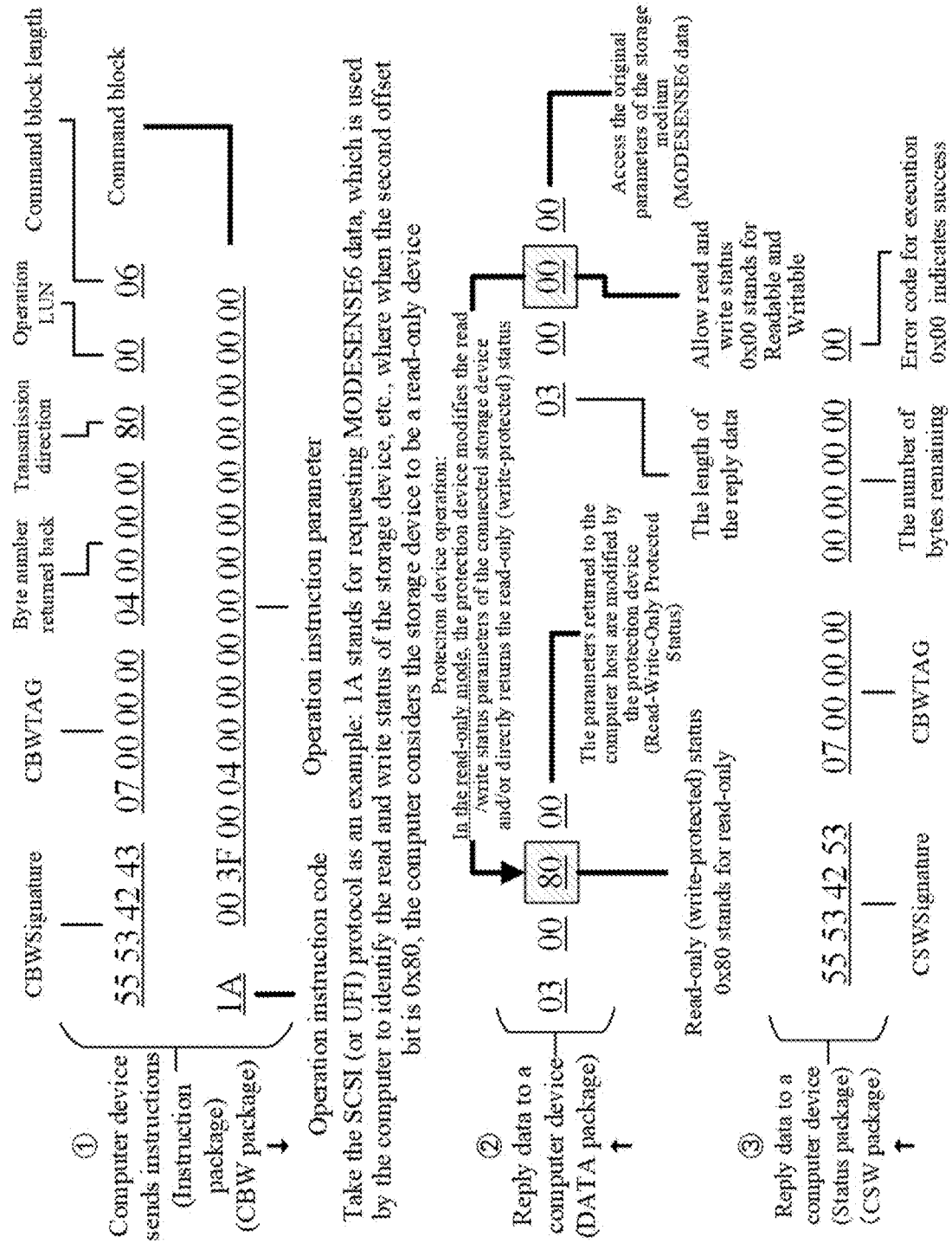
FIG. 21 is a schematic diagram showing that the protection module modifies the read-write status parameter in the first storage information related parameters.

In the example shown in FIG. 21, ② is the data packet returned by the protection module to the computer device, and ③ is the status packet returned by the protection module to the computer device. Wherein, in the data packet, the protection module modifies the read-write status parameter of the storage device, such as changing the read-write status 0x00 parameter to: 0x80 (representing read-only). Alternatively, the protection module directly returns a read-only (i.e., write-protected) status to the computer device.

What needs to be added here is that the protection module modifies the read-write status parameter during the data interaction process. This modification is located in the memory of the protection module, and does not modify the original read-write status parameters of the storage device, and the storage device does not need to have the modify permission to the read-write status parameters (for example, it is difficult to change the read-write status of an ordinary USB flash disk through modification).

After the read-write status parameter is changed to the read-only (write-protected) status, the computer device "thinks" the storage device (such as a USB flash disk) as the read-only (write-protected) status, so that writing operations are prohibited in the man-machine interface.

3.1.2b. If the current protection mode is a logical split disk mode, modifying the total number of formattable blocks and/or the last logical block address in the first storage information related parameters according to the parameters of the target split disk that can be connected to the computer device specified in the current protection mode.

Figure 22:
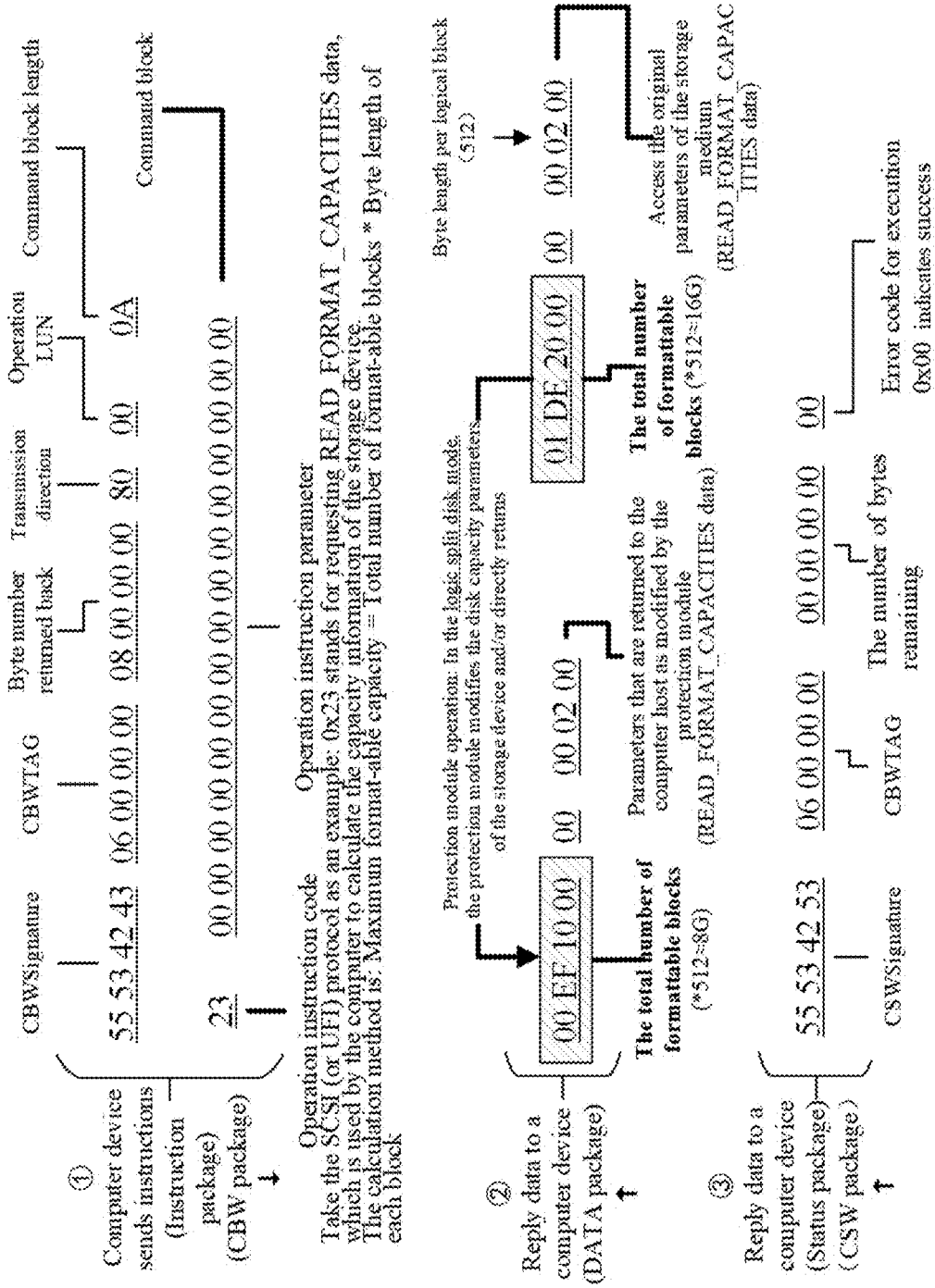
FIG. 22 is a schematic diagram showing that the protection module modifies the total number of formattable blocks and/or the last logical block address in the first storage information related parameters.

In the example shown in FIG. 22, ② is the data packet returned by the protection module to the computer device, and ③ is the status packet returned by the protection module to the computer device. Wherein in the data packet, the protection module modifies the total number of formattable blocks of the storage device, such as modifying 0x01 DE 20 00 to 0x00 EF 10 00. The example shown in FIG. 22 is the modification of the disk capacity parameters of the storage device by the protection module in the logical split disk mode. Similarly, without modification, the protection module executes and feeds back the data packet containing 0x00 EF 10 00 to the computer device.

Wherein the total number of formattable blocks can be used to calculate the maximum formattable capacity. For example, the maximum formattable capacity=the total number of formattable blocks * the byte length of each block.

What needs to be added here is: the example shown in FIG. 22 can be seen correspondingly to FIG. 14D. FIG. 22 is from the perspective of the data processing process, and FIG. 14D is from the physical perspective to explain the situation of the split disk 1. It can be seen that in the case of split disk 1, the total number of formattable blocks of the original 16G storage space is modified and returned to the computer, so that the computer "thinks" that the storage device is only 8G. Similarly, the protection module modifies during the data interaction process, and the modified data is only located in the memory of the protection module, and does not modify the original data of the storage device, and the storage device does not need to have the modify permission to the capacity information (for example, it is difficult to change the capacity information of an ordinary USB flash disk through modification).

Figure 23:
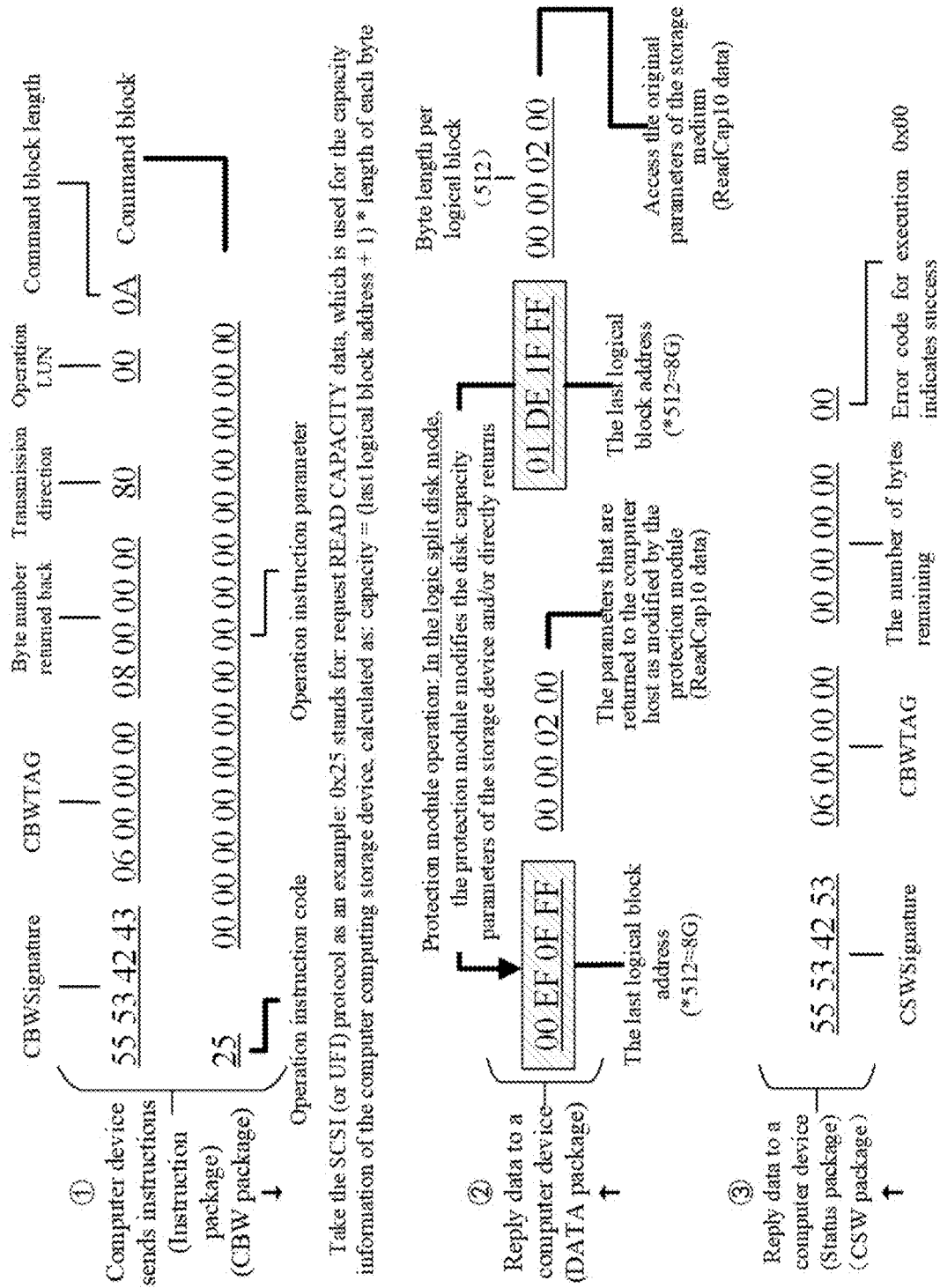
FIG. 23 is a schematic diagram showing that the protection module modifies the last logical block address.

In addition, FIG. 23 shows an example of modifying the last logical block address. In the example shown in FIG. 23, ② is the data packet returned by the protection module to the computer device, and ③ is the status packet returned by the protection module to the computer device. Wherein in the data packet, the protection module modifies the last logical block address of the storage device, such as modifying 0x01 DE 1F FF to 0x00 EF 0F FF. The example shown in FIG. 22 is the modification of the disk capacity parameters of the storage device by the protection module in the logical split disk mode. Similarly, without modification, the protection module feeds back the data packet containing 0x00 EF 0F FF to the computer device.

Figure 24:
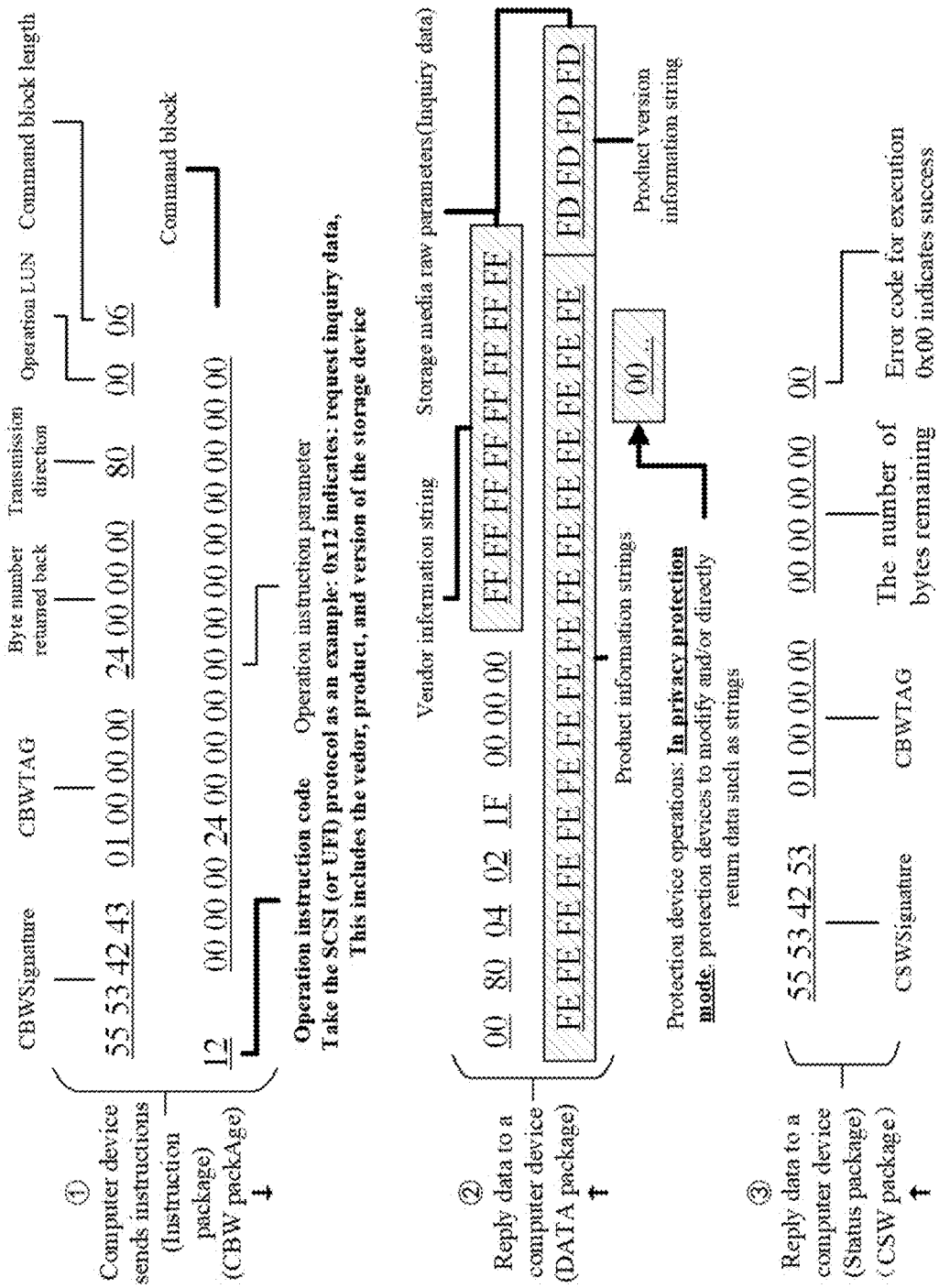
FIG. 24 is a schematic diagram showing that the protection module modifies the privacy information of the device.

3.1.2c. According to the current protection mode, modifying the device information in the first storage information related parameters to protect the private information of the storage device. FIG. 24 shows an example modifying the privacy information of the device. In the example shown in FIG. 24, ② is the data packet returned by the protection module to the computer device, and ③ is the status packet returned by the protection module to the computer device. Wherein in the device privacy protection mode, the relevant vendor information strings, product information strings, product version information strings, etc. in the data packet can be changed to 00 . . . 00. Similarly, without modification, the protection module feeds back data packets of vendor information strings, product information strings, product version information strings, etc., that are 00 . . . 00 to the computer device.

Referring to the enumeration steps shown in FIGS. 20A and 20B, the computer device sends a data interaction instruction to request the protection module to acquire the hardware characteristic parameter (i.e., corresponding to the first characteristic parameter of the storage device mentioned above). Specifically, the hardware characteristic parameter may include but not limited to: hardware descriptor, interface descriptor, port descriptor, endpoint descriptor, character string descriptor, and the like. Based on the data information obtained in the preparation phase, the protection module performs data processing on the first characteristic parameter in the data information in combination with the current protection mode, to obtain the second characteristic parameter and return the second characteristic parameter to the computer device. Further, the computer device continues to send data interaction instruction to request the protection module to acquire storage information related parameters of the storage device. Wherein the storage information related parameters may include but not limited to: read-write status of the device, the maximum formattable capacity and/or the total number of formattable blocks (not shown in the figure), the last logical block address, the number of bytes per sector, the maximum number of logical units, and the device information, and so on. Based on the data information obtained in the preparation phase, the protection module performs data processing on the first storage information related parameters in the data information in combination with the current protection mode, to obtain the second storage information related parameters and return the second storage information related parameters to the computer device.

Referring to FIG. 20B, the enumeration phase can be further subdivided into: a sub-phase of establishing an interface connection and a sub-phase of reading storage device information. In the sub-phase of establishing an interface connection: 1. Access control, according to the preset access control rules, reading the descriptor data of the storage device (that is, the first characteristic parameter mentioned above), and judging whether the preset requirements are met. If the preset requirements are met, allowing the computer device to establish a connection with the storage device; otherwise, prohibiting the computer device from establishing a connection with the storage device. 2. Content modification, according to the content modification rules (such as 3.1.1 mentioned above), returning the modified or replaced descriptor data to the computer device. In the sub-phase of reading storage device information: 1. Access control, according to the preset access control rules, reading the storage information data of the storage device (i.e., the storage information related parameters mentioned above), and judging whether the preset requirements are met. If the preset requirements are met, allowing the computer device to establish a connection with the storage device; otherwise, prohibiting the computer device from establishing a connection with the storage device. 2. Content modification, according to the content modification rules (such as 3.1.2a to 3.1.2c mentioned above), returning the modified or replaced storage information data to the computer device.

The fourth phase: the data interaction phase. Referring to FIG. 20A, the computer device sends a data interaction instruction (such as a read instruction) to the protection module, and the data interaction instruction may include: a read instruction and a sector address. If the sector address is prohibited from reading, the protection module does not send the data interaction instruction to the storage device. If the sector address complies with the rules (that is, readable), the sector address is modified to the sector address preset by the rules (such as logical split disk, specific folder read, etc.). The storage device returns data corresponding to the modified sector address (read data+read status). The protection module sends the data returned by the storage device to the computer device. Continuing to refer to FIG. 20A, the computer device sends a data interaction instruction (such as a write instruction) to the protection module, and the data interaction instruction may include: a write instruction, a sector address, and data to be written. If the sector address is prohibited from writing, the protection module does not send a data interaction instruction to the storage device. If the sector address complies with the rules (that is, writable), the sector address is modified to the sector address preset by the rules (such as logical split disk, specific folder read/write, etc.). If the current protection module is in the encryption write mode, it is necessary to encrypt the data to be written before writing to the position corresponding to the modified sector address. The storage device returns the write status. The protection module sends the write status returned by the storage device to the computer device.

FIG. 20B is an illustration of the data interaction phase from three aspects. Referring to the embodiment shown in FIG. 20B, in the data interaction phase: judging whether the read/write sector address of the computer meets the preset requirements (as mentioned above, whether write is prohibited, read is prohibited, etc.) to perform access control. If the access control rules are met, the computer device is allowed to perform read/write operations on the sector address; otherwise, the computer device is prohibited from performing read/write operations on the sector address. Subsequently, address mapping is carried out, and according to the address mapping rule, that is, the sector address modification rule mentioned above, the data of the corresponding mapped sector address of the storage device is read/written, and the read data or write status is directly returned to the computer device. Alternatively, content modification can also be performed, that is, according to the content modification rules, the data of the corresponding sector address of the storage device is read/written and modified, and the read data or write status is returned to the computer device.

Here is a specific example. After the computer device is allowed to establish a connection with the storage device, the process of enumerating and reading the storage device by the computer may include but not limited to the following:

1. The computer device reads sector 0 of the storage device, analyzes the data of the MBR or GPT sector or the boot sector of the file system, and obtains the sector address of the file system partition information;
2. Read the sector address of the file system partition information, and analyze the address of the first sector of the root directory (or called the first directory) according to the protocol of the file system;
3. According to the file system protocol, read the data corresponding to the sector address of the root directory;
4. Analyze the file and folder information corresponding to the root directory sector address;
5. Display the list of files and folders in the root directory in the computer device.

Figure 28A:
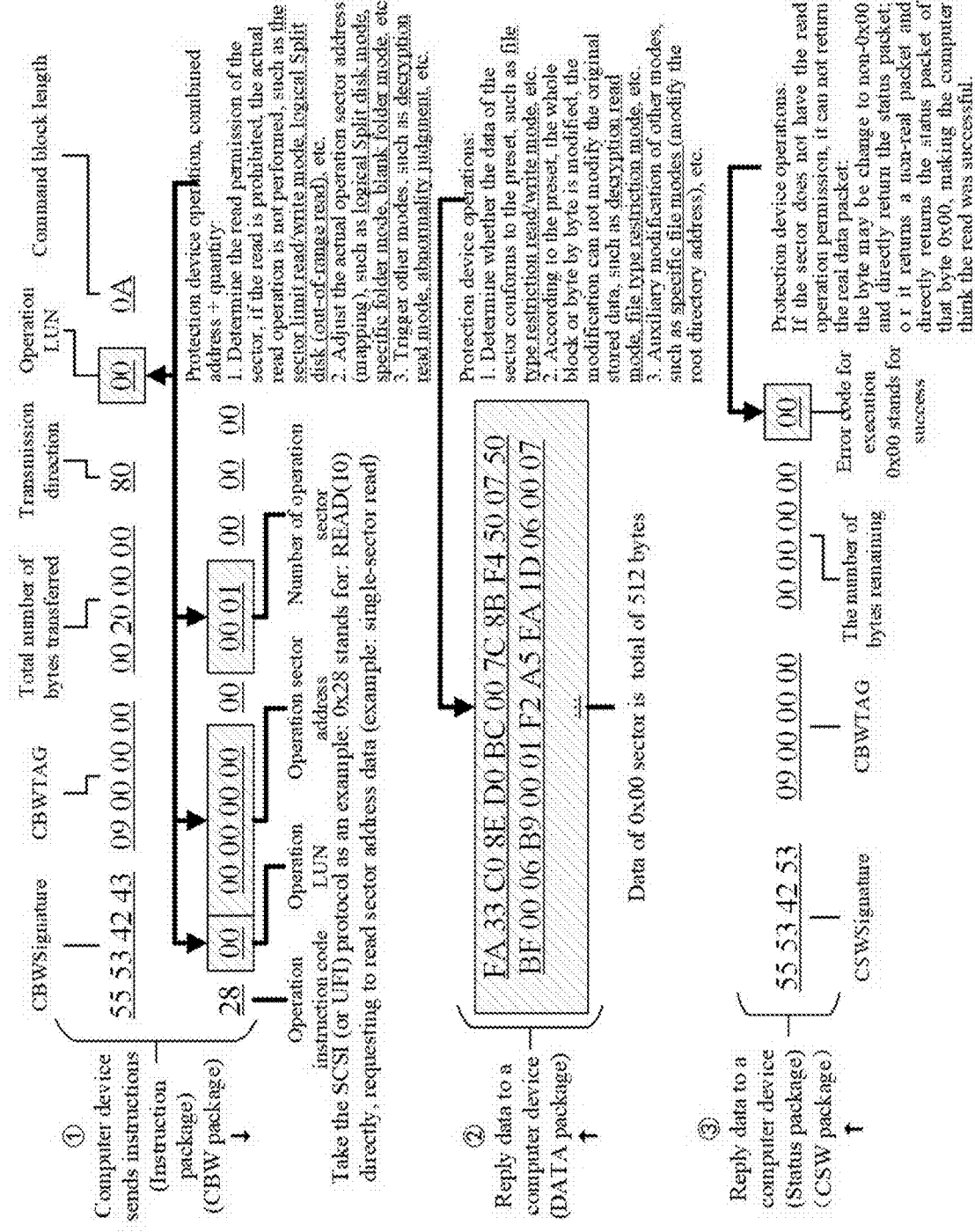
FIG. 28A is a schematic diagram showing the control of "read instructions (single-sector read)", sector addresses, data packets, or statuses from the perspective of the data processing process.
Figure 28B:
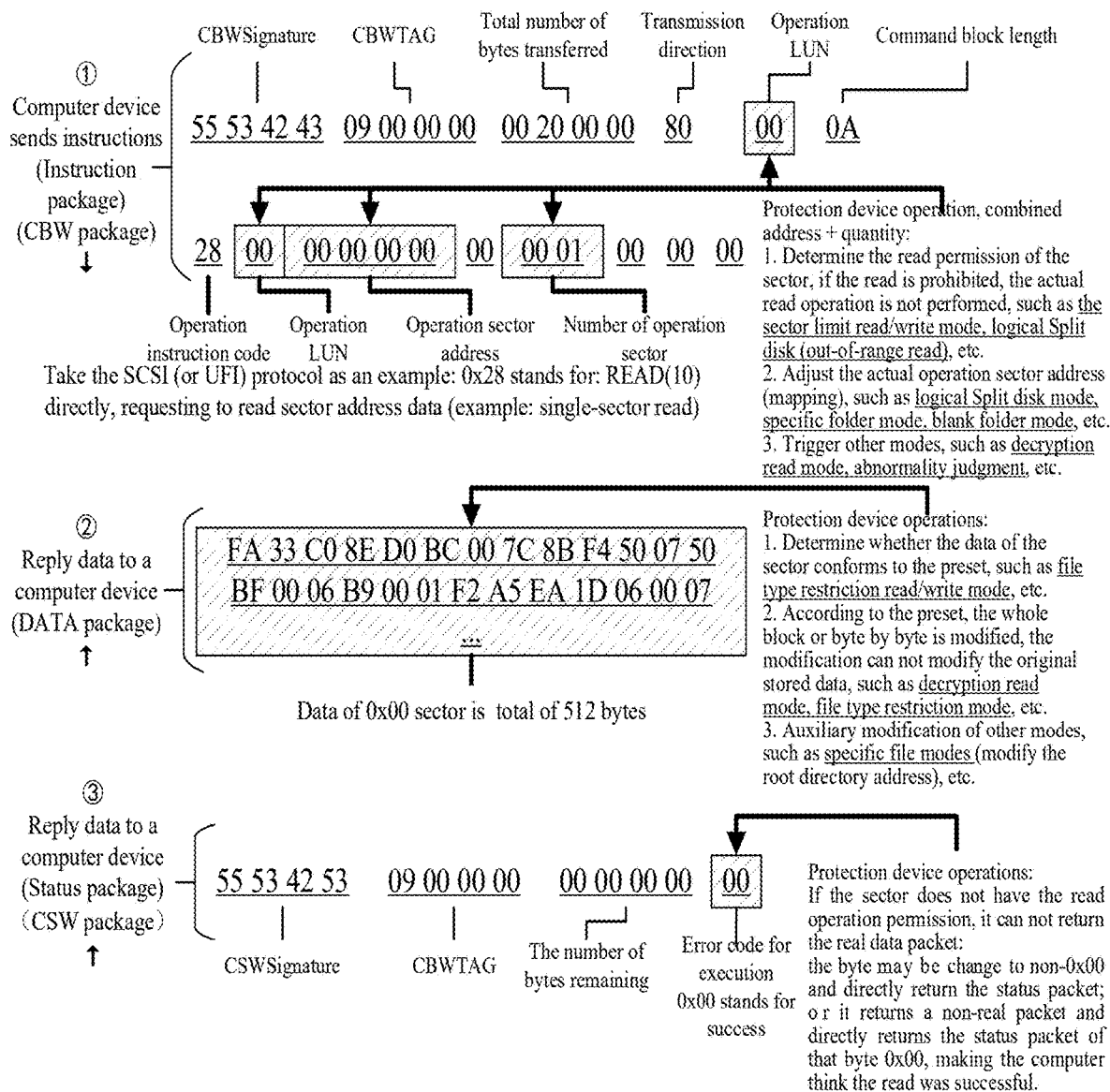
FIG. 28B shows a schematic diagram of the control of "read instructions (multi-sector sequential read)", sector addresses, data packets, or statuses from the perspective of the data processing process.
Figure 28C:
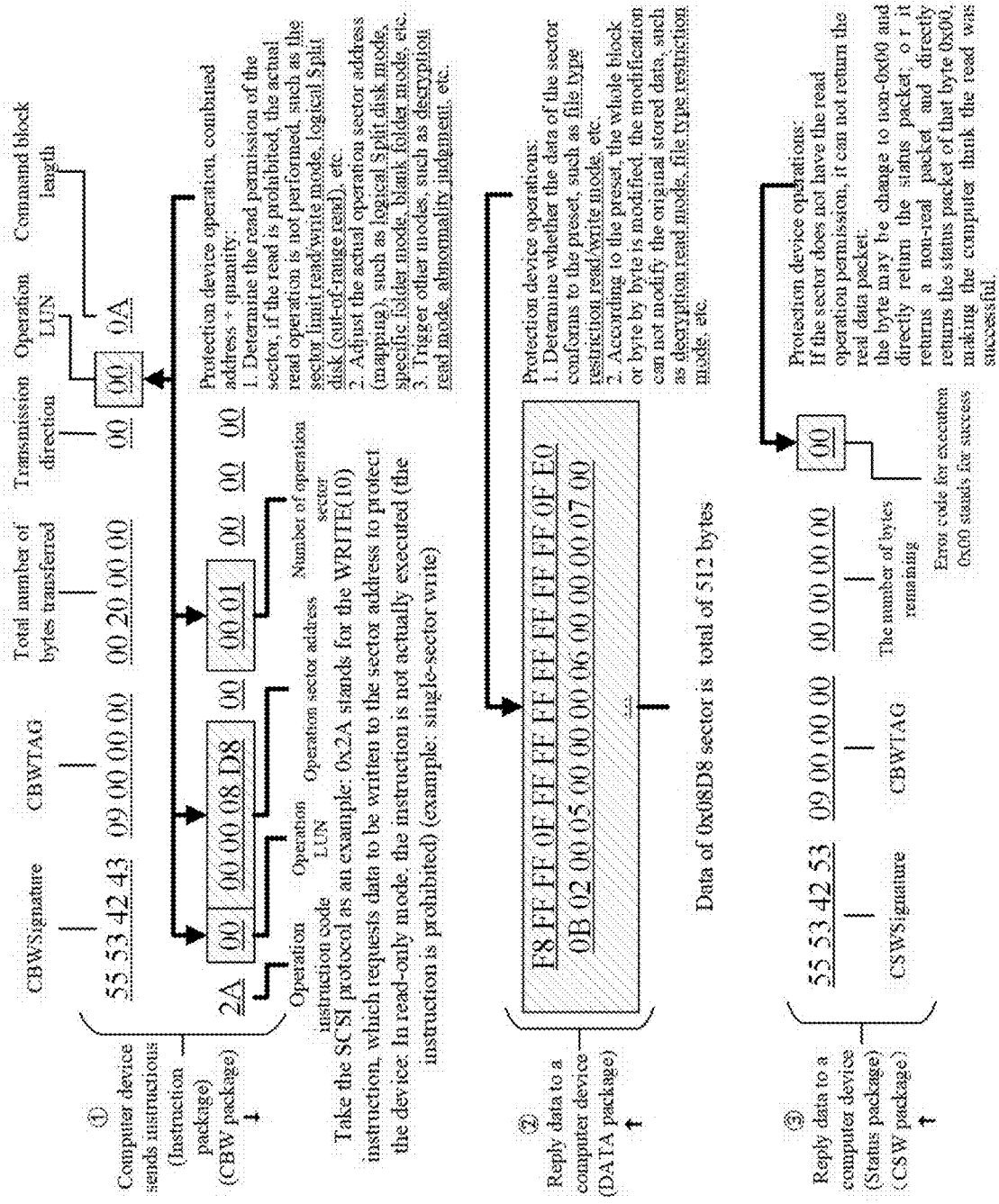
FIG. 28c shows the control of "write instructions (single-sector write)", sector addresses, data packets, or statuses from a data processing perspective.
Figure 28D:
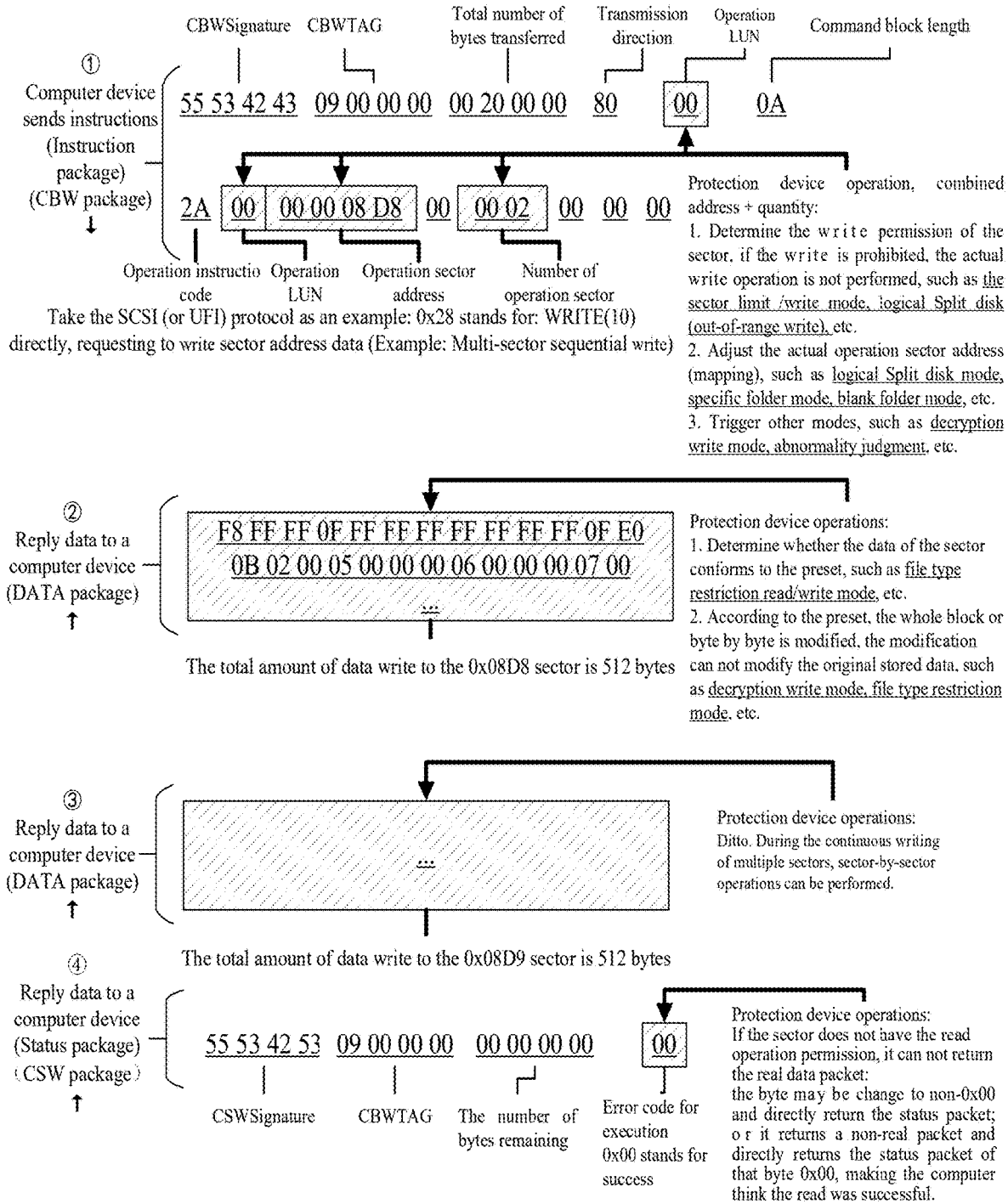
FIG. 28D shows the control of "write instructions (multi-sector sequential writes)", sector addresses, data packets, or statuses from a data processing perspective.

FIGS. 28A to 28D illustrate examples of procedures of access control, respectively. FIG. 28A is a schematic diagram showing the control of "read instruction (single-sector read)", sector addresses, data packets, or statuses from the perspective of the data processing process. FIG. 28B shows a schematic diagram of the control of "read instruction (multi-sector sequential read)", sector addresses, data packets, or statuses from the perspective of the data processing process. FIG. 28c shows the control of "write instructions (single-sector write)", sector addresses, data packets, or statuses from a data processing perspective. FIG. 28D shows the control of "write instruction (multi-sector sequential writes)", sector addresses, data packets, or statuses from a data processing perspective.

Specifically, as shown in FIG. 28A, the instruction (or instruction packet, CBW packet) sent by the computer device, taking the SCSI protocol as an example, 0x28 represents: READ (10) instruction, requesting to read the data corresponding to the sector address. The instruction also includes the operation sector address 00 00 00 00 and the number of operation sectors 00 01. The protection module combines the operation sector address 00 00 00 00 and the number of operation sectors 00 01. If it is judged that the read permission corresponding to the sector address is forbidden to read in the current protection mode, the actual read operation will not be performed, such as sector limit mode, logical split disk mode, etc. If the current protection mode of the protection module is logical split disk mode, specific file mode, blank file mode, etc., then adjust the actual operation sector address (such as the mapping method mentioned above). If the current protection mode of the protection module is combined with other modes or judgments, other modes, such as decryption read mode, abnormal judgment, etc., are triggered. As shown in FIG. 28A, when the protection module responds to the instruction sent by the computer device, it judges whether the data of the sector to be read by the instruction meets the requirements of the current protection mode, such as the file type defined in the file type restriction mode. The protection module can modify the entire block or word by word based on the current protection mode. The modification may not modify the original data of the sector, such as decryption read mode, file type restriction mode, etc. Furthermore, the protection module can also perform auxiliary modification on the data (or data packet, DATA packet) to be returned to the computer device based on other modes, such as modifying the root directory address in a specific file mode. In addition to returning data to the computer device, the protection module also returns status packets (or CSW packets). Specifically, if the sector address does not have the permission to operate, the real data packet may not be returned, but the byte may be treated as non-0x00 and the status packet may be returned directly; or the non-real data packet shall be returned, and the status packet of the byte 0x00 shall be returned directly to cause the computer device to think that the read is successful. Referring to FIG. 28B, as shown in FIG. 28B, the instruction (or instruction packet, CBW packet) sent by the computer device, taking the SCSI protocol as an example, 0x28 represents: READ (10) instruction, requesting to read the data corresponding to the sector address. The instruction also includes the operation sector address 00 00 00 00 and the number of operation sectors 00 02. That is, FIG. 28B shows the control corresponding to the multi-sector continuous read instruction. The control process of the protection module is the same as that in FIG. 28A above, the only difference is that in FIG. 28B, in the process of continuous reading of multiple sectors, sector-by-sector operations can be performed.

Referring to FIG. 28C, the instruction (or instruction packet, CBW packet) sent by the computer device, taking the SCSI protocol as an example, 0x2A represents: WRITE (10) instruction, requesting to write data into the sector address. In the whole-disk read-only mode, the instruction is not executed (that is, the instruction is prohibited). The instruction includes the operation sector address 00 00 08 D8 and the number of operation sectors 00 01. The protection module combines the operation sector address 00 00 08 D8 and the number of operation sectors 00 01. If it is judged that the write permission corresponding to the sector address is forbidden to write in the current protection mode, the actual write operation will not be performed, such as sector limit mode, logical split disk mode, etc. If the current protection mode of the protection module is logical split disk mode, specific file mode, blank file mode, etc., then adjust the actual operation sector address (such as the mapping method mentioned above). If the current protection mode of the protection module is combined with other modes or judgments, other modes, such as decryption read mode, abnormal judgment, etc., are triggered. As shown in FIG. 28C, when the protection module responds to the data packet (or DATA packet) sent by the computer device, it judges whether the sector to which the data is to be written the data meets the requirements of the current protection mode, such as the file type defined in the file type restriction mode, etc. The protection module can modify the entire block or word by word based on the current protection mode, such as encryption write mode, file type restriction mode, etc. The protection module also returns a status packet (or CSW packet) to the computer device. Specifically, it is possible to treat the byte a non-0x00 byte instead of the real packet, and directly return the status packet if without the write operation permission to the operation sector address; or the status packet of the byte 0x00 shall be returned directly to cause the computer device to think that the write is successful. Referring to FIG. 28D, the instruction (or instruction packet, CBW packet) sent by the computer device, taking the SCSI protocol as an example, 0x2A represents: WRITE (10) instruction, requesting to write data into the sector address. The instruction also includes the operation sector address 00 00 08 D8 and the number of operation sectors 00 02. That is, FIG. 28D shows the control corresponding to the multi-sector continuous write instruction. The control process of the protection module is the same as that in FIG. 28C above, the only difference is that in FIG. 28C, in the process of continuous writing of multiple sectors, sector-by-sector operations can be performed.

To sum up, the advantages of the technical solutions provided by the various embodiments of the present application are:

Advantage 1, in Term of Application Scenarios

Strong versatility, and it can protect common removable storage devices on the market, such as USB flash disk, USB CD-ROM, SD adapter, SD card, etc., and the protected devices have high compatibility.

High feasibility, and the computer device can be protected without installing specific software, and the protection feasibility is high for the use of the storage device.

Wide range of applications and can be widely used in devices in many scenarios such as intranet environments, industrial control devices, printer devices, and Internet of Things devices. It does not need to upgrade existing systems or software, and the drivers that come with the existing embedded devices or operating systems can be used to protect many computer device scenarios.

Advantage 2, in Term of Security

The protection module adopts the hardware parameter characteristics of the connected device according to the settings, and the malicious program of the computer device cannot discover the existence of the protection module and cannot restrict the access of the protection module.

The software of the protection module is in the form of no operating system or firmware, and the protection module is privileged and cannot be tampered with or deleted.

The protection method is at the bottom of the communication between devices, and malicious programs cannot bypass the protection measures.

The protection process can be audited by logs, and all operation commands and data packets of computer device and storage device can be saved in the built-in storage of the protection module, and post-event auditing can be performed.

The protection is durable and stable. The protection is controlled based on the underlying communication protocol. The protection function can be completed after the protection module leaves the factory, and there is no need for virus database upgrades and post-maintenance work.

Advantage Three, in Term of Protection Mode

The coverage of protection is wide, and the protection can be provided from the physical layer, communication layer, and file system layer;

There are many protection methods, which can be divided into read-only, write-only or custom modes;

The granularity of protection is fine, and protection can be carried out down to specific files, folders, or sector address ranges.

The implementation of the specific protection mode:

Specific implementation methods: basic protection, connected device type judgment.

After the storage device is connected to the protection module and the protection module is connected to the computer device and powered on, the protection module simulates the control transmission instruction of the computer device through the USB0 interface, and reads the device descriptor, configuration descriptor, interface descriptor, and endpoint description of the storage device. If the above-mentioned descriptor is obtained successfully, judgment is made according to the characteristics of normal mass storage devices (standard device types of storage devices such as USB flash disks and removable optical drives), such as the following judgment (judgment can have a single condition or a combination of conditions):

1.1. Determining whether the interface type of the device is "Mass Storage Class" (USB standard protocol, mass storage device type), specifically determining whether the 6th byte of the interface descriptor is 0x08 (mass storage device)
1.2. Determining whether the interface subclass of the device is "SCSI transparent command set" (SCSI transport protocol, which varies depending on the storage device), specifically determining whether the 7th byte of the interface descriptor is 0x06 (SCSI communication subclass)
1.3. Determining whether the interface protocol of the device is "Bulk Only Transport" (USB standard protocol, bulk transport protocol), specifically determining whether the 8th byte of the interface descriptor is 0x05 (bulk transport)
1.4. Determining whether all endpoints of the device are "Bulk" (bulk transport protocol in the USB standard protocol), specifically determining whether the 4th byte of the interface descriptor is 0x02 (bulk transfer).

If it does not conform to the device descriptor characteristics of a mass storage device, the connected "storage device" may actually be a single-function input device such as a mouse and keyboard, or a device with a mouse and keyboard function and a mass storage function. In this case, the intermediate device terminates further communication with the storage device.

At the same time, in the subsequent link, by generating a "virtual removable disk" device, the string drive name of the "abnormal device" is displayed in the operating system, and the text file of the original hardware parameter data of the "storage device" read is saved in the root file of the virtual mobile disk for analysis.

In the case of conforming to the device descriptor of a normal mass storage device, by simulating the hardware parameters and characteristics of the removable storage device, the data read by the computer device from the protection module is completely consistent with the original removable storage device, and the computer device will not recognize the existence of intermediate devices, preventing malicious programs from intercepting intermediate devices.

Figure 25:
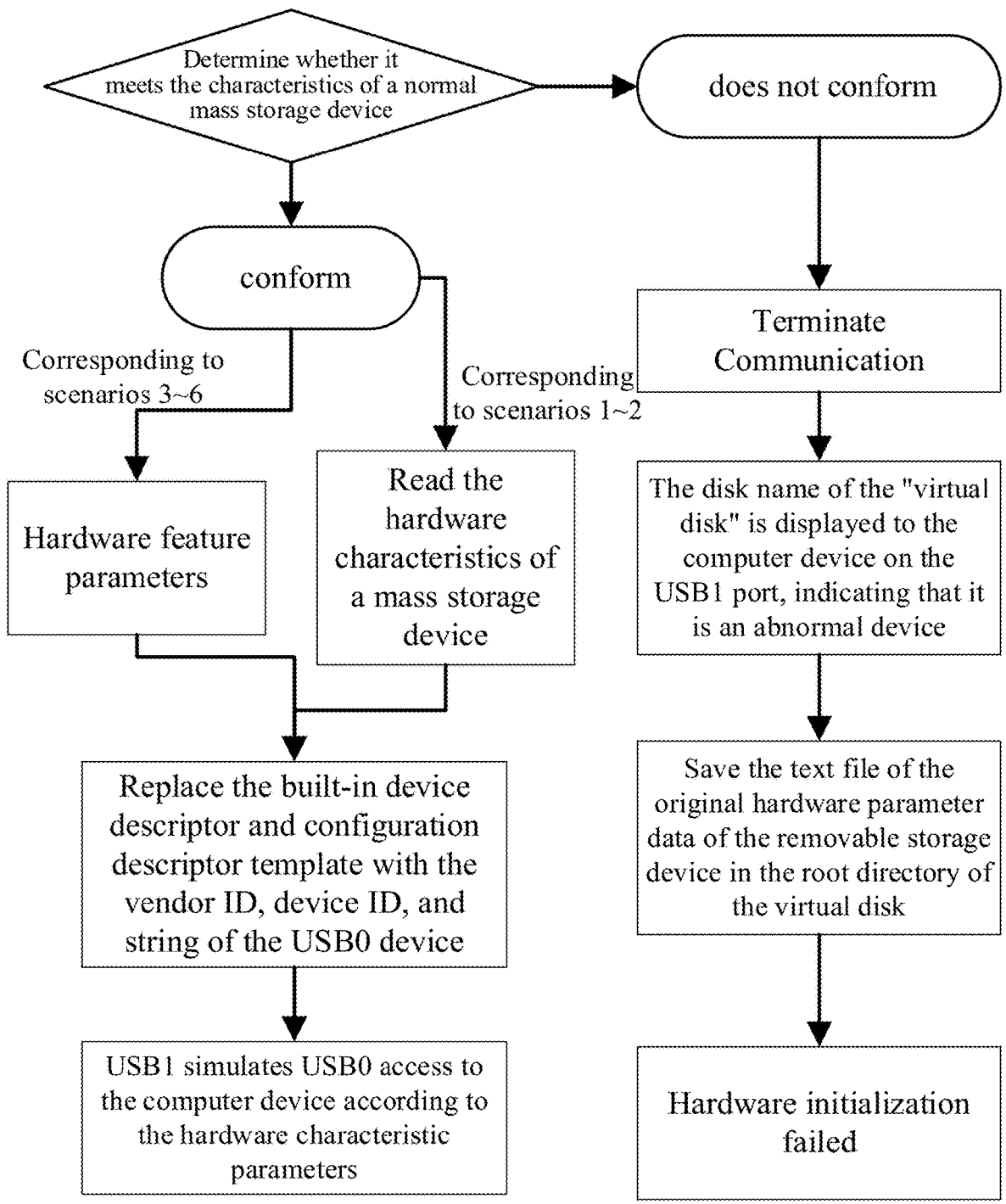
FIG. 25 is a schematic diagram showing the initialization process of the storage device hardware.

For example, as shown in FIG. 25, when a device is connected to USB0 of the intermediate device, it is judged whether it conforms to the characteristics of a normal mass storage device, and if the device conforms, then for scenarios 3 to 6 in FIG. 19, the hardware characteristic parameters are obtained directly. For scenarios 1 to 2 in FIG. 19, the hardware characteristic parameters of the mass storage device are acquired. Then, replace and fill the built-in device descriptor and configuration descriptor template with the vendor ID, device ID, string, etc. of the USB0 device (that is, the storage medium); finally, connect the computer device to the USB1 end according to the hardware characteristic parameters to simulate that the USB0 interface is connected with the device (that is, the storage medium). If not, terminate the communication with the storage device or storage medium; and display the drive letter to the computer device on the USB1 port through the disk name of the "virtual disk", prompting that it is an abnormal device. Save the read text file of the original hardware parameter data of the "removable storage device" in the root directory of the "virtual disk"; the hardware initialization failed.

Figure 26A:
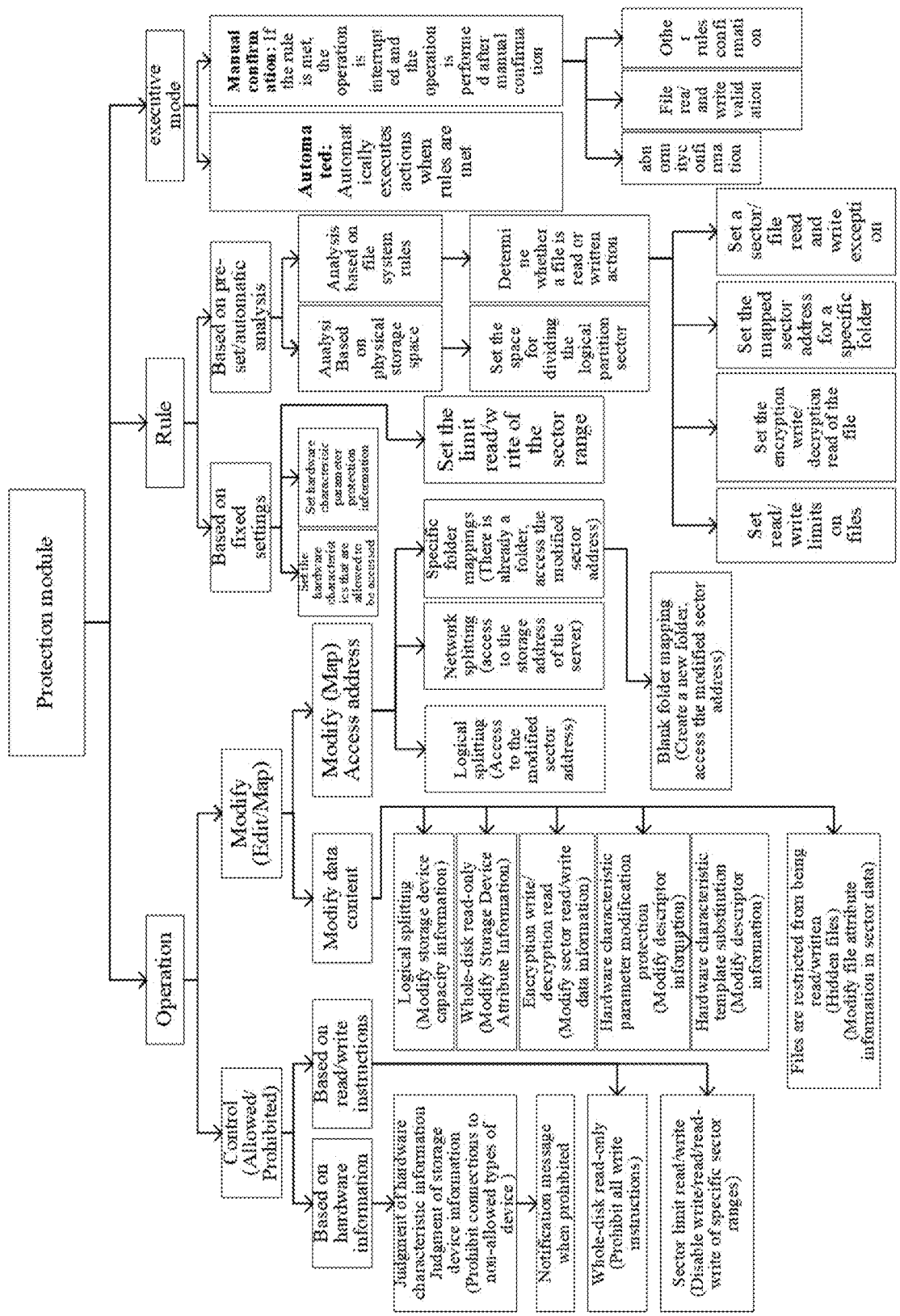
FIG. 26A is a collated diagram showing the related technical points of the technical solutions provided by each embodiment of the present application.
Figure 26B:
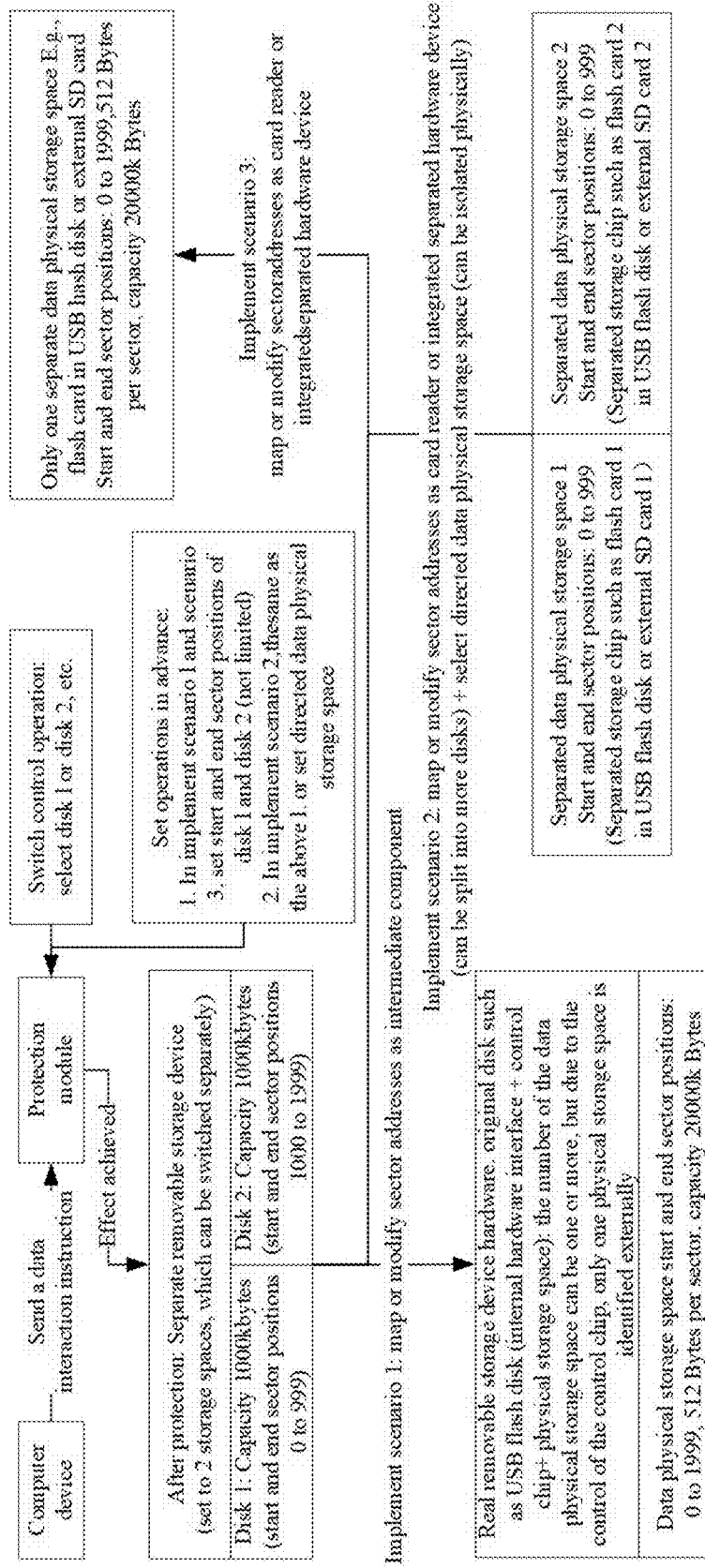
FIG. 26B is a collated diagram showing some effects brought about by adopting the technical solutions provided by each embodiment of the present application.

FIG. 26A is a collated diagram showing the related technical points of the technical solutions provided by each embodiment of the present application. FIG. 26B is a collated diagram showing some effects brought about by adopting the technical solutions provided by each embodiment of the present application.

Figure 27:
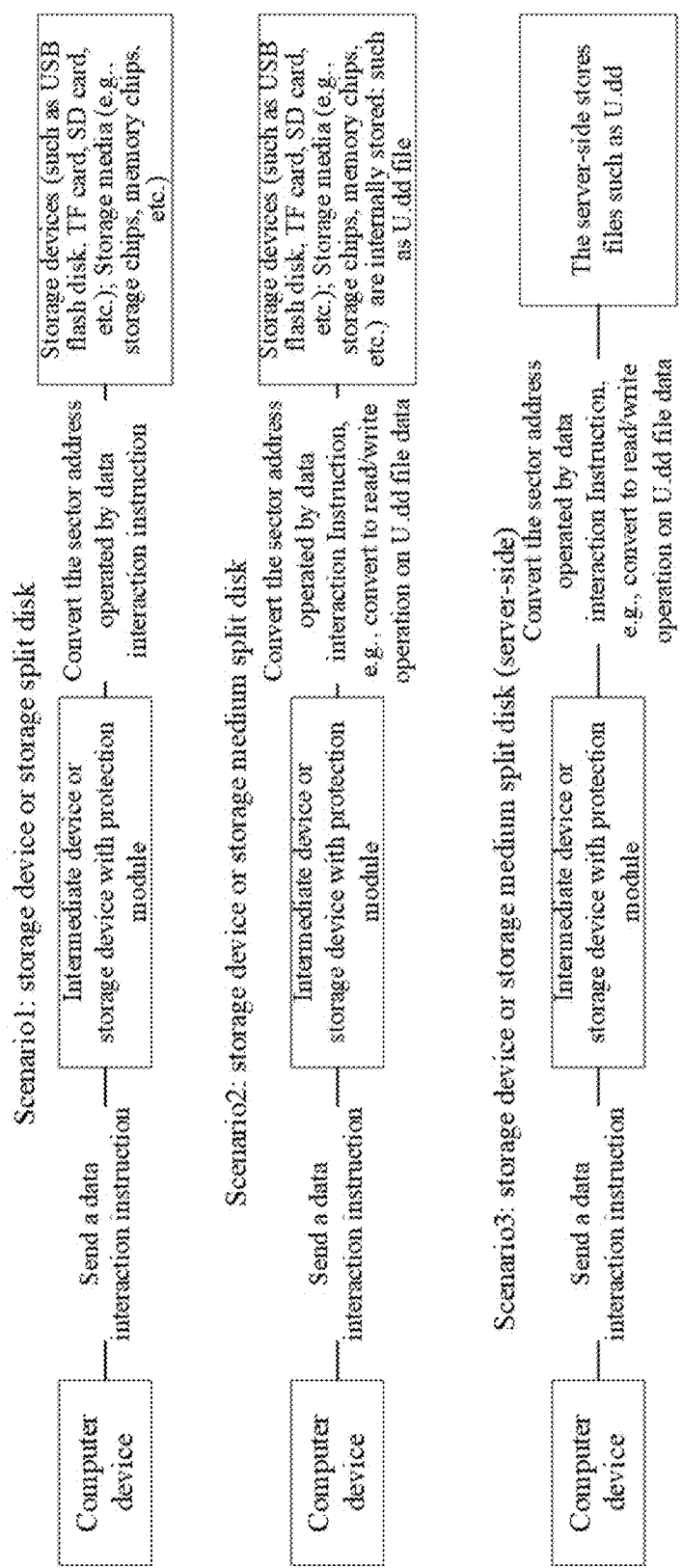
FIG. 27 shows an example of the process of responding to the read-write interactive instructions of a computer device in three specific scenarios.

FIG. 27 shows another specific example in which the Scenario 1 corresponds to the scenario of split disk of storage media. The computer device sends data interaction instructions to the intermediate device, such as sending an instruction to read data at address 0 with a read length of 512 bytes; an instruction to write data to address 1 with a data of 0x1212 . . . (512 bytes) and the length of the write data is 512 bytes. After the intermediate device receives it, it converts the data interaction instruction operation sector address, for example, converts address 0 to 1000, address 1 to 1001, and operates on the sector corresponding to the converted address, such as returning the data in address 1000 and writing data to address 1001 . . . (512 bytes). If the storage device with a protection module is connected to the computer device in Scenario 1, then the middle block may correspond to the protection module in the storage device, and the rightmost block in FIG. 27 is a storage device (such as a USB flash disk, a TF card, SD card, etc.) or storage media (such as a memory chip, memory chips, etc.).

Scenario 2 corresponds to the scenario of split disk of storage media files. The computer device sends data interaction instructions to the intermediate device, such as sending an instruction to read data at address 0 with a read length of 512 bytes; an instruction to write data to address 1 with a data of . . . (512 bytes) and the length of the write data is 512 bytes. After the intermediate device receives it, it combines the address, the number of bytes per sector (for example, 512 bytes), and the calculation of the data length, and converts the operation sector address of the data interaction instruction into the address corresponding to the file data, such as converting to read/write operation on data of file U.dd. For example, address 0 is converted to the address of sector 0 of the file data U.dd, address 1 is converted to the address of sector 1 of the file data U.dd, and after conversion, the file data U.dd is operated, such as returning data of sector 0 address of the file U.dd, write data 0x1212 . . . (512 bytes) to sector address 1 of file data U.dd. Similarly, if a storage device with a protection module is connected to the computer device in Scenario 2, then the middle block may correspond to the protection module in the storage device, and the rightmost block in FIG. 27 is a storage device (such as a USB flash disk, TF card, SD card, etc.) or storage media (such as storage chips, memory chips, etc.).

Scenario 3 corresponds to the scenario of storage medium file splitting (networking). The computer device sends read/write interaction instructions to the intermediate device, such as sending an instruction to read data at address 0 with a read length of 512 bytes; an instruction to write data to address 1 with a data of 0x1212 . . . (512 bytes) and the length of the write data is 512 bytes. After the intermediate device receives it, it combines the address, the number of bytes per sector (for example, 512 bytes), and the data length to calculate, and converts the address of the data interaction instruction operation sector into the address corresponding to the data of the server-side (or the server-side converts it according to the forwarded data interaction instruction is converted according to the preset rules), for example, it is converted into a read and write operation on the file data U.dd on the server side-side. For example, address 0 is converted to the address of sector 0 of the file data U.dd of the server-side, address 1 is converted to the address of sector 1 of the file data U.dd of the server-side, and after conversion, the file data U.dd of the server-side is operated, such as returning data of sector 0 address of the U.dd file of the server-side, write data 0x1212 . . . (512 bytes) to sector address 1 of file data U.dd of the server-side. Similarly, if the storage device with a protection module is connected to the computer device in Scenario 3, then the middle block may correspond to a storage device with networking capability.

Furthermore, the embodiment of the present application also provides a security control framework. According to read/write control of FIGS. 20A, 20B, 21 to 24 and FIG. 28A to FIG. 28D, according to the business scenario, allowed/prohibited control, edition/modification, etc., are performed on the data interaction instructions, data and status in the preparation phase, enumeration phase, and data interaction phase for the purpose of control.

The security control framework is a protection module located between computer device and storage device. Different protection methods can be configured and switched according to actual conditions according to the needs of protection scenes (or business scenarios). In the preparation phase, enumeration phase, and data interaction phase, the information security protection of computer device, storage device or computer device and storage device is realized. At the same time, the protection scenes of the security control framework can be used alone or in combination based on the protection modes of the present invention, and new protection scenes (protection modes) can also be created according to actual needs; Multiple protection scenes can be combined at the same time, or another protection scene can be triggered by the protection scene.

It should be noted that the protection method, protection mode and related embodiments of the present application can be configured and created based on the security control framework, or can exist independently according to the protection method.

In a specific embodiment, the security control framework includes:
  a configuration module for configuring protection scene;
  a generation module for generating configuration information of the protection scene or software with the protection scene;
  wherein one protection scene corresponds to at least one protection mode; the configuration information or the software with the protection scene is deployed on a hardware device, so that the hardware device has function corresponding to the steps of the data security protection method herein.

Further, during configuring protection scene, the configuration module is specifically configured for:
  configuring identification information of protection scene;
  configuring protection operation strategy corresponding to the protection scene.

The above "configuring the protection operation strategy corresponding to the protection scene" may include but not limited to at least one or more of:
  configuring the protection operation strategy in the preparation phase under the protection scene;
  configuring the protection operation strategy in the enumeration phase under the protection scene;
  configuring the protection operation strategy in the data interaction phase in the protection scene.

Still further, the security control framework provided in this embodiment may further include: a compiler module, configured to execute a corresponding software compiling strategy according to the configuration information to obtain security control software; wherein, the hardware device runs the security control software, so that the hardware device has functions corresponding to the steps in the data security protection method of any one of claims 1-44. Of course, the security control framework may not have a compiler module. The configuration information of the protection scene can be imported to the hardware device (such as a new type of USB flash drive or the intermediate device shown in FIG. 2A, etc.), the hardware device has the ability to compile, and executes the corresponding software compilation strategy according to the configuration information to generate security control software (or can become a security control program) so as to implement the functions corresponding to the protection modules mentioned in the above embodiments.

Specifically:

1. Configuring a Protection Scene

The Configuration of a Protection Scene Includes:
  (1) Protection scene information, such as name, number, binary value, etc., used as the unique identification for selecting protection scene; still such as remark information, string information, etc., used for the management of scene data, etc.
  (2) Strategies for configuring protection operation, including at least one or more of the following combinations:
    1. Strategies in the preparation phase. The protection module reads the storage device, and obtains the data required for the protection scene through extraction, analysis, modification and other methods.

Configure data interaction instructions to the connected storage device in the preparation phase (equivalent to which data interaction instructions the protection module sends to the storage device) used to request data from or write data to the storage device. Configure the judging, modifying, or responding scheme that matches the data returned by the storage device (equivalent to what to do further with the data returned by the matched storage device).

Strategies in the preparation phase may include, but are not limited to: a data interaction instruction sending strategy, a data interaction instruction execution result strategy, and the like.

(1) Configure the data interaction instruction sending strategy. Set at least one or more data interaction instructions for simulating computer-controlled storage devices. Data interaction instructions include but are not limited to: USB standard requests (such as obtaining device descriptors, configuration descriptors, interface descriptors, port descriptors, string descriptor requests, etc.), class special requests (such as Bulk-Only Mass Storage Reset, Get Max LUN request, etc.), SCSI command set and UFI command set request (such as INQUIRY request, READ FORMAT CAPACITIES request, READ CAPACITY request, READ (10) command, WRITE(10) command, etc.), and custom requests or commands, etc.

(2) Configure the matched data interaction instruction execution result strategy. Set the byte value used to identify at least one or more data-specific positions of the data returned by the execution result of the data interaction instruction, and bind the matched treatment strategy. Data interaction instruction execution result data includes but is not limited to: USB standard request return data (such as device descriptor, configuration descriptor, interface descriptor, port descriptor, string descriptor, etc.), class special request return result (such as the maximum number of LUNs etc.), SCSI command set and UFI command set request (such as the total number of formattable blocks, the last logical block address, the number of bytes per sector, the data and status read from the sector position, the status of the written data in the sector position, etc.), and custom requests or commands, and so on.

Treatment Strategies Include:

① Judgment of Data Yes/No. Preset data interaction instruction rules and send them, and judge the data of at least one or more specific positions (such as byte values at specific positions) of the preset returned data, and perform operation A if the preset is met, and perform operation B if the preset is not met. For example, in the hardware type access protection mode (protection scene), it is possible to judge whether the access requirements are met by reading data such as descriptors, and disconnect the communication with the storage device when it is not met; when met, a signal indicating that enumeration can be performed is sent to the computer device.

② Data modification\save. Preset data interaction instruction rules, and realize modification and saving of at least one or more specific positions (such as byte values at specific positions) of the preset returned data. For example, in the data information protection mode of the storage device or the device privacy protection mode (protection scene), data such as descriptors can be read and modified and saved in the protection module.

③ Data extraction\analysis. Preset data interaction instruction rules and send them, and realize context analysis on the data returned by at least one or more data interaction instructions, and extract or calculate the final value. For example, in specific file mode, file type restriction mode, manual confirmation mode and other modes (protection scenes), the sector address range of the root directory or related files can be analyzed by reading the data of the file system.

④ Data writing. Preset the rules of data interaction instructions and send them, and realize writing preset data to specific sector addresses in combination with data extraction\analysis results. For example, in the blank file mode, the data related to the file item is written in the address space of a specific sector to realize the purpose of automatically creating a folder.

2. Strategies in the access phase. The computer device establishes a communication connection with the protection module (enumeration of the computer host) to prepare for data interaction.

Configure the data interaction instructions for the matching access phase (equivalent to which interaction instructions need to be responded to), and configure the judgment, modification or response plan when the matching result is met (equivalent to what to do further when the data interaction instruction is matched).

(1) Configure the data interaction instruction matching strategy sent by the computer device: set at least one or more bytes values of data specific positions for identifying the data interaction instruction, and bind the matched processing strategy. Data interaction instructions include instruction data and data packet data, such as instruction request packets and reply data packets. When reading the data of the data interaction instruction, judge the byte value of at least one or more data positions, and execute the bound processing strategy when the data interaction instruction matches the matching item.

The judged data interaction instruction is: configuring a request for establishing a connection sent by the computer device. For example, USB standard requests, and data interaction instructions for obtaining device descriptors, configuration descriptors, interface descriptors, port descriptors, string descriptors, or other custom descriptors. Specifically, for example, the USB standard request data has 8 bytes in total and is divided into 5 parts.

| | Standard request data | | | | |
|---|---|---|---|---|---|
| | 0th Byte | 1st Byte | 2nd-3rd Byte | 4th-5th Byte | 6th-75th Byte |
| Data item name | RequestType | Request | Value | Index | Length |
| Example Data | 0x80 | 0x60 | 0x00 0x01 | 0x00 0x00 | 0x12 0x00 |

According to the rule of the USB standard request, when the Request (1st byte position) is 0x06, it is to obtain the device descriptor. For this reason, it can be judged whether the first byte position is 0x06, and when it matches, execute the processing strategy bound to the request for device descriptor. USB standard requests (such as obtaining device descriptors, configuration descriptors, interface descriptors, port descriptors, string descriptors, etc.) or non-standard requests (obtaining custom descriptors, etc.) and so on.

(2) Configure the matched data interaction instruction execution result strategy.

① Judgment of whether or not the instruction is executed. Preset data interaction instruction rules and realize selection of performing operation A or selection of performing operation B. For example, when the data interaction instruction is a request for a device descriptor, the device descriptor data is returned; when the data interaction instruction does not meet, no data is returned.

② Reply of data being not modified\modified\replaced. Preset data interaction instruction rules, and realize the return of the original data of the storage device, or the data modified by the preset rules, or the preset fixed replacement data. For example, in the data information protection mode (protection scene) of the storage device, return data information protection mode or device privacy protection mode (protection scene) and other modes, the data such as the modified or replaced descriptor; in the read-only mode (protection scene)) and other modes, modify the read-write status information (as shown in FIG. 21); in the logical split disk mode (protection scene) and other modes, modify capacity-related information (as shown in FIG. 22 and FIG. 23).

④ Perform data read/write operations on storage devices and storage media. Preset data interaction instruction rules, and realize preset read/write operations on storage devices. For example, when receiving a preset data interaction instruction (a data interaction instruction that may be dangerous), the read/write operation to the sector data of the storage device is prioritized to protect the data in advance.

⑤ Perform the trigger to start the protection mode. Preset data interaction instruction rules and realize operation of starting the protection mode. For example, when receiving a preset data interaction instruction (a data interaction instruction that may be dangerous), the backup mode is started to prevent data from being destroyed; log recording is started to save the log information of the data interaction instruction.

⑥ Perform the operation of disconnecting the computer device. Preset data interaction instruction rules and realize operation of disconnecting computer device. For example, when receiving a preset data interaction instruction (a potentially dangerous data interaction instruction), the computer device is disconnected.

⑦ Perform virtual storage media operations. Preset data interaction instruction rules and realize connection to virtual storage media in the data exchange phase. For example, when receiving a preset data interaction instruction (a data interaction instruction that may be dangerous, or a device type that is prohibited from being connected), in the subsequent data exchange phase, the data operation is connected to the virtual storage medium (not storage medium for real data) to respond, wherein the virtual storage medium can be a "virtual disk" with relevant reminder information, or a "virtual disk" in the form of a common storage medium.

⑧ Perform the trigger of selecting the data source. Preset data interaction instruction rules and realize selection of storage devices, storage media or logical disk partitions. For example, when receiving a preset data interaction instruction, a preset storage device, storage medium or logical split disk is selected as an access data source.

3. Strategies in the data interaction phase. The data exchange between the computer device and the protection module is mainly that the computer device sends data exchange instructions related to read/write sector addresses to the protection equipment.

Configure the data interaction instructions used to match the data exchange phase (equivalent to the response to the read/write data interaction instructions or other data interaction instructions used in the data exchange phase), and configure the judgment, modification or response plan when the matching results are met (equivalent to what to do further for the matched data exchange instructions (read/write, etc.).

(1) Configure the data interaction instruction matching strategy sent by the computer device: set at least one or more byte values of data specific positions (or parameters) for identifying the data interaction instruction, and bind the matched processing strategy.

Data interaction instructions include instruction data, data packet data and status packet data, such as read instruction and replied data packet, replied status packet; write instruction, written data packet and replied data packet.

The judged data interaction instruction mainly corresponds to byte values of at least one or more specific data positions (or parameters). As all the data of ① ② ③ or ① ② ③ ④ in FIGS. 28A to 28D. For the instruction ① (instruction (instruction package) (CBW package) sent by computer device), according to different scenarios, mainly judge the total number of bytes transmitted, the direction of transmission, the LUN operated, the length of the instruction block, the operation instruction code, and the operating LUN, operation sector address, operation sector number. For one or more data packets, judge the byte value of a specific position, or multiple byte values or hash values of a specific data range according to different scenarios. For the status packet, it mainly judges the number of remaining bytes and the error code executed.

Referring to FIGS. 28A to 28D. FIG. 28A shows a schematic diagram of controlling the sector address, data packet or status of the "read instruction (single sector read)" from the perspective of data processing. FIG. 28B shows a schematic diagram of the control of "read instruction (multi-sector sequential read)", sector addresses, data packets, or statuses from the perspective of the data processing process. FIG. 28C shows the control of "write instructions (single-sector write)", sector addresses, data packets, or statuses from a data processing perspective. FIG. 28D shows the control of "write instruction (multi-sector sequential writes)", sector addresses, data packets, or statuses from a data processing perspective.

Figure 29:
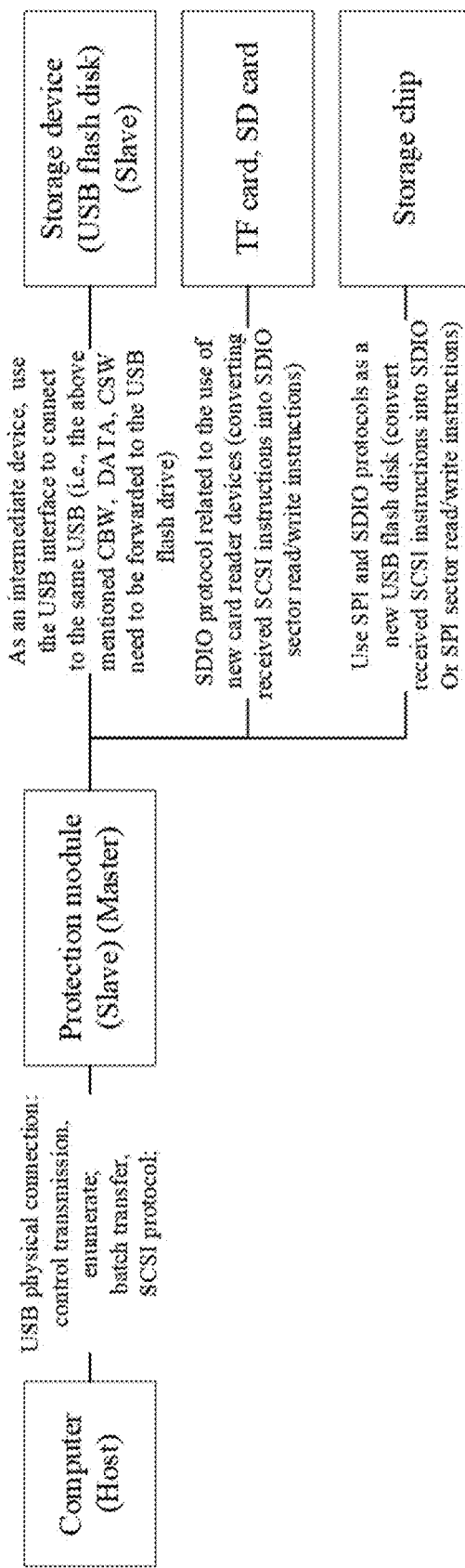
FIG. 29 is a schematic diagram showing the connection of a computer device, a protection module, and a storage device (such as a USB flash disk, a memory card, or a memory chip)

The CBW, DATA, CSW, and operation instruction codes involved in the data processing process shown in FIGS. 28A to 28D above all belong to the SCSI protocol. FIG. 29 is a schematic diagram showing the connection of a computer device, a protection module, and a storage device (such as a USB flash disk, a memory card, or a memory chip). As for the connection between the protection module and the storage device, the only difference is the interface and protocol, which are essentially the principle of "intermediate device or card reader". Including our existing USB flash disk, removable hard disk, etc., they are actually just card readers with built-in storage chips. The technical logic is that the control chip converts the received SCSI instructions into SDIO or SPI instructions that can read/write storage media, and operate the data of the storage medium. However, if the control and storage are separated, such as USB flash disk and card reader, the intermediate device needs to obtain the storage information in advance in the preparation phase. For the USB flash disk of USB interface, further judgment on the descriptor is needed to determine the device type (simple mass storage device type) of USB flash disk and ensure that there are no functions such as HID. If control and storage are integrated together, for example, for the new USB flash disk according to the present invention, the storage information is fixed in advance, and there is no need to obtain it during the preparation phase. However, if it is in the logical split disk mode, the capacity information needs to be modified, and if it is in the specific folder read/write mode, the file address also needs to be read.

(2) Configure the matched data interaction instruction execution result strategy.

① Judgment of whether or not the instruction data is executed. Preset data interaction instruction rules and realize judgment such as selecting to perform operation A or selecting to perform operation B. For example, in the read-only mode (protection scene) and other modes, when the computer device sends a data interaction instruction to write data (for example, the operation instruction code is 0x2A (write data)), the protection module does not perform the write operation. For example, in modes such as sector limit mode (protection scene), when the computer device sends data interaction instructions to operate sector address in restriction of the preset read/write only, the protection module does not perform corresponding operations.

② Instruction data modification/replacement. Preset data interaction instruction rules and realize modification or replacement of instruction data, and then send the instruction data to the storage device. For example, in the logical split disk mode, the specific file mode, and the blank file mode, modify the operation sector address and read/write the corresponding storage device sector address according to the preset.

③ Judgment of whether or not the data packet is forwarded. Preset data packet rules and realize judgment such as selecting to perform operation A or selecting to perform operation B. For example, in file-limited read-write mode, keyword comparison rules can be preset, the contents of the packet hit the rules are forwarded or not forwarded to a computer device or storage device.

④ Packet data modification\replacement. Preset data packet rules and realize modification or replacement of data packet data, and then send the data packet to the computer device\or storage device. For example, in the encryption write or decryption read mode, the data packet data is modified according to preset rules, and then forwarded to the computer device\or storage device. For example, in the sector limited read/write mode, according to the preset rules, when the sector address read by the computer device does not meet the preset rules, directly return the preset data packets for replacement (such as blank data packets).

⑤ Judgment of whether or not the status packet is forwarded. Preset data packet rules and realize judgment such as selecting to perform operation A or selecting to perform operation B. For example, when it is judged that when the status error code is not 0x00, whether to forward the status packet to the computer device.

⑥ Modification/replacement of status packet data. Preset data packet rules and realize modification or replacement of status packet data, and then send the status packet to the computer device\or storage device. For example, in the sector limited read/write mode, according to the preset rules, when the sector address read by the computer device does not meet the preset rules, directly return the preset status packets for replacement (such as a packet that is not 0x00 error status).

⑦ Perform data read/write operations on storage devices and storage media. Preset data interaction instruction judgment rules, and realize preset read/write operations on storage devices. For example, when receiving a preset data interaction instruction (e.g., a data interaction instruction and a data packet or a status packet that may be dangerous), the read/write operation to the sector data of the storage device is prioritized to protect the data in advance.

⑧ Perform the trigger to start the protection mode. Preset data interaction instruction judgment rules and realize operation of starting the protection mode. For example, when receiving a preset data interaction instruction (e.g., a data interaction instruction and a data packet or a status packet that may be dangerous), the backup mode is started to prevent data from being destroyed; log recording is started to save the log information of the data interaction instruction.

⑨ Perform the operation of disconnecting the computer device. Preset data interaction instruction judgment rules and realize operation of disconnecting computer device. For example, when receiving a preset data interaction instruction (e.g., a data interaction instruction and a data packet or a status packet that may be dangerous), the computer device is disconnected.

⑩ Perform the trigger of selecting the data source. Preset data interaction instruction judgment rules and realize reselection of storage devices, storage media or logical disk partitions. For example, when receiving a preset data interaction instruction (e.g., a data interaction instruction and a data packet or a status packet that may be dangerous), reselect a preset storage device, storage medium or logical split disk, or a virtual storage medium (non-real data storage medium), and disconnect the device to re-enumerate as the access data source.

2. Generating Configuration Information of the Protection Scene or Software with the Protection Scene Protection scenario information and protection operation strategies for the above configurations:

On the one hand, configuration information can be generated. Generate export configuration information and share it through data transmission (e.g., network transmission, point-to-point transmission, copy and paste), etc. The configuration information can be further modified according to different usage scenarios. The configuration information can be imported into the security control framework software or the security control framework hardware device, and the security control framework executes the corresponding security control strategies.

On the other hand, software (or firmware) can be generated. In the software or hardware device of the security control framework, the corresponding software compilation strategy is executed according to the configuration information written by itself or imported from the outside, and generate security control software (or firmware) for the protection scenarios in the configuration information. By running the security control software (or firmware) on the operating system or hardware device, the corresponding security control strategy is executed.

3. Execute Protection Scene Security Control

Security control software (or firmware) or security control framework software (or firmware) becomes a protection module, which runs on operating systems, hardware devices, control chips, memory chips and other devices.

In the preparation phase, according to the configuration of the protection scenario, data interaction instructions are sent to the storage device.

In the enumeration phase and the data interaction phase, according to the current protection scene (protection mode) of the protection module, the permission control is performed on the data interaction instruction sent by the computer device, and the data interaction instruction is used for the computer device to perform data interaction with the storage device;

Respond to the data interaction instruction if the data interaction instruction satisfies the permission requirement corresponding to the current protection mode.

In addition, another embodiment of the present application provides an intermediate device.

The intermediate device comprises:
a first port for connecting a computer device;
a second port for connecting a storage device;
an interaction module comprising at least one of the following: a touch screen, a voice interaction device, a plurality of buttons, a slide switch (or an interaction control with at least two selections); and
a protection module which is connected between the first port and the second port and is used for implementing the steps of the data security protection method provided in the above embodiment.

Another embodiment of the present application provides a device system, which comprises: a computer device, a storage device and an intermediate device provided by the above embodiment.

Another embodiment of the present application provides a storage device, which comprises:
a first port for connecting a computer device;
a protection chip for implementing the steps of the data security protection method provided in the embodiment;
a control chip connected with the first port through the protection chip;
a storage chip connected with the control chip, which is used for performing storage management on data in storage space under the control of the control chip.

Another embodiment of the present application provides a storage device, which comprises:
a first port for connecting a computer device;
a control chip on which a protection module is deployed for implementing the steps of the data security protection method provided in the above embodiment;
a storage chip connected with the first port through the control chip, which is used for performing storage management on data in storage space under the control of the control chip.

Still another embodiment of the present application provides a storage device.

The storage device comprises:
a first port for connecting a computer device;
a control chip connected with a first port, which is used for generating corresponding control instructions based on the data interaction instructions sent by the computer device;
a storage chip connected with the control chip;
wherein, a protection module is deployed on the storage chip for processing control instructions sent by the control chip by adopting the steps of the data security protection method of the above embodiment.

Figure 30:
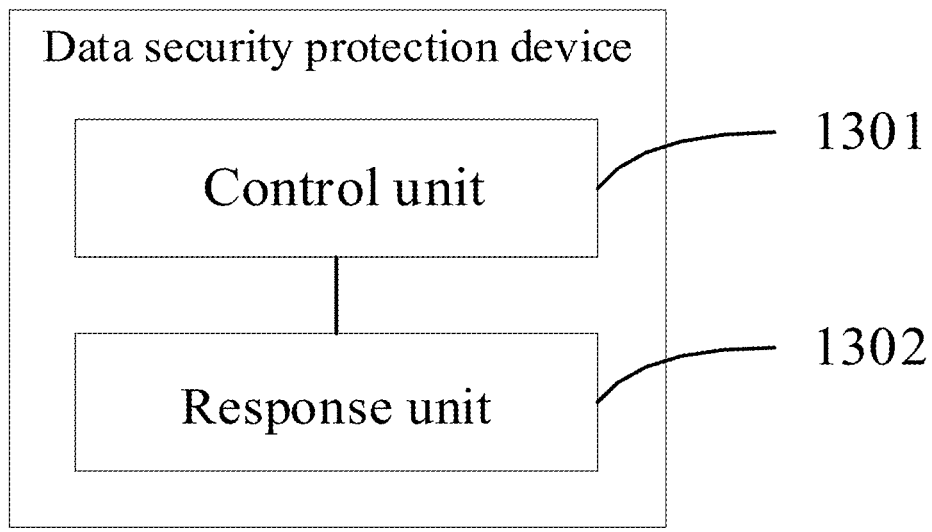
FIG. 30 is a structure diagram of the data security protection module shown in an embodiment of the present application.

In order to implement the data security protection method corresponding to the above method embodiment, to achieve corresponding functions and technical effects. Referring to FIG. 30, which is a structure diagram of the data security protection module shown in an embodiment of the present application. For ease of illustration, only the parts related to this embodiment are shown. The data security protection module provided by application can be applied to a target device, the target device is provided with a protection module comprising at least one protection mode for controlling read/write permission of a computer device on a storage device, wherein the device comprises:
a control unit 1301 configured for controlling the permission of the data interaction instruction sent by the computer device according to the current protection mode of the target device, wherein the data interaction instruction is used for data interaction between the computer device and the storage device;
a response unit 1302 configured for responding to the data interaction instruction if the data interaction instruction meets permission requirement corresponding to the current protection mode.

In some embodiments, the device further includes:
an identification unit configured or identifying a device type of the first interface if a communication connection request between the computer device and the storage device is detected;
an establishing unit configured for establishing a communication connection between the computer device and the storage device if the device type is a preset permissible communication type.

In some embodiments, if the target device is an intermediate device with a protection module, the intermediate device is provided with a first interface for connecting a storage device and a second interface for connecting a computer device; The device further comprised:
a first detection unit configured for detecting the communication connection request between the computer device and the storage device when the first interface is connected to the storage device, and the second interface is connected to the computer device.

In some embodiments, the device further comprises:
an interrupt unit configured for interrupting the communication connection request if the device type is a preset prohibited communication type.

In some embodiments, the establishing unit comprises:
a sending subunit configured for sending target hardware characteristic parameters of the storage device to the computer device, wherein the target hardware characteristic parameters are used to establish a communication connection between the computer device and the storage device.

In some embodiments, the sending subunit is specifically configured for:
obtaining a target hardware characteristic parameter corresponding to the device type from a preset parameter template according to the device type of the storage device;
sending the target hardware characteristic parameter to the computer device.

In some embodiments, the sending subunit is further configured for:
obtaining hardware characteristic parameters of the storage device;
screening the hardware characteristic parameter according to the preset parameter type, so as to determine the target hardware characteristic parameter corresponding to the parameter type; sending the target hardware characteristic parameter to the computer.

In some embodiments, the control unit 1301 comprises:
an identification subunit configured for identifying the instruction type of the data interaction instruction;
a determining subunit configured for determining that the data interaction instruction meets the permission requirements corresponding to the current protection mode if the instruction type is a preset instruction type corresponding to the permission requirement.

In some embodiments, the protection mode is the read-only mode, the device further comprises:
- a return unit configured for returning a read-only parameter to the computer device in response to the parameter read request sent by the computer device, wherein the read-only parameter is used to cause the computer device to identify the storage device as a read-only device.

In some embodiments, the response unit 1302 comprises:
- a response subunit configured for performing read/write operation on the target file in the storage device in response to the data interaction instruction, wherein the read/write operation include at least one of a read operation and a write operation.

In some embodiments, if the protection mode is the whole-disk read-only mode, the response subunit is specifically configured for:
- feeding back the third target data to the computer device in response to the data interaction instruction, wherein the data interaction instruction is a read instruction, and the third target data is data returned by the storage device in response to the read instruction.

In some embodiments, if the protection mode is a specific file read-write mode, the response subunit is specifically configured for:
- mapping the sector address of the target file to the target address in response to the data interaction instruction, wherein the target file is a file displayed on the computer device; performing read/write operation on the target file based on the target address.

In some embodiments, the target file includes an existing specific file or preset file of the storage device, or a file automatically generated before the computer device establishes a communication connection with the storage device.

In some embodiments, if the protection mode is an address-limited read-write mode, the response subunit is specifically configured for:
- verifying the target sector address corresponding to the data interaction instruction in response to the data interaction instruction and based on a preset sector address range, the target sector address is a sector address that the storage device executing the read/write operation based on the data interaction instruction;
- performing read/write operation at the target sector address of the storage device if the target sector address is within the preset sector address range.

In some embodiments, when the protection mode is a file-restricted read-write mode, the response subunit is specifically configured for:
- in response to the data interaction instruction, based on the preset file characteristics, verifying the target file characteristics corresponding to the data interaction instruction, and the target file characteristics are corresponding to when the storage device performs read/write operation based on the data interaction instruction. file characteristics;
- if the characteristic of the target file conforms to the characteristic of the preset file, read/write operation is performed on the target file in the storage device.

In some embodiments, the response subunit is specifically configured for:
- if the characteristic of the target file does not conform to the characteristic of the preset file, hiding operation is performed on the target file.

In some embodiments, the preset file characteristic includes a first hash value corresponding to preset sector data in the file; the response subunit is specifically configured for:
- calculating a second hash value of the preset sector data in the target file;
- determining that the target file characteristic conforms to the preset file characteristic if the second hash value is consistent with the first hash value;
- determining that the target file characteristic does not conform to the preset file characteristic if the second hash value is inconsistent with the first hash value.

In some embodiments, if the protection mode is the encryption write mode, the response subunit is specifically configured for:
- encrypting the data to be written carried by the data interaction instruction to obtain the first target data in response to the data interaction instruction;
- writing the first target data to the target file in the storage device.

In some embodiments, if the protection mode is the encryption write mode, the response subunit is specifically configured for:
- feeding back second target data to the computer device in response to the data interaction instruction, where the second target data is data obtained by decrypting the data returned by the storage device in response to the data interaction instruction.

In some embodiments, if the protection mode is a manual confirmation mode, the response subunit is specifically configured for:
- prompting the user whether to confirm execution of the data interaction instruction in response to the data interaction instruction;
- performing read/write operation on the target file in the storage device if a confirmation execution instruction of the data interaction instruction is received.

In some embodiments, the response subunit is specifically configured for:
- performing abnormal verification on the read/write operation based on preset read and write rules;
- determining that the read/write operation is abnormal if the read/write operation does not comply with the preset read and write rules.

In some embodiments, the device further includes:
- a first connecting unit configured for connecting a target sector range to the computer device as a storage data source, the target sector range is obtained by dividing the storage space of the storage device, and the storage data source includes the target file.

In some embodiments, the device further includes:
- a first read unit configured for reading sector information of the storage device;
- a dividing unit configured for dividing the storage space of the storage device based on the sector information to obtain a plurality of sector ranges corresponding to the storage device, wherein the target sector range is at least one of the plurality of sector ranges.

In some embodiments, the device further includes:
- a second connecting unit configured for connecting an image file to the computer device as the storage data source, and the image file is generated based on a preset mirroring policy.

In some embodiments, the storage device is a networked storage device which is connected to a server-side, and the server-side contains a plurality of networked image files, and the device further comprises:

a third connecting unit configured for connecting the target networked image file as a storage data source to the computer device, wherein the target networked image file is at least one of a plurality of the networked image files, and the storage data source contains the target file.

The device further comprises:

a verification unit configured for connecting a target storage data source corresponding to the instruction type of the verification instruction to the computer device in response to a verification instruction input by the user, wherein the target storage data source is at least one of a sector range, an image file, and a networked image file.

In some embodiments, the device further comprises:

a second read unit configured for reading the power demand information of the storage device;

a configuration unit configured for configuring a circuit protection strategy of the storage device according to the power demand information, wherein the circuit protection strategy is used to control the power consumption status of the storage device.

In some embodiments, the device further comprises:

a generation unit configured for generating an interaction log which is used to record processing records of the data interaction instruction sent by the computer.

The above-mentioned data security protection module can implement the steps of the data security protection method provided in the embodiments. The options in the above method embodiments are also applicable to the present embodiment, and are not described in detail here. The contents of the above-mentioned method embodiments may be referred to for the rest of the embodiments of the present application, and in the present embodiments, they will not be repeated.

Figure 31:
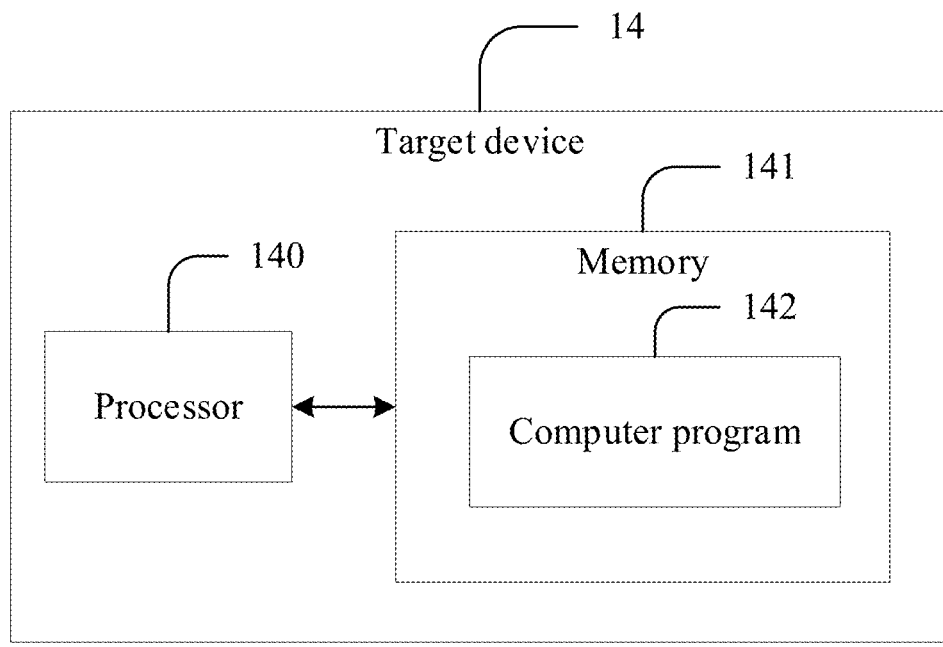
FIG. 31 is a structure diagram of the target device shown in an embodiment of the present application.

FIG. 31 is a structure diagram of the target device provided by an embodiment of the present application. As shown in FIG. 31, the target device 14 of this embodiment includes: at least one processor 140 (only one is shown in FIG. 31), a memory 141, and a computer program 142 stored in the memory 141 and can run on the at least one processor 140, wherein when the processor 140 executes the computer program 142, the steps in any of the above method embodiments are implemented.

The target device 14 may be an intermediate device or a storage device with a protection module. The target device may include, but not limited to, a processor 140 and a memory 141. Those skilled in the art can understand that FIG. 31 is only an example of the target device 14, and does not constitute a limitation on the target device 14. It may include more or less components than those shown in the FIG., or may combine certain components, or different components, for example, may also include input and output devices, network access devices, and so on.

The processor 140 may be a Central Processing Unit (CPU), and the processor 140 may also be other general-purpose processors, a Digital Signal Processor (DSP), an Application Specific Integrated Circuit (ASIC), a Field-Programmable Gate Array (FPGA) or other programmable logic devices, discrete gate or transistor logic devices, discrete hardware components, etc. A general-purpose processor may be a microprocessor, or the processor may be any conventional processor, or the like.

The storage 141 may be an internal storage unit of the target device 14 in some embodiments, such as a hard disk or memory of the target device 14. The memory 141 may also be an external storage device of the target device 14 in other embodiments, such as a plug-in hard disk, a Smart Media Card (SMC), a Secure Digital (SD) card, a Flash Card, etc., equipped on the target device 14. Further, the storage 141 may also include both an internal storage unit of the target device 14 and an external storage device. The memory 141 is used to store operating systems, application programs, bootloader programs (BootLoader), data and other programs, such as program codes of the computer programs. The memory 141 can also be used to temporarily store data that has been output or will be output.

In addition, an embodiment of the present application further provides a computer-readable storage medium on which computer programs are stored, wherein when the computer programs are executed by a processor, the steps in any of the above method embodiments are implemented.

An embodiment of the present application provides a computer program product, and the steps of the above method embodiments are implemented by a target device when the computer program product is running on the target device.

In the several embodiments provided by the present application, each block in the flowchart or block diagram may represent a module, a program segment or a part of codes, and the module, program segment or part of codes comprises one or more executable instructions for implementing specified logical functions. It should also be noted that, in some alternative implementations, the functions noted in the block may occur out of the order noted in the FIGS. For example, two blocks in succession may, in fact, be executed substantially concurrently, or they may sometimes be executed in the reverse order, depending upon the functionality involved.

If the functions are implemented in the form of software function modules and sold or used as independent products, they can be stored in a computer-readable storage medium. Based on this understanding, the technical solution of the present application may be embodied in the form of a software product in essence, or the part that contributes to the prior art, or part of the technical solution, which is stored in a storage medium and includes instructions to enable a target device to perform all or part of the steps of the method described above in each embodiment of the present application. The aforementioned storage medium comprises: USB flash drive, removable hard disk, Read-Only Memory (ROM), Random Access Memory (RAM), (hard disk, SD card, TF card,) disk or CD and other media that can store program codes.

In the above-mentioned specific embodiments, the purpose, technical solution and beneficial effects of the present application have been further described in detail, and it should be understood that the above is only specific embodiments of the present application and is not used to limit the scope of protection of the present application.

In particular, for those skilled in the art, any amendment, equivalent replacement, improvement, etc., made within the spirit and principles of the present application shall be included in the scope of protection of the present application.

The invention claimed is:

1. A data security protection method, wherein the method is applied to a protection module disposed at a target device, the target device is an intermediate device, and the intermediate device is used for connecting a computer device with a storage device, wherein the method comprises:

sending logical split disk capacity parameters of a target logical split disk in the storage device to the computer device in response to a capacity reading instruction from the computer device, so that the computer device only identifies the target logical split disk, wherein the target logical split disk is selected based on the target device or based on other devices communicating with the target device;

modifying an operation address corresponding to a data interaction instruction to a first target sector address corresponding to the logical split disk capacity parameters of the target logical split disk in response to the data interaction instruction sent by the computer device;

performing data read/write according to the first target sector address.

2. The data security protection method of claim 1, wherein before sending the logical split disk capacity parameters of the target logical split disk in the storage device to the computer device in response to the capacity reading instruction from the computer device, the method further comprises:

selecting the target logical split disk in response to a user's selection operation through an interaction device on the target device; or determining the target logical split disk in response to a first logical split disk selection instruction sent by a specifying device, wherein the determined target logical split disk is indicated by the first logical split disk selection instruction, wherein the specifying device communicates with the protection module through near-field communication or remote communication, and the specifying device is different from the computer device; or determining the target logical split disk in response to a second logical split disk selection instruction sent by the computer device, wherein the determined target logical split disk is indicated by the second logical split disk selection instruction; or determining the target logical split disk in response to a verification instruction sent by the computer device, wherein the determined target logical split disk corresponds to password information contained in the verification instruction.

3. The data security protection method of claim 1, wherein the target logical split disk does not overlap with sector addresses of other logical split disks in the storage device.

4. The data security protection method of claim 1, wherein before sending the logical split disk capacity parameters of the target logical split disk in the storage device to the computer device in response to the capacity reading instruction from the computer device, the method further comprises:

splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

5. The data security protection method of claim 4, wherein splitting the sector address range of the storage device to obtain the plurality of logical split disks based on the preset logical disk splitting strategy comprises:

reading basic information of a storage space of the storage device, and dividing the sector address range to obtain the plurality of logical split disks based on the preset logical disk splitting strategy and the basic information, wherein the basic information comprises a total number of sectors and a number of bytes per sector; or generating at least one image file in the storage space of the storage device, and dividing the storage space of the storage device to obtain the plurality of logical split disks according to an address range corresponding to the image file, wherein the storage space is a local storage space based on the storage device and/or a storage space networked with the protection module.

6. The data security protection method of claim 1, wherein the data interaction instruction is an instruction based on a Small Computer System Interface (SCSI) transmission protocol or a Universal Serial Bus (USB) Floppy Interface (UFI) command block protocol, and instruction parameters of the data interaction instruction comprise at least one of an instruction read-write type, an instruction read-write address, read-write status of the storage device, a total number of formattable blocks, a last logical block address, a number of single-sector bytes, a maximum number of logical units, and device information.

7. The data security protection method of claim 1, further comprises:

sending a target hardware characteristic parameter to the computer device in response to a hardware characteristic parameter request instruction sent by the computer device, wherein the target hardware characteristic parameter comprises at least one of a vendor identification, a device identification, a device attribute, a class used by an interface, an endpoint attribute, a transmission rate, an electrical demand, and other hardware characteristic parameters expressed with character string other than the above hardware characteristic parameters; wherein the hardware characteristic parameters corresponding to different logical split disks are different.

8. The data security protection method of claim 1, further comprises:

modifying an operation address corresponding to a sector read/write instruction to a second target sector address in the logical split disks capacity parameters of a target file in response to the sector read/write instruction corresponding to the target file sent by the computer device, and performing data read/write according to the second target sector address.

9. The data security protection method of claim 1, wherein modifying the operation address corresponding to the data interaction instruction to the first target sector address corresponding to the logical split disk capacity parameters of the target logical split disk in response to the data interaction instruction sent by the computer device comprises:

judging whether the operation address corresponding to the data interaction instruction conforms to access control rules in response to the data interaction instruction sent by the computer device;

modifying the operation address to the first target sector address in the target logical split disk if the operation address corresponding to the data interaction instruction conforms to the access control rules.

10. The data security protection method of claim 1, wherein performing data read/write according to the first target sector address comprises:

forwarding the data interaction instruction after modifying the operation address to the first target sector address to the storage device, and receiving data corresponding to the first target sector address returned by the storage device, and returning read data, read status or write status to the computer device; or forwarding the data interaction instruction after modifying the operation address to the first target sector address to the storage device, and receiving data corresponding to the first target sector address returned by the storage device, and modifying the data corresponding to the first target sector address according to content modification rules, and returning the read data, the read status or the write status to the computer device.

11. The data security protection method of claim 1, further comprises:
in a read-only mode, returning a read-only status parameter of the storage device to the computer device if the data interaction instruction is a parameter reading request, and not responding to the data interaction instruction if the data interaction instruction is a write instruction; or
in a specific file mode, the data interaction instruction is an instruction for at least one specific file in the storage device, and the operation type of the instruction is a read type, a write type, or a read and write type; or
in a blank file mode, the data interaction instruction is an instruction for at least one blank file automatically created and/or manually created in the storage device, and the operation type of the instruction is the write type or the read and write type; or
in a sector limited mode, the data source specified in the sector limited mode is at least one specific sector range in the storage device, and the specified operation type is the read type, the write type, or a read-write type;
in a file type restriction mode, the data interaction instruction is an instruction for at least one specific type of file in the storage device, and the operation type of the instruction is the read type, the write type, or the read and write type; or
in an encryption write mode, the data interaction instruction is an instruction for data in at least one first sector range in the storage device, and the operation type of the instruction is the write type, or the read and write type; or
in a decryption readout mode, the data interaction instruction is an instruction for data in at least one second sector range in the storage device, at least one second file, and/or at least one type of file, and the operation type of the instruction is the read type;
in a manual confirmation mode, the data interaction instruction is an instruction for data in at least one third sector range in the storage device, at least one third file and/or at least one type of file, and the operation type of the instruction is the read and write type; or
in a logical split disk mode, the data interaction instruction is an instruction for at least one logical split disk in the storage device, and the operation type of the instruction is the read type, the write type e, or the read and write type.

12. A data security protection method, wherein the method is applied to a server-side connected communicatively with a target device that is provided with a protection module, the target device is an intermediate device, and the intermediate device is connected communicatively with a computer device, wherein the method comprises:
sending logical split disk capacity parameters of a target logical split disk in the server-side to the computer device in response to a capacity reading instruction from the computer device, so that the computer device only identifies the target logical split disk, wherein the target logical split disk is selected based on the target device or based on other devices communicating with the target device;
performing read/write on a first target sector address in response to a data interaction instruction forwarded by the target device; wherein the first target sector address is a target sector address obtained by modifying an operation address corresponding to the data interaction instruction in accordance with the logical split disk capacity parameters.

13. The data security protection method of claim 12, wherein before sending the logical split disk capacity parameters of the target logical split disk in the server-side to the computer device, the method further comprises:
determining all logical split disks corresponding to the target device according to identification information of the target device, wherein the logical split disks are configured to enable the target device or other devices to communicate with the target device to select the target logical split disk.

14. An intermediate device, comprising:
a first port for connecting a computer device;
a second port for connecting a storage device;
a protection module connected between the first port and the second port and configured to implement the steps of the data security protection method of claim 1.

15. The intermediate device of claim 14, further comprises:
a communication component, connected with the protection module, configured for networking so as to connect the protection module with a storage module of a server-side, and configured to transmit a data interaction instruction to the storage module of the server-side in response to the data interaction instruction, to enable the storage module to read/write data based on the data interaction instruction.

16. The intermediate device of claim 14, wherein before sending the logical split disk capacity parameters of the target logical split disk in the storage device to the computer device in response to the capacity reading instruction from the computer device, the method further comprises:
selecting the target logical split disk in response to a user's selection operation through an interaction device on the target device; or
determining the target logical split disk in response to a first logical split disk selection instruction sent by a specifying device, wherein the determined target logical split disk is indicated by the first logical split disk selection instruction, wherein the specifying device communicates with the protection module through near-field communication or remote communication, and the specifying device is different from the computer device; or
determining the target logical split disk in response to a second logical split disk selection instruction sent by the computer device, wherein the determined target logical split disk is indicated by the second logical split disk selection instruction; or
determining the target logical split disk in response to a verification instruction sent by the computer device, wherein the determined target logical split disk corresponds to password information contained in the verification instruction.

17. The intermediate device of claim 14, wherein the target logical split disk does not overlap with sector addresses of other logical split disks in the storage device.

18. The intermediate device of claim 14, wherein before sending the logical split disk capacity parameters of the target logical split disk in the storage device to the computer device in response to the capacity reading instruction from the computer device, the method further comprises:
splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

19. The intermediate device of claim 18, wherein splitting the sector address range of the storage device to obtain the plurality of logical split disks based on the preset logical disk splitting strategy comprises:
reading basic information of a storage space of the storage device, and dividing the sector address range to obtain the plurality of logical split disks based on the preset logical disk splitting strategy and the basic information, wherein the basic information comprises a total number of sectors and a number of bytes per sector; or
generating at least one image file in the storage space of the storage device, and dividing the storage space of the storage device to obtain the plurality of logical split disks according to an address range corresponding to the image file, wherein the storage space is a local storage space based on the storage device and/or a storage space networked with the protection module.

20. The intermediate device of claim 14, wherein the data interaction instruction is an instruction based on a Small Computer System Interface (SCSI) transmission protocol or a Universal Serial Bus (USB) Floppy Interface (UFI) command block protocol, and instruction parameters of the data interaction instruction comprise at least one of an instruction read-write type, an instruction read-write address, read-write status of the storage device, a total number of formattable blocks, a last logical block address, a number of single-sector bytes, a maximum number of logical units, and device information.

21. The intermediate device of claim 14, further comprises:
sending a target hardware characteristic parameter to the computer device in response to a hardware characteristic parameter request instruction sent by the computer device, wherein the target hardware characteristic parameter comprises at least one of a vendor identification, a device identification, a device attribute, a class used by an interface, an endpoint attribute, a transmission rate, an electrical demand, and other hardware characteristic parameters expressed with character string other than the above hardware characteristic parameters; wherein the hardware characteristic parameters corresponding to different logical split disks are different.

22. The intermediate device of claim 14, further comprises:
modifying an operation address corresponding to a sector read/write instruction to a second target sector address in the logical split disks capacity parameters of a target file in response to the sector read/write instruction corresponding to the target file sent by the computer device, and performing data read/write according to the second target sector address.

23. The intermediate device of claim 14, wherein modifying the operation address corresponding to the data interaction instruction to the first target sector address corresponding to the logical split disk capacity parameters of the target logical split disk in response to the data interaction instruction sent by the computer device comprises:
judging whether the operation address corresponding to the data interaction instruction conforms to access control rules in response to the data interaction instruction sent by the computer device;
modifying the operation address to the first target sector address in the target logical split disk if the operation address corresponding to the data interaction instruction conforms to the access control rules.

24. The intermediate device of claim 14, wherein performing data read/write according to the first target sector address comprises:
forwarding the data interaction instruction after modifying the operation address to the first target sector address to the storage device, and receiving data corresponding to the first target sector address returned by the storage device, and returning read data, read status or write status to the computer device; or
forwarding the data interaction instruction after modifying the operation address to the first target sector address to the storage device, and receiving data corresponding to the first target sector address returned by the storage device, and modifying the data corresponding to the first target sector address according to content modification rules, and returning the read data, the read status or the write status to the computer device.

25. The intermediate device of claim 14, further comprises:
in a read-only mode, returning a read-only status parameter of the storage device to the computer device if the data interaction instruction is a parameter reading request, and not responding to the data interaction instruction if the data interaction instruction is a write instruction; or
in a specific file mode, the data interaction instruction is an instruction for at least one specific file in the storage device, and the operation type of the instruction is a read type, a write type, or a read and write type; or
in a blank file mode, the data interaction instruction is an instruction for at least one blank file automatically created and/or manually created in the storage device, and the operation type of the instruction is the write type or the read and write type; or
in a sector limited mode, the data source specified in the sector limited mode is at least one specific sector range in the storage device, and the specified operation type is the read type, the write type, or a read-write type;
in a file type restriction mode, the data interaction instruction is an instruction for at least one specific type of file in the storage device, and the operation type of the instruction is the read type, the write type, or the read and write type; or
in an encryption write mode, the data interaction instruction is an instruction for data in at least one first sector range in the storage device, and the operation type of the instruction is the write type, or the read and write type; or
in a decryption readout mode, the data interaction instruction is an instruction for data in at least one second sector range in the storage device, at least one second file, and/or at least one type of file, and the operation type of the instruction is the read type;
in a manual confirmation mode, the data interaction instruction is an instruction for data in at least one third sector range in the storage device, at least one third file and/or at least one type of file, and the operation type of the instruction is the read and write type; or in a logical split disk mode, the data interaction instruction is an instruction for at least one logical split disk in the storage device, and the operation type of the instruction is the read type, the write type e, or the read and write type.

26. A device system, comprising:
   a computer device;
   a storage device; and
   an intermediate device of claim 14.

27. A storage device, comprising:
   a port for connecting a computer device;
   a protection chip for implementing the steps of the data security protection method of claim 1;
   a control chip connected with the port for connecting the computer device through the protection chip;
   a storage chip connected with the control chip, configured to perform storage management on data in a storage space in accordance with control instructions issued by the control chip.

28. The storage device of claim 27, wherein before sending the logical split disk capacity parameters of the target logical split disk in the storage device to the computer device in response to the capacity reading instruction from the computer device, the method further comprises:
   selecting the target logical split disk in response to a user's selection operation through an interaction device on the target device; or
   determining the target logical split disk in response to a first logical split disk selection instruction sent by a specifying device, wherein the determined target logical split disk is indicated by the first logical split disk selection instruction, wherein the specifying device communicates with the protection module through near-field communication or remote communication, and the specifying device is different from the computer device; or
   determining the target logical split disk in response to a second logical split disk selection instruction sent by the computer device, wherein the determined target logical split disk is indicated by the second logical split disk selection instruction; or
   determining the target logical split disk in response to a verification instruction sent by the computer device, wherein the determined target logical split disk corresponds to password information contained in the verification instruction.

29. The storage device of claim 27, wherein the target logical split disk does not overlap with sector addresses of other logical split disks in the storage device.

30. The data security protection method of claim 1, wherein before sending the logical split disk capacity parameters of the target logical split disk in the storage device to the computer device in response to the capacity reading instruction from the computer device, the method further comprises:
   splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

31. The storage device of claim 30, wherein splitting the sector address range of the storage device to obtain the plurality of logical split disks based on the preset logical disk splitting strategy comprises:
   reading basic information of a storage space of the storage device, and dividing the sector address range to obtain the plurality of logical split disks based on the preset logical disk splitting strategy and the basic information, wherein the basic information comprises a total number of sectors and a number of bytes per sector; or
   generating at least one image file in the storage space of the storage device, and dividing the storage space of the storage device to obtain the plurality of logical split disks according to an address range corresponding to the image file, wherein the storage space is a local storage space based on the storage device and/or a storage space networked with the protection module.

32. The storage device of claim 27, wherein the data interaction instruction is an instruction based on a Small Computer System Interface (SCSI) transmission protocol or a Universal Serial Bus (USB) Floppy Interface (UFI) command block protocol, and instruction parameters of the data interaction instruction comprise at least one of an instruction read-write type, an instruction read-write address, read-write status of the storage device, a total number of formattable blocks, a last logical block address, a number of single-sector bytes, a maximum number of logical units, and device information.

33. The storage device of claim 27, further comprises:
   sending a target hardware characteristic parameter to the computer device in response to a hardware characteristic parameter request instruction sent by the computer device, wherein the target hardware characteristic parameter comprises at least one of a vendor identification, a device identification, a device attribute, a class used by an interface, an endpoint attribute, a transmission rate, an electrical demand, and other hardware characteristic parameters expressed with character string other than the above hardware characteristic parameters; wherein the hardware characteristic parameters corresponding to different logical split disks are different.

34. The storage device of claim 27, further comprises:
   modifying an operation address corresponding to a sector read/write instruction to a second target sector address in the logical split disks capacity parameters of a target file in response to the sector read/write instruction corresponding to the target file sent by the computer device, and performing data read/write according to the second target sector address.

35. The storage device of claim 27, wherein modifying the operation address corresponding to the data interaction instruction to the first target sector address corresponding to the logical split disk capacity parameters of the target logical split disk in response to the data interaction instruction sent by the computer device comprises:
   judging whether the operation address corresponding to the data interaction instruction conforms to access control rules in response to the data interaction instruction sent by the computer device;
   modifying the operation address to the first target sector address in the target logical split disk if the operation address corresponding to the data interaction instruction conforms to the access control rules.

36. The storage device of claim 27, wherein performing data read/write according to the first target sector address comprises:
   forwarding the data interaction instruction after modifying the operation address to the first target sector address to the storage device, and receiving data corresponding to the first target sector address returned by the storage device, and returning read data, read status or write status to the computer device; or forwarding the data interaction instruction after modifying the operation address to the first target sector address to the storage device, and receiving data corresponding to the first target sector address returned by the storage device, and modifying the data corresponding to the first target sector address according to content modification rules, and returning the read data, the read status or the write status to the computer device.

37. The storage device of claim 27, further comprises:

in a read-only mode, returning a read-only status parameter of the storage device to the computer device if the data interaction instruction is a parameter reading request, and not responding to the data interaction instruction if the data interaction instruction is a write instruction; or in a specific file mode, the data interaction instruction is an instruction for at least one specific file in the storage device, and the operation type of the instruction is a read type, a write type, or a read and write type; or in a blank file mode, the data interaction instruction is an instruction for at least one blank file automatically created and/or manually created in the storage device, and the operation type of the instruction is the write type or the read and write type; or in a sector limited mode, the data source specified in the sector limited mode is at least one specific sector range in the storage device, and the specified operation type is the read type, the write type, or a read-write type;

in a file type restriction mode, the data interaction instruction is an instruction for at least one specific type of file in the storage device, and the operation type of the instruction is the read type, the write type, or the read and write type; or in an encryption write mode, the data interaction instruction is an instruction for data in at least one first sector range in the storage device, and the operation type of the instruction is the write type, or the read and write type; or in a decryption readout mode, the data interaction instruction is an instruction for data in at least one second sector range in the storage device, at least one second file, and/or at least one type of file, and the operation type of the instruction is the read type;

in a manual confirmation mode, the data interaction instruction is an instruction for data in at least one third sector range in the storage device, at least one third file and/or at least one type of file, and the operation type of the instruction is the read and write type; or in a logical split disk mode, the data interaction instruction is an instruction for at least one logical split disk in the storage device, and the operation type of the instruction is the read type, the write type e, or the read and write type.

38. A storage device, comprising:
a port for connecting a computer device;
a control chip on which a protection module is deployed for implementing the steps of the data security protection method of claim 1;
a storage chip connected with the port for connecting the computer device through the control chip, configured to perform storage management on data in a storage space in accordance with control instructions issued by the control chip.

39. The storage device of claim 38, wherein before sending the logical split disk capacity parameters of the target logical split disk in the storage device to the computer device in response to the capacity reading instruction from the computer device, the method further comprises:

selecting the target logical split disk in response to a user's selection operation through an interaction device on the target device; or determining the target logical split disk in response to a first logical split disk selection instruction sent by a specifying device, wherein the determined target logical split disk is indicated by the first logical split disk selection instruction, wherein the specifying device communicates with the protection module through near-field communication or remote communication, and the specifying device is different from the computer device; or determining the target logical split disk in response to a second logical split disk selection instruction sent by the computer device, wherein the determined target logical split disk is indicated by the second logical split disk selection instruction; or determining the target logical split disk in response to a verification instruction sent by the computer device, wherein the determined target logical split disk corresponds to password information contained in the verification instruction.

40. The storage device of claim 38, wherein the target logical split disk does not overlap with sector addresses of other logical split disks in the storage device.

41. The storage device of claim 38, wherein before sending the logical split disk capacity parameters of the target logical split disk in the storage device to the computer device in response to the capacity reading instruction from the computer device, the method further comprises:

splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

42. The storage device of claim 41, wherein splitting the sector address range of the storage device to obtain the plurality of logical split disks based on the preset logical disk splitting strategy comprises:

reading basic information of a storage space of the storage device, and dividing the sector address range to obtain the plurality of logical split disks based on the preset logical disk splitting strategy and the basic information, wherein the basic information comprises a total number of sectors and a number of bytes per sector; or generating at least one image file in the storage space of the storage device, and dividing the storage space of the storage device to obtain the plurality of logical split disks according to an address range corresponding to the image file, wherein the storage space is a local storage space based on the storage device and/or a storage space networked with the protection module.

43. The storage device of claim 38, wherein the data interaction instruction is an instruction based on a Small Computer System Interface (SCSI) transmission protocol or a Universal Serial Bus (USB) Floppy Interface (UFI) command block protocol, and instruction parameters of the data interaction instruction comprise at least one of an instruction read-write type, an instruction read-write address, read-write status of the storage device, a total number of formattable blocks, a last logical block address, a number of single-sector bytes, a maximum number of logical units, and device information.

44. The storage device of claim 38, further comprises:
sending a target hardware characteristic parameter to the computer device in response to a hardware characteristic parameter request instruction sent by the computer device, wherein the target hardware characteristic parameter comprises at least one of a vendor identification, a device identification, a device attribute, a class used by an interface, an endpoint attribute, a transmission rate, an electrical demand, and other hardware characteristic parameters expressed with character string other than the above hardware characteristic parameters; wherein the hardware characteristic parameters corresponding to different logical split disks are different.

45. The storage device of claim 38, further comprises:
modifying an operation address corresponding to a sector read/write instruction to a second target sector address in the logical split disks capacity parameters of a target file in response to the sector read/write instruction corresponding to the target file sent by the computer device, and performing data read/write according to the second target sector address.

46. The storage device of claim 38, wherein modifying the operation address corresponding to the data interaction instruction to the first target sector address corresponding to the logical split disk capacity parameters of the target logical split disk in response to the data interaction instruction sent by the computer device comprises:
judging whether the operation address corresponding to the data interaction instruction conforms to access control rules in response to the data interaction instruction sent by the computer device;
modifying the operation address to the first target sector address in the target logical split disk if the operation address corresponding to the data interaction instruction conforms to the access control rules.

47. The storage device of claim 38, wherein performing data read/write according to the first target sector address comprises:
forwarding the data interaction instruction after modifying the operation address to the first target sector address to the storage device, and receiving data corresponding to the first target sector address returned by the storage device, and returning read data, read status or write status to the computer device; or
forwarding the data interaction instruction after modifying the operation address to the first target sector address to the storage device, and receiving data corresponding to the first target sector address returned by the storage device, and modifying the data corresponding to the first target sector address according to content modification rules, and returning the read data, the read status or the write status to the computer device.

48. The storage device of claim 38, further comprises:
in a read-only mode, returning a read-only status parameter of the storage device to the computer device if the data interaction instruction is a parameter reading request, and not responding to the data interaction instruction if the data interaction instruction is a write instruction; or
in a specific file mode, the data interaction instruction is an instruction for at least one specific file in the storage device, and the operation type of the instruction is a read type, a write type, or a read and write type; or in a blank file mode, the data interaction instruction is an instruction for at least one blank file automatically created and/or manually created in the storage device, and the operation type of the instruction is the write type or the read and write type; or
in a sector limited mode, the data source specified in the sector limited mode is at least one specific sector range in the storage device, and the specified operation type is the read type, the write type, or a read-write type;
in a file type restriction mode, the data interaction instruction is an instruction for at least one specific type of file in the storage device, and the operation type of the instruction is the read type, the write type, or the read and write type; or
in an encryption write mode, the data interaction instruction is an instruction for data in at least one first sector range in the storage device, and the operation type of the instruction is the write type, or the read and write type; or
in a decryption readout mode, the data interaction instruction is an instruction for data in at least one second sector range in the storage device, at least one second file, and/or at least one type of file, and the operation type of the instruction is the read type;
in a manual confirmation mode, the data interaction instruction is an instruction for data in at least one third sector range in the storage device, at least one third file and/or at least one type of file, and the operation type of the instruction is the read and write type; or
in a logical split disk mode, the data interaction instruction is an instruction for at least one logical split disk in the storage device, and the operation type of the instruction is the read type, the write type e, or the read and write type.

49. A storage device, comprising:
a port for connecting a computer device;
a control chip connected with the port for connecting the computer device, configured to generate control instructions based on an data interaction instruction sent by the computer device;
a storage chip connected with the control chip;
wherein, a protection module is deployed on the storage chip for processing control instructions sent by the control chip by adopting the steps of the data security protection method of claim 1.

50. The storage device of claim 49, wherein before sending the logical split disk capacity parameters of the target logical split disk in the storage device to the computer device in response to the capacity reading instruction from the computer device, the method further comprises:
selecting the target logical split disk in response to a user's selection operation through an interaction device on the target device; or
determining the target logical split disk in response to a first logical split disk selection instruction sent by a specifying device, wherein the determined target logical split disk is indicated by the first logical split disk selection instruction, wherein the specifying device communicates with the protection module through near-field communication or remote communication, and the specifying device is different from the computer device; or
determining the target logical split disk in response to a second logical split disk selection instruction sent by the computer device, wherein the determined target logical split disk is indicated by the second logical split disk selection instruction; or determining the target logical split disk in response to a verification instruction sent by the computer device, wherein the determined target logical split disk corresponds to password information contained in the verification instruction.

51. The storage device of claim 49, wherein the target logical split disk does not overlap with sector addresses of other logical split disks in the storage device.

52. The storage device of claim 49, wherein before sending the logical split disk capacity parameters of the target logical split disk in the storage device to the computer device in response to tie capacity reading instruction from the computer device, the method further comprises:
  splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

53. The storage device of claim 52, wherein splitting the sector address range of the storage device to obtain tie plurality of logical split disks based on the preset logical disk splitting strategy comprises:
  reading basic information of a storage space of the storage device, and dividing the sector address range to obtain the plurality of logical split disks based on the preset logical disk splitting strategy and the basic information, wherein the basic information comprises a total number of sectors and a number of bytes per sector; or
  generating at least one image file in the storage space of the storage device, and dividing the storage space of the storage device to obtain the plurality of logical split disks according to an address range corresponding to the image file, wherein the storage space is a local storage space based on the storage device and/or a storage space networked with the protection module.

54. The storage device of claim 49, wherein the data interaction instruction is an instruction based on a Small Computer System Interface (SCSI) transmission protocol or a Universal Serial Bus (USB) Floppy Interface (UFI) command block protocol, and instruction parameters of the data interaction instruction comprise at least one of an instruction read-write type, an instruction read-write address, read-write status of the storage device, a total number of formattable blocks, a last logical block address, a number of single-sector bytes, a maximum number of logical units, and device information.

55. The storage device of claim 49, further comprises:
  sending a target hardware characteristic parameter to the computer device in response to a hardware characteristic parameter request instruction sent by the computer device, wherein the target hardware characteristic parameter comprises at least one of a vendor identification, a device identification, a device attribute, a class used by an interface, an endpoint attribute, a transmission rate, an electrical demand, and other hardware characteristic parameters expressed with character string other than the above hardware characteristic parameters; wherein the hardware characteristic parameters corresponding to different logical split disks are different.

56. The storage device of claim 49, further comprises:
  modifying an operation address corresponding to a sector read/write instruction to a second target sector address in the logical split disks capacity parameters of a target file in response to the sector read/write instruction corresponding to the target file sent by the computer device, and performing data read/write according to the second target sector address.

57. The storage device of claim 49, wherein modifying the operation address corresponding to the data interaction instruction to the first target sector address corresponding to the logical split disk capacity parameters of the target logical split disk in response to the data interaction instruction sent by the computer device comprises:
  judging whether the operation address corresponding to the data interaction instruction conforms to access control rules in response to the data interaction instruction sent by the computer device;
  modifying the operation address to the first target sector address in the target logical split disk if the operation address corresponding to the data interaction instruction conforms to the access control rules.

58. The storage device of claim 49, wherein performing data read/write according to the first target sector address comprises:
  forwarding the data interaction instruction after modifying the operation address to the first target sector address to the storage device, and receiving data corresponding to the first target sector address returned by the storage device, and returning read data, read status or write status to the computer device; or
  forwarding the data interaction instruction after modifying the operation address to the first target sector address to the storage device, and receiving data corresponding to the first target sector address returned by the storage device, and modifying the data corresponding to the first target sector address according to content modification rules, and returning the read data, the read status or the write status to the computer device.

59. The storage device of claim 49, further comprises:
  in a read-only mode, returning a read-only status parameter of the storage device to the computer device if the data interaction instruction is a parameter reading request, and not responding to the data interaction instruction if the data interaction instruction is a write instruction; or
  in a specific file mode, the data interaction instruction is an instruction for at least one specific file in the storage device, and the operation type of the instruction is a read type, a write type, or a read and write type; or
  in a blank file mode, the data interaction instruction is an instruction for at least one blank file automatically created and/or manually created in the storage device, and the operation type of the instruction is the write type or the read and write type; or
  in a sector limited mode, the data source specified in the sector limited mode is at least one specific sector range in the storage device, and the specified operation type is the read type, the write type, or a read-write type;
  in a file type restriction mode, the data interaction instruction is an instruction for at least one specific type of file in the storage device, and the operation type of the instruction is the read type, the write type, or the read and write type; or
  in an encryption write mode, the data interaction instruction is an instruction for data in at least one first sector range in the storage device, and the operation type of the instruction is the write type, or the read and write type; or
  in a decryption readout mode, the data interaction instruction is an instruction for data in at least one second sector range in the storage device, at least one second file, and/or at least one type of file, and the operation type of the instruction is the read type;

in a manual confirmation mode, the data interaction instruction is an instruction for data in at least one third sector range in the storage device, at least one third file and/or at least one type of file, and the operation type of the instruction is the read and write type; or in a logical split disk mode, the data interaction instruction is an instruction for at least one logical split disk in the storage device, and the operation type of the instruction is the read type, the write type e, or the read and write type.

60. A server-side, comprising:
a port for connecting a target device, wherein the target device is an intermediate device;
a control chip connected with the port for connecting the target device, configured to generate control instructions based on an data interaction instruction forwarded by the target device;
a storage chip connected with the control chip;
wherein, the storage chip is used for processing control instructions sent by the control chip by adopting the steps of the data security protection method of claim 12.

61. A computer-readable storage medium, on which a computer program is stored, and the steps in the data security protection method of claim 1 implemented when the computer program is executed by a processor.

62. The computer-readable storage medium of claim 61, wherein before sending the logical split disk capacity parameters of the target logical split disk in the storage device to the computer device in response to the capacity reading instruction from the computer device, the method further comprises:
selecting the target logical split disk in response to a user's selection operation through an interaction device on the target device; or
determining the target logical split disk in response to a first logical split disk selection instruction sent by a specifying device, wherein the determined target logical split disk is indicated by the first logical split disk selection instruction, wherein the specifying device communicates with the protection module through near-field communication or remote communication, and the specifying device is different from the computer device; or
determining the target logical split disk in response to a second logical split disk selection instruction sent by the computer device, wherein the determined target logical split disk is indicated by the second logical split disk selection instruction; or
determining the target logical split disk in response to a verification instruction sent by the computer device, wherein the determined target logical split disk corresponds to password information contained in the verification instruction.

63. The computer-readable storage medium of claim 61, wherein the target logical split disk does not overlap with sector addresses of other logical split disks in the storage device.

64. The computer-readable storage medium of claim 61, wherein before sending the logical split disk capacity parameters of the target logical split disk in the storage device to the computer device in response to the capacity reading instruction from the computer device, the method further comprises:
splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

65. The computer-readable storage medium of claim 64, wherein splitting the sector address range of the storage device to obtain the plurality of logical split disks based on the preset logical disk splitting strategy comprises:
reading basic information of a storage space of the storage device, and dividing the sector address range to obtain the plurality of logical split disks based on the preset logical disk splitting strategy and the basic information, wherein the basic information comprises a total number of sectors and a number of bytes per sector; or
generating at least one image file in the storage space of the storage device, and dividing the storage space of the storage device to obtain the plurality of logical split disks according to an address range corresponding to the image file, wherein the storage space is a local storage space based on the storage device and/or a storage space networked with the protection module.

66. The computer-readable storage medium of claim 61, wherein the data interaction instruction is an instruction based on a Small Computer System Interface (SCSI) transmission protocol or a Universal Serial Bus (USB) Floppy Interface (UFI) command block protocol, and instruction parameters of the data interaction instruction comprise at least one of an instruction read-write type, an instruction read-write address, read-write status of the storage device, a total number of formattable blocks, a last logical block address, a number of single-sector bytes, a maximum number of logical units, and device information.

67. The computer-readable storage medium of claim 61, further comprises:
sending a target hardware characteristic parameter to the computer device in response to a hardware characteristic parameter request instruction sent by the computer device, wherein the target hardware characteristic parameter comprises at least one of a vendor identification, a device identification, a device attribute, a class used by an interface, an endpoint attribute, a transmission rate, an electrical demand, and other hardware characteristic parameters expressed with character string other than the above hardware characteristic parameters; wherein the hardware characteristic parameters corresponding to different logical split disks are different.

68. The computer-readable storage medium of claim 61, further comprises:
modifying an operation address corresponding to a sector read/write instruction to a second target sector address in the logical split disks capacity parameters of a target file in response to the sector read/write instruction corresponding to the target file sent by the computer device, and performing data read/write according to the second target sector address.

69. The computer-readable storage medium of claim 61, wherein modifying the operation address corresponding to the data interaction instruction to the first target sector address corresponding to the logical split disk capacity parameters of the target logical split disk in response to the data interaction instruction sent by the computer device comprises:

judging whether the operation address corresponding to the data interaction instruction conforms to access control rules in response to the data interaction instruction sent by the computer device;

modifying the operation address to the first target sector address in the target logical split disk if the operation address corresponding to the data interaction instruction conforms to the access control rules.

70. The computer-readable storage medium of claim 61, wherein performing data read/write according to the first target sector address comprises:

forwarding the data interaction instruction after modifying the operation address to the first target sector address to the storage device, and receiving data corresponding to the first target sector address returned by the storage device, and returning read data, read status or write status to the computer device; or forwarding the data interaction instruction after modifying the operation address to the first target sector address to the storage device, and receiving data corresponding to the first target sector address returned by the storage device, and modifying the data corresponding to the first target sector address according to content modification rules, and returning the read data, the read status or the write status to the computer device.

71. The computer-readable storage medium of claim 61, further comprises:

in a read-only mode, returning a read-only status parameter of the storage device to the computer device if the data interaction instruction is a parameter reading request, and not responding to the data interaction instruction if the data interaction instruction is a write instruction; or in a specific file mode, the data interaction instruction is an instruction for at least one specific file in the storage device, and the operation type of the instruction is a read type, a write type, or a read and write type; or in a blank file mode, the data interaction instruction is an instruction for at least one blank file automatically created and/or manually created in the storage device, and the operation type of the instruction is the write type or the read and write type; or in a sector limited mode, the data source specified in the sector limited mode is at least one specific sector range in the storage device, and the specified operation type is the read type, the write type, or a read-write type;

in a file type restriction mode, the data interaction instruction is an instruction for at least one specific type of file in the storage device, and the operation type of the instruction is the read type, the write type, or the read and write type; or in an encryption write mode, the data interaction instruction is an instruction for data in at least one first sector range in the storage device, and the operation type of the instruction is the write type, or the read and write type; or in a decryption readout mode, the data interaction instruction is an instruction for data in at least one second sector range in the storage device, at least one second file, and/or at least one type of file, and the operation type of the instruction is the read type;

in a manual confirmation mode, the data interaction instruction is an instruction for data in at least one third sector range in the storage device, at least one third file and/or at least one type of file, and the operation type of the instruction is the read and write type; or in a logical split disk mode, the data interaction instruction is an instruction for at least one logical split disk in the storage device, and the operation type of the instruction is the read type, the write type e, or the read and write type.

72. A computer-readable storage medium, on which a computer program is stored, and the steps in the data security protection method of claim 12 are implemented when the computer program is executed by a processor.

73. The computer-readable storage medium of claim 72, wherein before sending the logical split disk capacity parameters of the target logical split disk in the storage device to the computer device in response to the capacity reading instruction from the computer device, the method further comprises:

splitting a sector address range of the storage device to obtain a plurality of logical split disks based on a preset logical disk splitting strategy, wherein the target logical disk is one of the plurality of logical split disks, and the preset logical disk splitting strategy comprises a preset quantity of logical split disks or preset sector addresses of logical split disks.

* * * * *